US012337599B2

(12) United States Patent
Hoshi et al.

(10) Patent No.: US 12,337,599 B2
(45) Date of Patent: Jun. 24, 2025

(54) HEAD CHIP, LIQUID JET HEAD, LIQUID JET RECORDING DEVICE, AND METHOD OF MANUFACTURING HEAD CHIP

(71) Applicant: SII Printek Inc., Chiba (JP)

(72) Inventors: Tomoaki Hoshi, Chiba (JP); Yuzuru Kubota, Chiba (JP)

(73) Assignee: SII PRINTEK INC., Chiba (JP)

( * ) Notice: Subject to any disclaimer, the term of this patent is extended or adjusted under 35 U.S.C. 154(b) by 144 days.

(21) Appl. No.: 18/471,487

(22) Filed: Sep. 21, 2023

(65) Prior Publication Data

US 2024/0100830 A1 Mar. 28, 2024

(30) Foreign Application Priority Data

Sep. 26, 2022 (JP) ................................ 2022-152423

(51) Int. Cl.
*B41J 2/14* (2006.01)
*B41J 2/16* (2006.01)

(52) U.S. Cl.
CPC ......... *B41J 2/14209* (2013.01); *B41J 2/1609* (2013.01); *B41J 2/1632* (2013.01); *B41J 2/164* (2013.01); *B41J 2/1642* (2013.01); *B41J 2002/14491* (2013.01); *B41J 2/1623* (2013.01); *B41J 2202/10* (2013.01); *B41J 2202/12* (2013.01); *B41J 2202/22* (2013.01)

(58) Field of Classification Search
CPC .... B41J 2/14209; B41J 2/1609; B41J 2/1632; B41J 2/164; B41J 2/1642; B41J 2/1623; B41J 2002/14491; B41J 2202/10; B41J 2202/12; B41J 2202/22
See application file for complete search history.

(56) References Cited

U.S. PATENT DOCUMENTS

2020/0147959 A1* 5/2020 Kubota ...................... B41J 2/18

FOREIGN PATENT DOCUMENTS

JP 2018069678 A * 5/2018 ................ B41J 2/14
JP 2019051607 A * 4/2019 ................ B41J 2/01

* cited by examiner

*Primary Examiner* — Yaovi M Ameh
(74) *Attorney, Agent, or Firm* — Crowell & Moring LLP

(57) ABSTRACT

A head chip, a liquid jet head, a liquid jet recording device, and a method of manufacturing a head chip each capable of suppressing the variation in ejection performance between the ejection channels without changing the shape of a channel (a drive wall) are provided. In the head chip according to an aspect of the present disclosure, when a region in which the first common electrode part and a second common electrode part are opposed in an X direction to each other across the drive wall, and which is configured to generate an electrical field in the drive wall is defined as an opposed region, a dimension in a Z direction in a first upside common part is formed so as to decrease in a direction from the drive wall located at the first side in the X direction toward the drive wall located at the second side in the X direction among the plurality of drive walls, a dimension in the Z direction in a second upside common part is formed so as to decrease in a direction from the drive wall located at the second side in the X direction toward the drive wall located at the first side in the X direction among the plurality of drive walls, and a dimension in a Y direction in the opposed region decreases in directions from the drive walls located at both end sides in the X direction toward the drive wall located in a central portion in the X direction.

11 Claims, 36 Drawing Sheets

HEAD CHIP, LIQUID JET HEAD, LIQUID JET RECORDING DEVICE, AND METHOD OF MANUFACTURING HEAD CHIP

RELATED APPLICATIONS

This application claims priority to Japanese Patent application No. JP2022-152423, filed on Sep. 26, 2022, the entire content of which is incorporated herein by reference.

BACKGROUND OF THE INVENTION

1. Field of the Invention

The present disclosure relates to a head chip, a liquid jet head, a liquid jet recording device, and a method of manufacturing a head chip.

2. Description of the Related Art

An inkjet head to be installed in an inkjet printer ejects ink to a recording target medium through a head chip installed in the inkjet head. The head chip is provided with an actuator plate having ejection channels and non-ejection channels, and a nozzle plate having nozzle holes communicated with the ejection channels. The ejection channels and the non-ejection channels are alternately arranged across respective drive walls.

In the head chip, in order to eject the ink, a voltage is applied between electrodes provided to the drive wall to cause the drive wall to make a thickness-shear deformation. Thus, due to a change in volume of the ejection channel, the ink in the ejection channel is ejected through a nozzle hole.

The electrodes described above are deposited on inner surfaces (the drive walls) of each of the channels by performing oblique evaporation from an oblique direction crossing a channel arrangement direction when viewed from the channel extension direction. However, when forming the electrodes using the oblique evaporation, the evaporation depth of the electrodes changes in accordance with a distance from an evaporation source. Specifically, the farther from the evaporation source the channel is, the smaller the dimension of the electrode in the channel depth direction is. As a result, the area of a region (hereinafter referred to as an opposed region) where the electrodes opposed to each other across the drive wall are opposed to each other is different by the drive wall. In this case, since a displacement (an amount of a variation in volume of the ejection channel) of the drive wall when applying the voltage is different by the drive wall, a variation occurs in the ink ejection speed. There is a problem that this causes a variation in timing when the ink lands on the recording target medium, which leads to deterioration in ejection performance.

To cope with the problem described above, for example, JP-A-2018-69678 discloses a configuration of controlling the variation in volume of the ejection channel by changing the thickness of the drive wall in accordance with a variation in area of the opposed region.

However, in the related art described above, there is a possibility that the durability such as the strength of the drive wall is affected when changing the thickness of the drive wall.

In the present disclosure, there is provided a head chip, a liquid jet head, a liquid jet recording device, and a method of manufacturing a head chip each capable of suppressing the variation in ejection performance between the ejection channels without changing the shape of the channel (the drive wall).

SUMMARY OF THE INVENTION

In order to solve the problems described above, the present disclosure adopts the following aspects.

(1) A head chip according to an aspect of the present disclosure includes an actuator plate in which a plurality of channels extending in a first direction is arranged in a second direction crossing the first direction, and an electrode which includes, in the actuator plate, a first electrode part arranged on a first side surface facing to a first side in the second direction in a drive wall configured to partition between the channels adjacent to each other and a second electrode part arranged on a second side surface facing to a second side in the second direction as an opposite side to the first side in the drive wall, and which is configured to deform the drive wall in the actuator plate so as to change a volume of the channel, wherein when a region in which the first electrode part and the second electrode part are opposed in the second direction to each other across the drive wall, and which is configured to generate an electrical field in the drive wall is defined as an opposed region, a dimension of the first electrode part in a third direction crossing the first direction when viewed from the second direction is formed so as to decrease in a direction from the drive wall located at the first side in the second direction toward the drive wall located at the second side in the second direction among the plurality of drive walls, a dimension of the second electrode part in the third direction is formed so as to decrease in a direction from the drive wall located at the second side toward the drive wall located at the first side among the plurality of drive walls, and a dimension of the opposed region in the first direction decreases in directions from the drive walls located at both end sides in the second direction toward the drive wall located in a central portion in the second direction.

When forming the electrode using the oblique evaporation from the first side in the third direction on the side surface of the drive wall, the dimension in the third direction of the electrode formed on the side surface of each of the drive walls gradually decreases as getting away in the second direction from the evaporation source. Therefore, when forming the first electrode part using the evaporation source arranged at the first side in the second direction with respect to the actuator plate, the dimension in the third direction of the first electrode part decreases in a direction from the drive wall located at the second side end in the second direction toward the drive wall located at the first side end in the second direction among the plurality of drive walls. When forming the second electrode part using the evaporation source arranged at the second side in the second direction with respect to the actuator plate, the dimension in the third direction of the second electrode part decreases in a direction from the drive wall located at the first side end in the second direction toward the drive wall located at the second side end in the second direction among the plurality of drive walls.

Under such a configuration, according to the present aspect, the dimension in the first direction of the opposed region is decreased in the directions from the drive wall located at the both end sides in the second direction toward the drive wall located in the central portion in the second direction. Thus, it is possible to set the area (the effective area) of the opposed region in each of the drive walls independently of the distance from the evaporation source.

In this case, it becomes easy to homogenize the effective area in the channels without changing the shapes of the channels (the drive walls). As a result, it is possible to homogenize the displacement of the drive wall when jetting the liquid, and therefore, it is possible to suppress the variation in ejection performance.

(2) In the head chip according to the aspect (1) described above, it is preferable that an area of the opposed region is set to be same among the plurality of drive walls.

According to the present aspect, by setting the effective areas to be the same among the drive walls, it is possible to more surely suppress the variation in ejection performance.

(3) In the head chip according to one of the aspects (1) and (2) described above, it is preferable that a first side end portion in the first direction in the opposed region is arranged at same position in the first direction among the plurality of drive walls.

According to the present aspect, even when the length in the first direction of the electrode part is made different among the plurality of channels, the positions of the first side end portions in the electrode parts are uniformed among the channels. Thus, when forming the terminals for coupling the electrode parts and the external wiring to each other on the obverse surface of the actuator plate, it becomes easy to lay around the electrode parts to the terminals.

(4) In the head chip according to one of the aspects (1) and (2) described above, it is preferable that a jet hole plate is arranged on a surface facing to the third direction in the actuator plate, in the jet hole plate, jet holes separately communicated with the channels are formed at positions overlapping central portions in the first direction in the channels when viewed from the third direction, and both end portions in the first direction in the opposed region are located at more inner side in the first direction in directions from the drive walls located at both end sides in the second direction toward the drive wall located in a central portion in the second direction.

According to the present aspect, even when the lengths in the first direction of the respective electrode parts are made different among the plurality of drive walls, it is possible to open the jet hole in the central portion in the first direction with respect to the opposed region in each of the drive walls. Thus, it is possible to more surely suppress the variation in ejection performance among the channels.

(5) In the head chip according to any of the aspects (1) to (4) described above, it is preferable that the first electrode part includes a first one-side area located at one side in the third direction, and a first other-side area connected at the other side in the third direction to the first one-side area, the second electrode part includes a second one-side area located at one side in the third direction, and a second other-side area connected at the other side in the third direction to the second one-side area, and a dimension in the first direction of a portion constituted by the first one-side area and the second on-side area in the opposed region decreases in directions from the drive walls located at both end sides in the second direction toward the drive wall located in a central portion in the second direction.

According to the present aspect, when forming the drive wiring from the both sides in the third direction to the actuator plate, the variation in effective area caused by a variation in dimension in the third direction of the opposed area can be absorbed by the adjustment of the dimensions in the first direction in the first one-side area and the second one-side area.

(6) In the head chip according to any of the aspects (1) to (5) described above, it is preferable that a first low-dielectric film is arranged a part in the first direction between the first electrode part and the first side surface, a second low-dielectric film is arranged in a part in the first direction between the second electrode part and the second side surface, and dimensions in the first direction of the first low-dielectric film and the second low-dielectric film decrease in directions from a drive wall located at a central portion in the second direction toward the drive walls located at both sides in the second direction.

According to the present aspect, by decreasing the dimensions in the first direction in the first low-dielectric film and the second low-dielectric film in directions from the drive wall located in the central portion in the second direction toward the drive walls located at the both end sides in the second direction, it is possible to decrease the dimension in the first direction in the opposed region in a directions from the drive walls located at the both end sides in the section direction toward the drive wall located in the central portion in the second direction. Thus, it becomes easy to homogenize the effective area among the drive walls.

(7) A liquid jet head according to an aspect of the present disclosure includes the head chip according to any one of the aspects (1) to (6) described above.

According to the present aspect, it is possible to provide the high-performance liquid jet head which is small in variation of the ejection performance among the ejection channels.

(8) A liquid jet recording device according to an aspect of the present disclosure includes the liquid jet head according to the aspect (7) described above.

According to the present aspect, it is possible to provide the high-performance liquid jet recording device which is small in variation of the ejection performance among the ejection channels.

(9) A method of manufacturing a head chip according to an aspect of the present disclosure is a method of manufacturing a head chip including an actuator plate in which a plurality of channels extending in a first direction are arranged in a second direction crossing the first direction, and an electrode which includes, in the actuator plate, a first electrode part arranged on a first side surface facing to a first side in the second direction in a drive wall configured to partition between the channels adjacent to each other and a second electrode part arranged on a second side surface facing to a second side in the second direction as an opposite side to the first side in the drive wall, and which is configured to deform the drive wall to change a volume of the channel, the method including a first evaporation step of performing oblique evaporation in an oblique direction crossing the second direction when viewed from the first direction from an evaporation source arranged at the first side in the second direction with respect to the actuator plate to thereby deposit the first electrode parts on the first side surfaces so that a dimension of the first electrode part in a third direction crossing the first direction when viewed from the second direction decreases in a direction from the drive wall located at a first side in the second direction toward the drive wall located at the second side in the second direction among the plurality of drive walls, and a second evaporation step of performing oblique evaporation in an oblique direction crossing the second direction when viewed from the first direction from an evaporation source arranged at the second side in the second direction with respect to the actuator plate to thereby deposit the second electrode parts on the second side surfaces so that a dimension of the second electrode part in the third direction decreases in a direction from the drive wall located at the second side toward the drive wall located at the first side among the plurality of drive walls, wherein when a region in which the first electrode part and the second electrode part are opposed in the second direction to each other across the drive wall is defined as an opposed region, a dimension in the first direction of the opposed region is decreased in directions from the drive walls located at both sides in the second direction toward the drive wall located in a central portion in the second direction.

(10) In the method of manufacturing the head chip according to the aspect (9) described above, it is preferable that in the first evaporation step and the second evaporation step, by performing oblique evaporation using a mask arranged so as to overlap the actuator plate when viewed from the third direction, the first electrode part is formed on the first side surface and the second electrode part is formed on the second side surface through an opening of the mask, and a dimension in the first direction of the opening increases in directions from the drive wall located in a central portion in the second direction toward the drive walls located at both end sides in the second direction.

According to the present aspect, it becomes easy to homogenize the effective area among the drive walls only by changing the shape of the mask without changing the existing process.

(11) In the method of manufacturing the head chip according to the aspect (10) described above, it is preferable that in the first evaporation step, the oblique evaporation is performed in a state in which a first low-dielectric film is formed on the first side surfaces so that the first low-dielectric film decreases in directions from the drive wall located in a central portion in the second direction toward the drive walls located at both end sides in the second direction, and in the second evaporation step, the oblique evaporation is performed in a state in which a second low-dielectric film is formed on the second side surfaces so that the second low-dielectric film decreases in the directions from the drive wall located in the central portion in the second direction toward the drive walls located at the both sides in the second direction.

According to the present aspect, by forming the low-dielectric film in advance on the side surfaces of the drive walls, even when forming the electrode parts with a uniform dimension in the first direction on the side surfaces of the drive walls, it is possible to make only the portions having contact with the side surfaces of the drive walls and opposed to each other function as the opposed region in the electrode parts.

According to the aspect of the present disclosure, it is possible to suppress the variation in ejection performance among the ejection channels without changing the shapes of the channels (the drive walls).

DETAILED DESCRIPTION OF THE PREFERRED EMBODIMENTS

Figure 1:
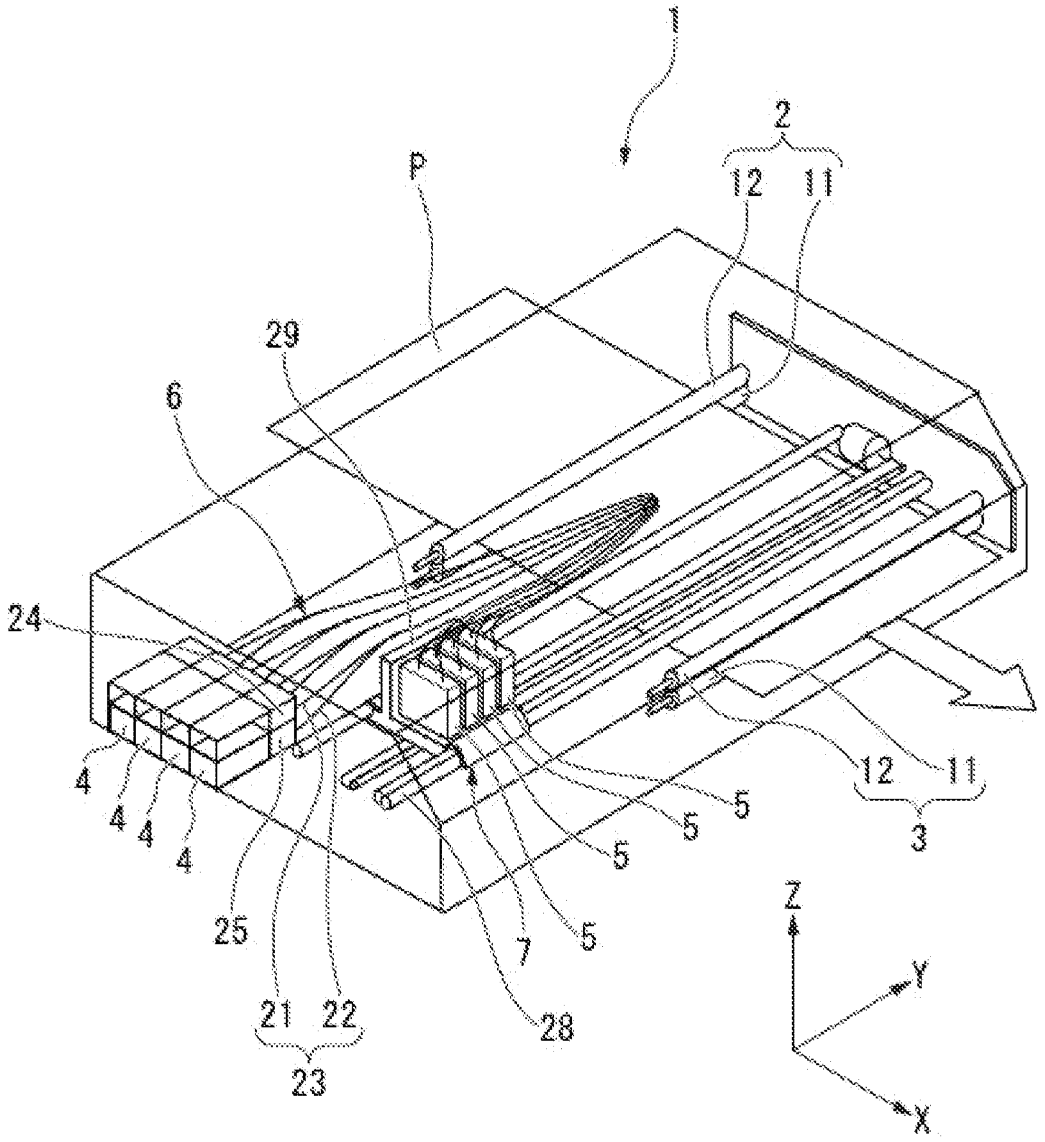
FIG. 1 is a schematic configuration diagram of a printer according to a first embodiment.

Some embodiments according to the present disclosure will hereinafter be described with reference to the drawings. In the embodiments and modified examples described hereinafter, constituents corresponding to each other are denoted by the same reference symbols, and the description thereof will be omitted in some cases. In the following description, expressions representing relative or absolute arrangements such as "parallel," "perpendicular," "center," and "coaxial" not only represent strictly such arrangements, but also represent the state of being relatively displaced with a tolerance, or an angle or a distance to the extent that the same function can be obtained. In the following embodiments, the description will be presented citing an inkjet printer (hereinafter simply referred to as a printer) for performing recording on a recording target medium using ink (liquid) as an example. The scale size of each member is arbitrarily modified so as to provide a recognizable size to the member in the drawings used in the following description.

First Embodiment

[Printer 1]

FIG. 1 is a schematic configuration diagram of a printer 1.

As shown in FIG. 1, the printer (a liquid jet recording device) 1 according to the first embodiment is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, an X direction coincides with a conveying direction (a sub-scanning direction) of a recording target medium P (e.g., paper). A Y direction coincides with a scanning direction (a main scanning direction) of the scanning mechanism 7. A Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the first embodiment, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink tanks 4 respectively contain ink of four colors such as yellow, magenta, cyan, and black. The inkjet heads 5 are configured so as to be able to respectively eject the four colors of ink, namely the yellow ink, the magenta ink, the cyan ink, and the black ink according to the ink tanks 4 coupled thereto. It should be noted that water-based ink (electrically-conductive ink) using water as a solvent can be used as the ink contained in the ink tanks 4.

Figure 2:
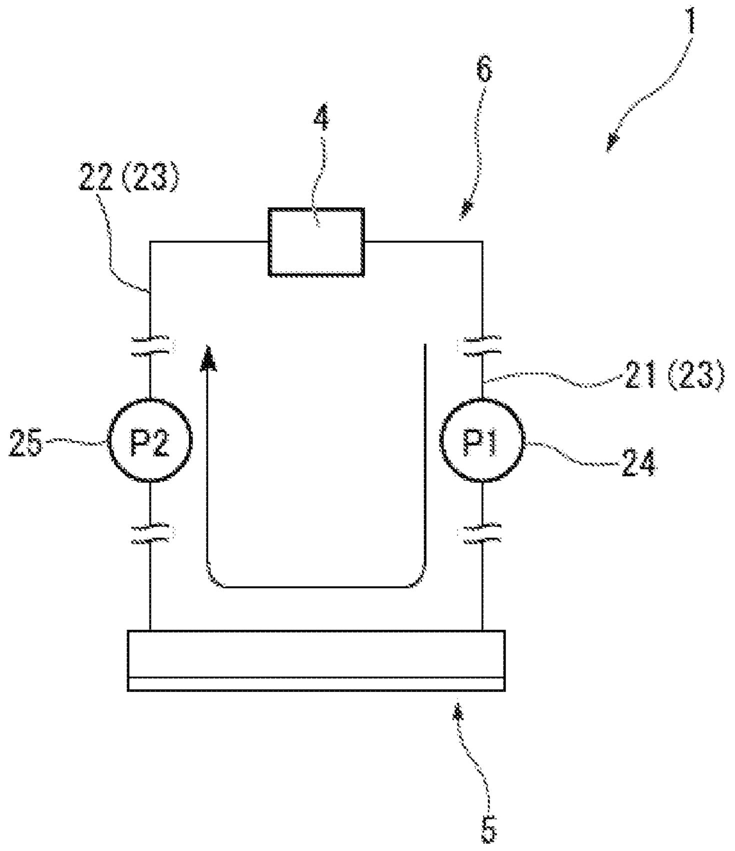
FIG. 2 is a schematic configuration diagram of an inkjet head and an ink circulation mechanism according to the first embodiment.

FIG. 2 is a schematic configuration diagram of the inkjet head 5 and the ink circulation mechanism 6.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the ink jet head 5.

The suction pump 25 depressurizes the inside of the ink discharge tube 22 to suction the ink from the inkjet head 5 through the ink discharge tube 22. Thus, the ink discharge tube 22 is provided with negative pressure with respect to the ink jet head 5. It is arranged that the ink can circulate between the inkjet head 5 and the ink tank 4 through the circulation flow channel 23 by driving the pressure pump 24 and the suction pump 25.

The scanning mechanism 7 makes the inkjet heads 5 perform reciprocal scan in the Y direction. The scanning mechanism 7 is provided with a guide rail 28 extending in the Y direction, and a carriage 29 movably supported by the guide rail 28.

<Inkjet Heads 5>

As shown in FIG. 1, the inkjet heads 5 are mounted on the carriage 29. In the illustrated example, the plurality of inkjet heads 5 are mounted on the single carriage 29 so as to be arranged side by side in the Y direction. The inkjet heads 5 are each provided with a head chip 50 (see FIG. 3), an ink supply section (not shown) for coupling the ink circulation mechanism 6 and the head chip 50, and a controller (not shown) for applying a drive voltage to the head chip 50.

<Head Chip 50>

Figure 3:
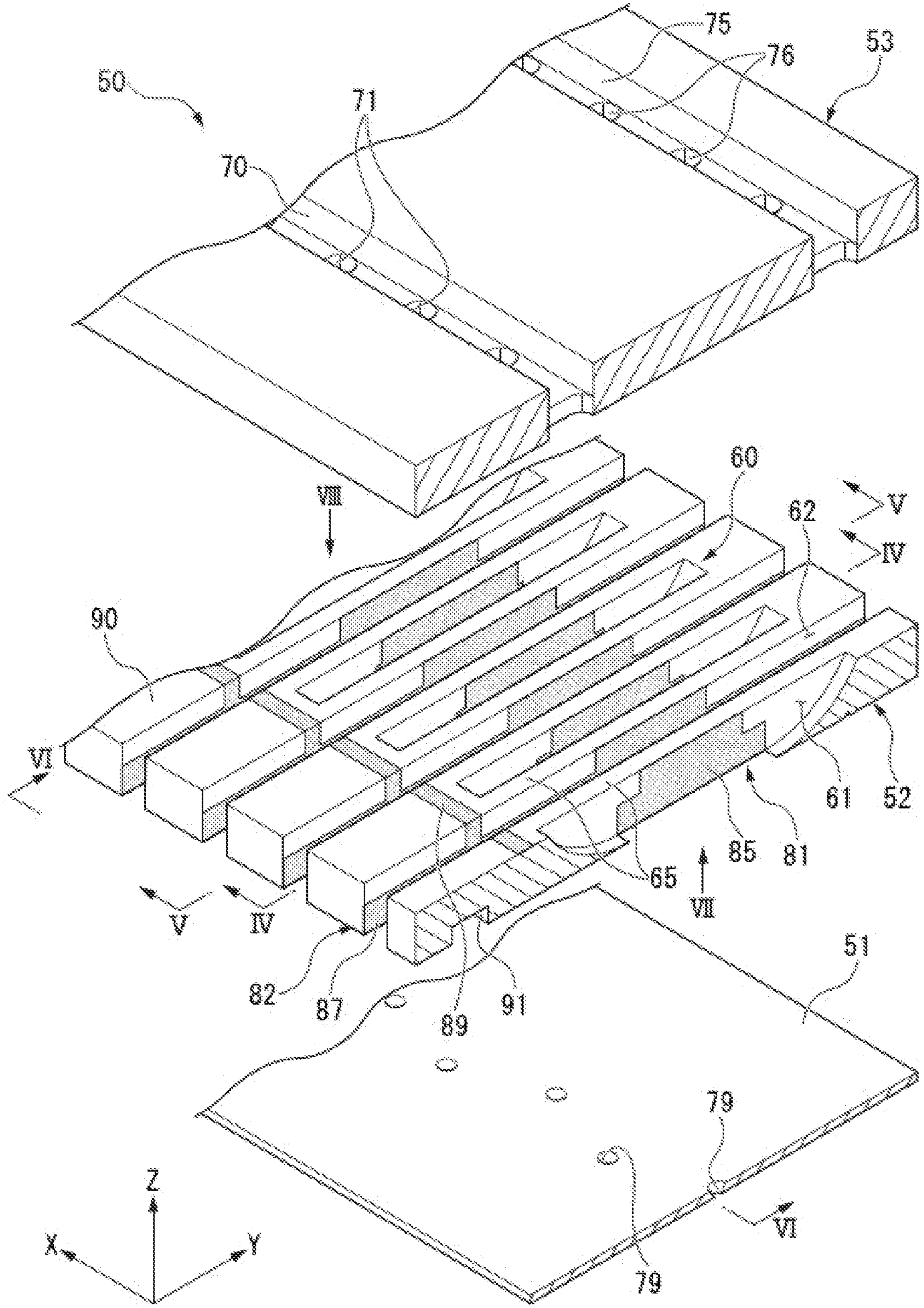
FIG. 3 is an exploded perspective view of a head chip according to the first embodiment.

FIG. 3 is an exploded perspective view of the head chip 50.

The head chip 50 shown in FIG. 3 is a so-called recirculating side-shoot type head chip 50 for ejecting the ink from a central portion in the extending direction (the Y direction) in the ejection channel 61 described later. The head chip 50 is provided with a nozzle plate 51, an actuator plate 52, and a cover plate 53. The head chip 50 is provided with a configuration in which the nozzle plate 51, the actuator plate 52, and the cover plate 53 are stacked on one another in this order in the Z direction (a third direction).

The actuator plate 52 is formed of a piezoelectric material including an oxide. In the first embodiment, the actuator plate 52 is formed of, for example, PZT (lead zirconate titanate). The actuator plate 52 can be a so-called chevron substrate in which, for example, the polarization direction is different between the positive side and the negative side in the Z direction.

The actuator plate 52 is provided with a channel column 60. The channel column 60 includes ejection channels (channels) 61 filled with the ink, and non-ejection channels (the channels) 62 not filled with the ink. The channels 61, 62 are alternately arranged at intervals in the X direction (a second direction) in the actuator plate 52. The configuration in which the channel extension direction (a first direction)

coincides with the Y direction will be described in the first embodiment, but the channel extension direction can cross the Y direction.

Figure 4:
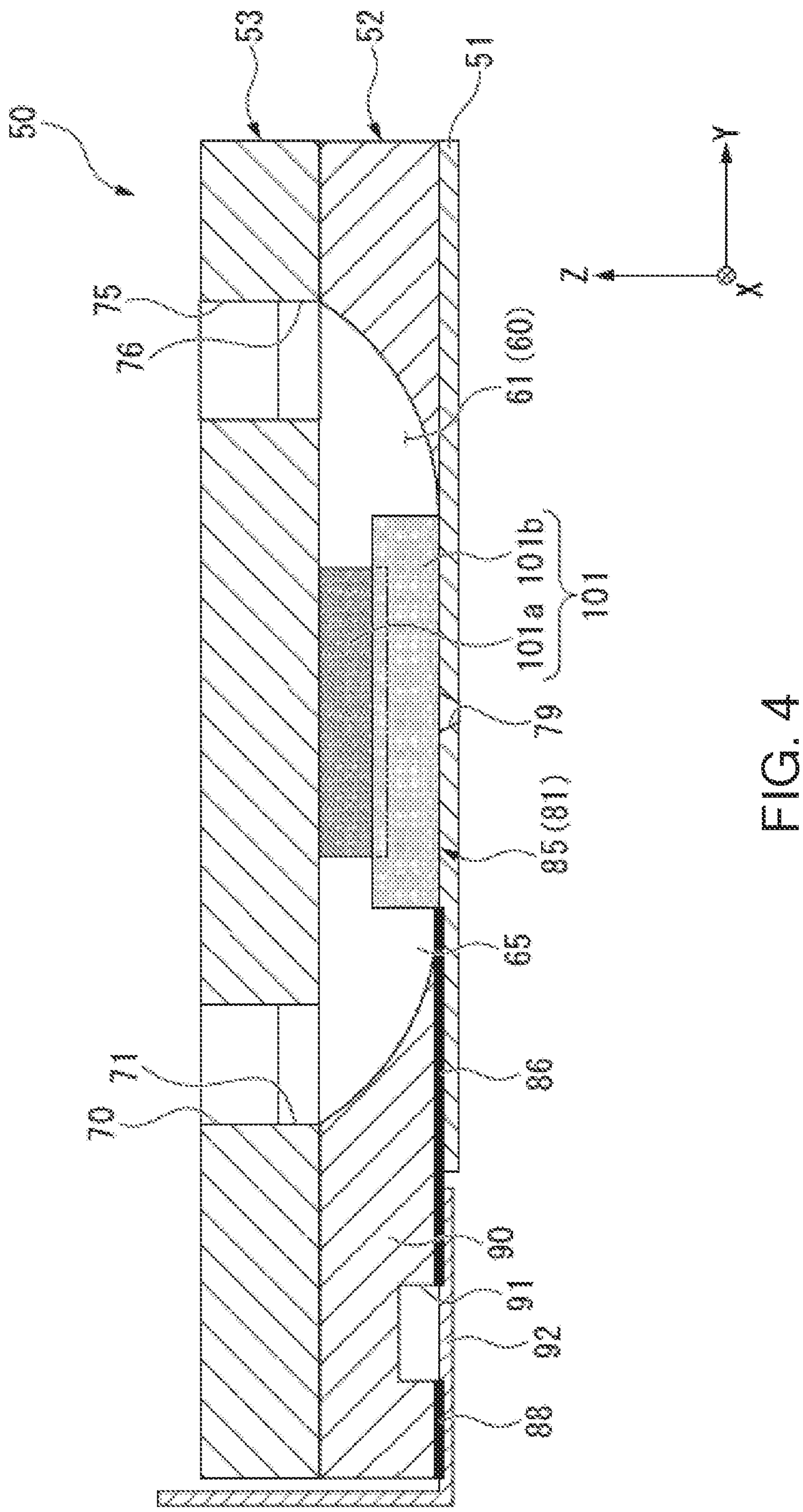
FIG. 4 is a cross-sectional view corresponding to the line IV-IV shown in FIG. 3.

FIG. 4 is a cross-sectional view corresponding to the line IV-IV shown in FIG. 3.

As shown in FIG. 4, the ejection channel 61 is formed to have a circular arc shape convex downward when viewed from the X direction. The ejection channel 61 penetrates the actuator plate 52 in the Z direction in a central portion in the Y direction. In other words, the ejection channel 61 opens respectively on an upper surface (a surface facing to the +Z side) and a lower surface (a surface facing to the −Z side) of the actuator plate 52. The ejection channel 61 gradually decreases in depth in directions toward the outside in the Y direction in both end portions in the Y direction.

Figure 5:
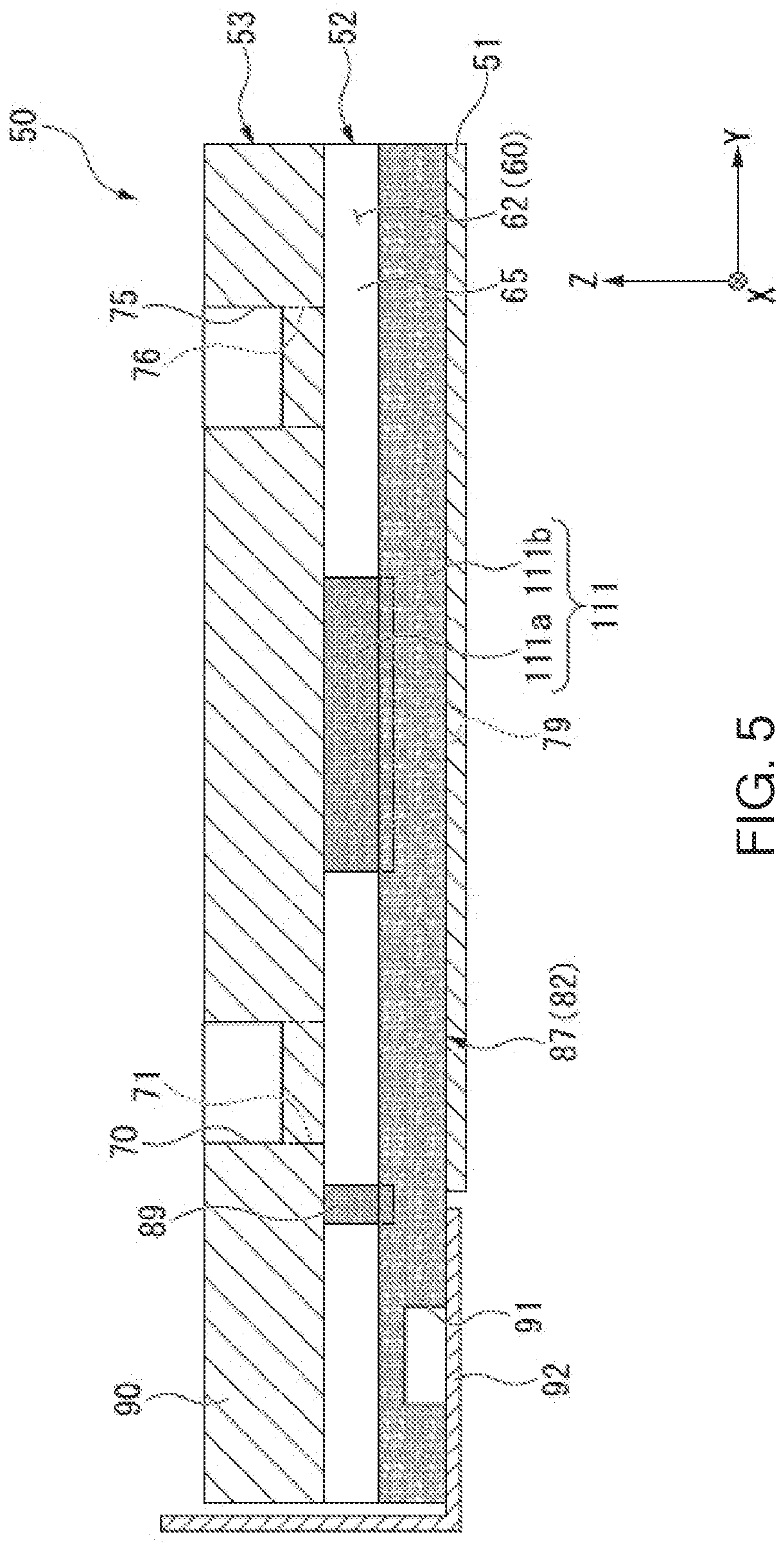
FIG. 5 is a cross-sectional view corresponding to the line V-V shown in FIG. 3.

FIG. 5 is a cross-sectional view corresponding to the line V-V shown in FIG. 3.

As shown in FIG. 5, the non-ejection channel 62 linearly extends in the Y direction in the state of penetrating the actuator plate 52 in the Z direction. As shown in FIG. 3, in the actuator plate 52, a portion located between each of the ejection channels 61 and corresponding one of the non-ejection channels 62 constitutes a drive wall 65. Therefore, both sides in the X direction of each of the channels 61, 62 are surrounded by the pair of drive walls 65. Although the description is presented in the first embodiment citing the head chip 50 having the single channel column 60 as an example, it is possible to dispose a plurality of channel columns 60 in the Y direction. On this occasion, it is preferable for the ejection channels 61 constituting the channel columns 60 adjacent to each other to be arranged so as to be shifted as much as 1/n pitch with respect to an arrangement pitch of the ejection channels 61 in one of the channel columns 60 assuming the number of the channel columns 60 as n.

Figure 6:
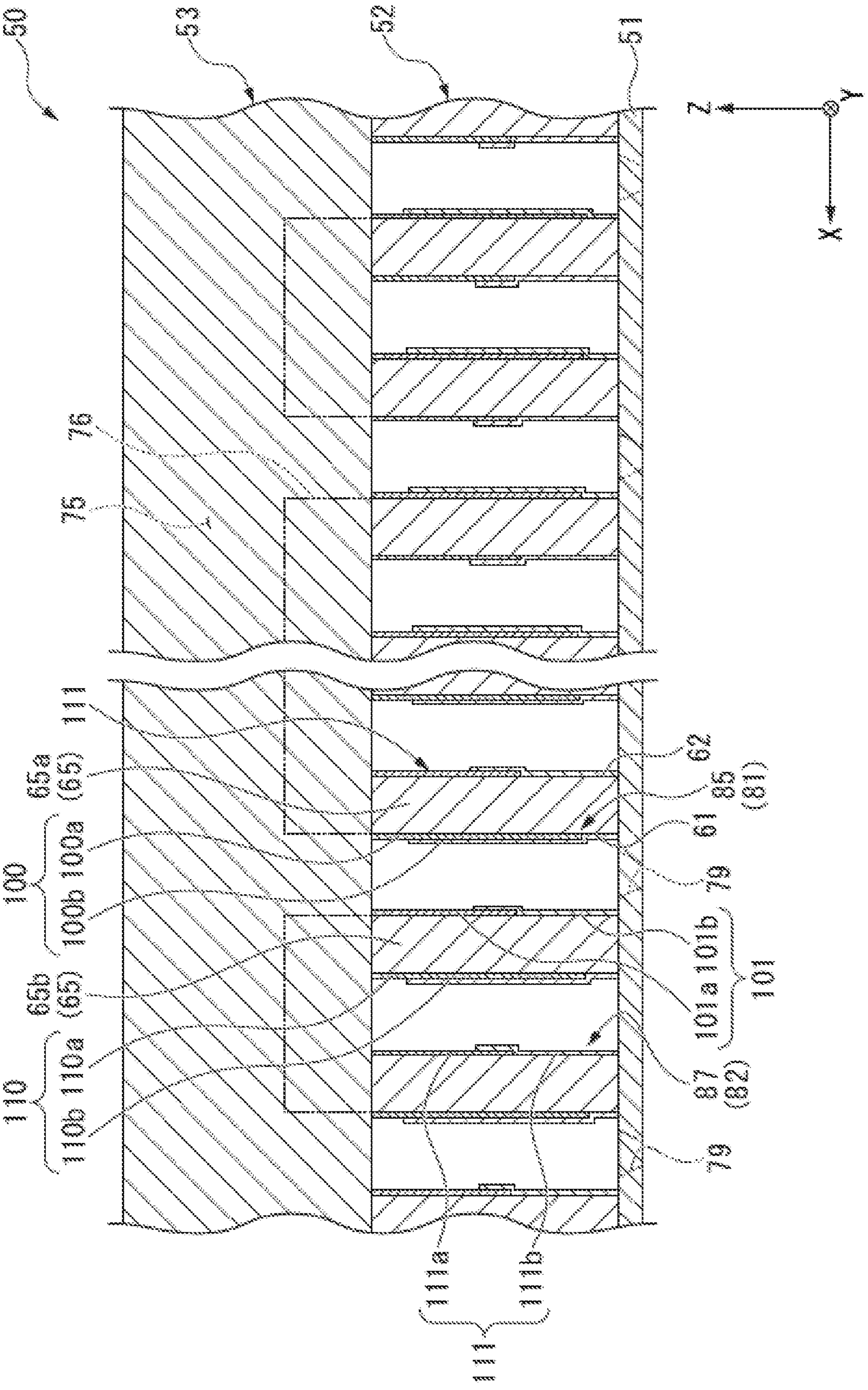
FIG. 6 is a cross-sectional view corresponding to the line VI-VI shown in FIG. 3.

FIG. 6 is a cross-sectional view corresponding to the line VI-VI shown in FIG. 3.

As shown in FIG. 6, the cover plate 53 is stacked on an upper surface of the actuator plate 52 by bonding or the like so as to cover the upper end openings of the channels 61, 62. As shown in FIG. 4, in the cover plate 53, at a position overlapping the −Y-side end portion of the channel column 60 in the plan view, there is formed an entrance common ink chamber 70. The entrance common ink chamber 70 extends in the X direction with a length sufficient for straddling, for example, the channel column 60, and at the same time, opens on the upper surface of the cover plate 53.

In the entrance common ink chamber 70, at the positions overlapping the respective ejection channels 61 in the plan view, there are formed entrance slits 71. The entrance slits 71 each communicate the −Y-side end portion of corresponding one of the ejection channels 61 and the entrance common ink chamber 70 with each other.

In the cover plate 53, at a position overlapping the +Y-side end portion of the channel column 60 in the plan view, there is formed an exit common ink chamber 75. The exit common ink chamber 75 extends in the X direction with a length sufficient for straddling, for example, the channel column 60, and at the same time, opens on the upper surface of the cover plate 53.

In the exit common ink chamber 75, at the positions overlapping the respective non-ejection channels 62 in the plan view, there are formed exit slits 76. The exit slits 76 each communicate the +Y-side end portion of corresponding one of the ejection channels 61 and the exit common ink chamber 75 with each other. Therefore, the entrance slits 71 and the exit slits 76 are communicated with the respective ejection channels 61 on the one hand, but are not communicated with the non-ejection channels 62 on the other hand.

As shown in FIG. 6, the nozzle plate 51 is stacked on the lower surface (an opening surface) of the actuator plate 52 by bonding or the like. The nozzle plate 51 is formed of a metal material (SUS, Ni—Pd, or the like) so as to have a thickness of about 50 μm. It should be noted that it is possible for the nozzle plate 51 to have a single layer structure or a laminate structure with a resin material (polyimide or the like), glass, silicone, or the like besides the metal material.

The nozzle plate 51 is provided with a plurality of nozzle holes 79 penetrating the nozzle plate 51 in the Z direction. The nozzle holes 79 are each formed to have, for example, a taper shape having the inner diameter gradually decreasing along a direction from the upper side toward the lower side. The nozzle holes 79 are arranged at intervals in the X direction. The nozzle holes 79 are separately communicated with central portions in the Y direction of the corresponding ejection channels 61. Therefore, the non-ejection channels 62 are not communicated with the nozzle holes 79, but are covered with the nozzle plate 51 from below.

As shown in FIG. 3, the nozzle holes 79 are arranged in the central portions in the Y direction of the respective ejection channels 61 in a zigzag manner. Specifically, the nozzle hole 79 communicated with one of the ejection channels 61 and the nozzle holes 79 communicated with a pair of other ejection channels 61 located at both sides in the X direction with respect to the one of the ejection channels 61 are arranged so as to be shifted in the Y direction from each other. Further, the nozzle holes 79 communicated with the pair of other ejection channels 61 are arranged at the same position in the Y direction. It should be noted that it is possible for the nozzle holes 79 to linearly be arranged in the X direction.

It should be noted that it is possible to make an intermediate plate (not shown) intervene between the nozzle plate 51 and the actuator plate 52. On this occasion, the ejection channel 61 and the nozzle hole 79 are communicated with each other through a communication hole provided to the intermediate plate.

Figure 7:
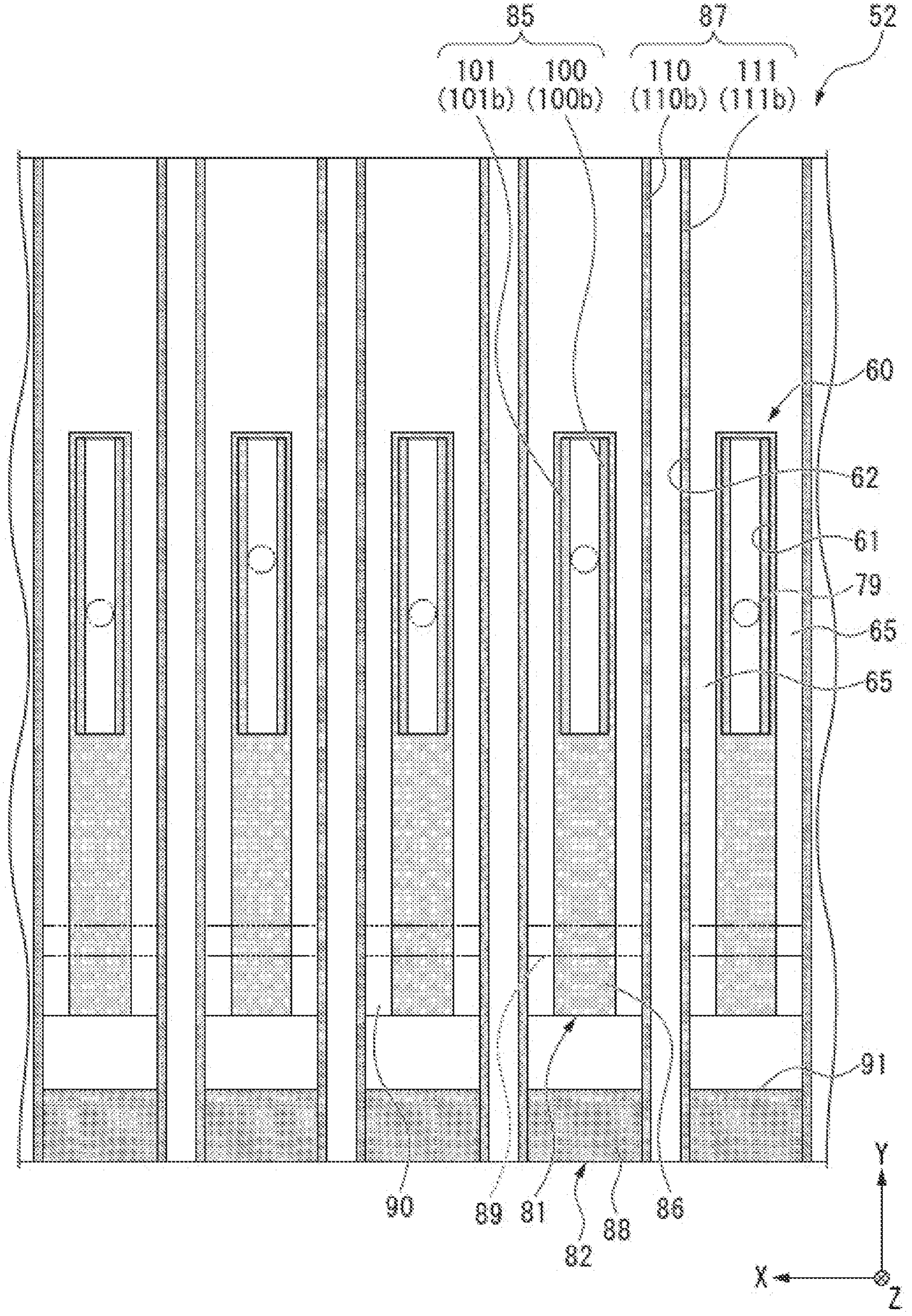
FIG. 7 is a view along the arrow VII shown in FIG. 3.

Then, drive wiring provided to the actuator plate 52 will be described. FIG. 7 is a view along the arrow VII shown in FIG. 3.

As shown in FIG. 7, the actuator plate 52 is provided with common wiring 81 and individual wiring 82.

As shown in FIG. 4 and FIG. 7, the common wiring 81 is provided with a common electrode (electrode) 85 and a common terminal 86.

The common electrode 85 is formed on the inner side surfaces opposed to each other in the X direction out of the inner surfaces of the ejection channel 61. The common electrode 85 is formed throughout the entire area in the Z direction on the inner surface of the ejection channel 61. It should be noted that the details of the common electrode 85 will be described later.

The common terminal 86 is formed in a portion (hereinafter referred to as a tail part 90) located at the −Y side of the ejection channel 61 in the actuator plate 52. The common terminal 86 is disposed on the lower surface of the tail part 90 so as to correspond to each of the ejection channels 61. The common terminals 86 each extend linearly in the Y direction with respect to corresponding one of the ejection channels 61. The +Y-side end portion in the common terminal 86 is connected to the common electrode 85 in a lower end opening edge of the ejection channel 61.

As shown in FIG. 4 and FIG. 7, the individual wiring 82 is provided with individual electrodes 87, an individual terminal 88, and bypass wiring 89.

The individual electrodes 87 are formed on the inner side surfaces opposed to each other in the X direction out of the inner surfaces of each of the non-ejection channels 62. In the illustrated example, the individual electrodes 87 are each formed throughout the entire area in the Z direction on the inner surface of the non-ejection channel 62. It should be noted that the details of the individual electrodes 87 will be described later.

The individual terminal 88 is provided to a portion located at the −Y side of the common terminal 86 on the lower surface of the tail part 90. The individual terminal 88 is provided with a strip-like shape extending in the X direction. The individual terminal 88 couples the individual electrodes 87 opposed to each other in the X direction across the ejection channel 61 to each other at the lower end opening edges of the non-ejection channels 62 which are opposed to each other in the X direction across the ejection channel 61. In the tail part 90, a portion located between the common terminal 86 and the individual terminal 88 is provided with a partitioning groove 91. The partitioning groove 91 extends in the X direction in the tail part 90. The partitioning groove 91 separates the common terminal 86 and the individual terminal 88 from each other.

The bypass wiring 89 is formed in a portion located at the +Y side of the individual terminal 88 in the actuator plate 52. The bypass wiring 89 couples the individual electrodes 87 opposed to each other in the X direction across the ejection channel 61 to each other through the upper surface of the actuator plate 52 and both inner side surfaces of the non-ejection channels 62 which are opposed to each other in the X direction across the ejection channel 61.

As shown in FIG. 4 and FIG. 5, a flexible printed board 92 is pressure-bonded to the lower surface of the tail part 90. The flexible printed board 92 is coupled to the common terminals 86 and the individual terminals 88 on the lower surface of the tail part 90. The flexible printed board 92 is extracted upward passing through the outside of the actuator plate 52.

Figure 8:
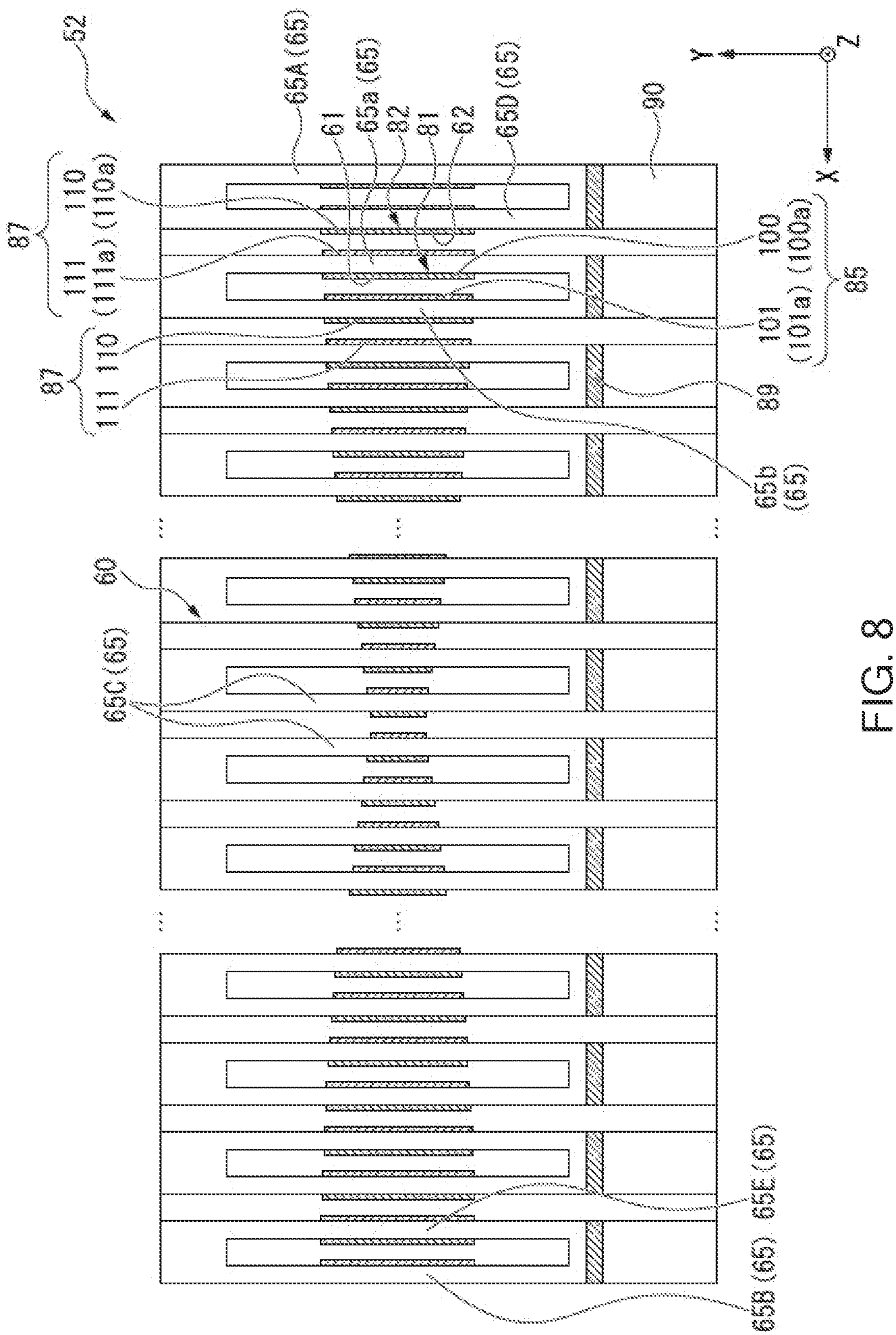
FIG. 8 is a view along the arrow VIII shown in FIG. 3.

FIG. 8 is a view along the arrow VIII shown in FIG. 3.

Here, as shown in FIG. 4, FIG. 6, and FIG. 8, the common electrode 85 described above is provided with a first common electrode part (a first electrode part) 100 formed on a surface (hereinafter referred to as a +X-side surface) facing to the +X side out of the inner side surfaces (the drive wall 65 located at the −X side of the ejection channel 61) of the ejection channel 61, and a second common electrode part (a second electrode part) 101 formed on a surface (hereinafter referred to as a −X-side surface) facing to the −X side out of the inner side surfaces of the ejection channel 61.

The first common electrode part 100 is formed throughout the whole length in the Z direction on the +X-side surface (a first side surface) of the ejection channel 61. The first common electrode part 100 is provided with a first upside common part (a first one-side electrode part) **100*a*, and a first downside common part (a first other-side electrode part) 100*b***.

As shown in FIG. 6, the first upside common part **100*a* forms an upper area of the first common electrode part 100. An upper end edge of the first upside common part 100*a* reaches an upper end opening edge of the ejection channel 61**.

A lower end edge of the first upside common part **100*a* is located at a more upper position in a direction from the drive wall 65 (hereinafter referred to as the drive wall 65 at the +X-side end) located at the extreme +X side toward the drive wall 65 (hereinafter referred to as the drive wall 65 at the −X-side end) located at the extreme −X side out of the plurality of drive walls 65 constituting the ejection channels 61. In other words, the dimension in the Z direction of the first upside common part 100*a* gradually decreases in a direction from the drive wall 65 at the +X-side end toward the drive wall 65** at the −X-side end.

As shown in FIG. 8, the dimension in the Y direction of the first upside common part **100*a* gradually decreases in directions from the drive walls 65 (hereinafter referred to as the drive walls 65A, 65B at both end sides) located at both end sides in the X direction toward the drive wall 65 (hereinafter referred to as the drive wall 65C in a central portion) located in the central portion in the X direction out of the plurality of drive walls 65 constituting the ejection channels 61. In the first embodiment, the first upside common parts 100*a* are formed so that the centers in the Y direction of the respective first upside common parts 100*a* coincide with each other. In other words, the both ends in the Y direction in each of the first upside common parts 100*a* are located at a more inner side in the Y direction in the directions from the drive walls 65 at the both end sides toward the drive wall 65 in the central portion. As shown in FIG. 4, the maximum dimension (the first upside common ports 100*a* provided to the drive walls 65A, 65B at the both end sides) in the Y direction in the first upside common parts 100*a* is made smaller than that of the first downside common part 100*b***.

As shown in FIG. 6, the first downside common part **100*b* forms a lower area of the first common electrode part 100. A lower end edge of the first downside common part 100*b* reaches a lower end opening edge of the ejection channel 61. The first common electrode part 100 is coupled to the common terminal 86 via the first downside common part 100*b* (see FIG. 7). By the upper end portion of the first downside common part 100*b* and the lower end portion of the first upside common part 100*a* overlapping each other, the first common electrode part 100 is formed throughout the whole length in the Z direction on the +X-side surface of the ejection channel 61**.

An upper end edge of the first downside common part **100*b* is located at a lower side in a direction from the drive wall 65B at the +X-side end toward the drive wall 65A at the −X-side end. In other words, the dimension in the Z direction of the first downside common part 100*b* gradually increases in a direction from the drive wall 65A at the −X-side end toward the drive wall 65B at the +X-side end. It should be noted that in the first upside common part 100*a* and the first downside common part 100*b*, the dimensions in the Z direction are respectively set so that the conduction can be ensured (so that the first upside common part 100*a* and the first downside common part 100*b* at least partially overlap each other) also in the drive wall 65**A at the −X-side end.

As shown in FIG. 7, the first downside common parts **100*b* are formed to be equivalent in dimension in the Y direction between the ejection channels 61. In the first embodiment, the first downside common part 100*b* is formed to have the dimension equivalent to the dimension in the Y direction in the lower end opening of the ejection channel 61**.

As shown in FIG. 4, FIG. 6, and FIG. 8, the second common electrode part 101 is formed throughout the whole length in the Z direction on the −X-side surface (a second side surface) of the ejection channel 61. The second common electrode part 101 is provided with a second upside common part (a second one-side electrode part) 101*a*, and a second downside common part (a second other-side electrode part) 101*b*.

The second upside common part 101*a* constitutes an upper area of the second common electrode part 101. An upper end edge of the second upside common part 101*a* reaches the upper end opening edge of the ejection channel 61.

As shown in FIG. 6, a lower end edge of the second upside common part 101*a* is located at a more upper position in a direction from the drive wall 65 at the −X-side end toward the drive wall 65 at the +X-side end out of the plurality of drive walls 65 constituting the ejection channels 61. In other words, the dimension in the Z direction of the second upside common part 101*a* gradually decreases in a direction from the drive wall 65 at the −X-side end toward the drive wall 65 at the +X-side end.

As shown in FIG. 8, the dimension in the Y direction of the second upside common part 101*a* gradually decreases in directions from the drive walls 65A, 65B at both end sides toward the drive wall 65C in a central portion. In the first embodiment, the second upside common parts 101*a* are formed so that the centers in the Y direction of the respective second upside common parts 101*a* coincide with each other. In other words, the both ends in the Y direction in each of the second upside common parts 101*a* are located at a more inner side in the Y direction in the directions from the drive walls 65 at the both end sides toward the drive wall 65 in the central portion. In the first embodiment, the maximum dimension (the second upside common parts 101*a* provided to the drive walls 65A, 65B at the both end sides) in the Y direction in the second upside common parts 101*a* is made smaller than that of the second downside common part 101*b*.

As shown in FIG. 6, the second downside common part 101*b* forms a lower area of the second common electrode part 101. A lower end edge of the second downside common part 101*b* reaches a lower end opening edge of the ejection channel 61. The second common electrode part 101 is coupled to the common terminal 86 via the second downside common part 101*b*. By the upper end portion of the second downside common part 101*b* and the lower end portion of the second upside common part 101*a* overlapping each other, the second common electrode part 101 is formed throughout the whole length in the Z direction on the −X-side surface of the ejection channel 61.

An upper end edge of the second downside common part 101*b* is located at a lower side in a direction from the drive wall 65 at the −X-side end toward the drive wall 65 at the +X-side end among the ejection channels 61. In other words, the dimension in the Z direction of the second downside common part 101*b* gradually decreases in a direction from the drive wall 65 at the −X-side end toward the drive wall 65 at the +X-side end. It should be noted that in the second upside common part 101*a* and the second downside common part 101*b*, the dimensions in the Z direction are respectively set so that the conduction can be ensured also in the drive wall 65B at the +X-side end.

As shown in FIG. 7, the second downside common parts 101*b* are formed to be equivalent in dimension in the Y direction between the ejection channels 61. In the first embodiment, the second downside common part 101*b* is formed to have the dimension equivalent to the dimension in the Y direction in the lower end opening of the ejection channel 61.

As shown in FIG. 5, FIG. 6, and FIG. 8, the individual electrode 87 is provided with a first individual electrode part (a first electrode part) 110 formed on a +X-side surface (a first side surface) of the non-ejection channel 62 (the drive wall 65), and a second individual electrode part (a second electrode part) 111 formed on a −X-side surface (a second side surface) of the non-ejection channel 62 (the drive wall 65).

The first individual electrode part 110 is formed throughout the whole length in the Z direction on the +X-side surface of the non-ejection channel 62. The first individual electrode part 110 is provided with a first upside individual part (a first one-side electrode part) 110*a*, and a first downside individual part (a first other-side electrode part) 110*b*.

The first upside individual part 110*a* constitutes an upper area of the first individual electrode part 110. The first upside individual part 110*a* is formed in at least a range overlapping the ejection channel 61 in a side view (see FIG. 5). An upper end edge of the first upside individual part 110*a* reaches an upper end opening edge of the non-ejection channel 62.

As shown in FIG. 6, a lower end edge of the first upside individual part 110*a* is located at a more upper position in a direction from the drive wall 65 (hereinafter referred to as the drive wall 65E at the +X-side end) located at the extreme +X side toward the drive wall 65 (hereinafter referred to as the drive wall 65D at the −X-side end) located at the extreme −X side out of the drive walls 65 constituting the non-ejection channels 62. In other words, the dimension in the Z direction of the first upside individual part 110*a* gradually decreases in a direction from the drive wall 65E at the +X-side end toward the drive wall 65D at the −X-side end.

As shown in FIG. 8, the dimension in the Y direction of the first upside individual part 110*a* gradually decreases in directions from the drive walls 65 (hereinafter referred to as the drive walls 65D, 65E at both end sides) located at both end sides in the X direction toward the drive wall 65 (hereinafter referred to as the drive wall 65C in a central portion) located in the central portion in the X direction out of the plurality of drive walls 65 constituting the non-ejection channels 62. In the first embodiment, the first upside individual parts 110*a* are formed so that the centers in the Y direction of the respective first upside individual parts 110*a* coincide with each other. In other words, the both ends in the Y direction in each of the first upside individual parts 110*a* are located at a more inner side in the Y direction in the directions from the drive walls 65D, 65E at the both end sides toward the drive wall 65C in the central portion. In the first embodiment, the dimension in the Y direction in the first upside individual part 110*a* is made equivalent to the dimension in the Y direction in the first upside common part 100*a* opposed to the first upside individual part 110*a* across the drive wall 65.

As shown in FIG. 6, the first downside individual part 110*b* forms a lower area of the first individual electrode part 110. A lower end edge of the first downside individual part 110*b* reaches a lower end opening edge of the non-ejection channel 62. As shown in FIG. 7, the first individual electrode part 110 is coupled to the individual terminal 88 via the first downside individual part 110*b*. By the upper end portion of the first downside individual part 110*b* and the lower end portion of the first upside individual part 110*a* overlapping each other, the first individual electrode part 110 is formed throughout the whole length in the Z direction on the +X-side surface of the non-ejection channel 62.

An upper end edge of the first downside individual part 110*b* is located at a lower side in a direction from the drive wall 65E at the +X-side end toward the drive wall 65D at the −X-side end. In other words, the dimension in the Z direction of the first downside individual part 110*b* gradually decreases in a direction from the drive wall 65E at the +X-side end toward the drive wall 65D at the −X-side end. It should be noted that in the first upside individual part 110*a* and the first downside individual part 110*b*, the dimensions in the Z direction are respectively set so that the conduction can be ensured (so that the first upside individual part 110*a* and the first downside individual part 110*b* at least partially overlap each other) also in the drive wall 65D at the −X-side end.

As shown in FIG. 7, the first downside individual parts 110*b* are formed to be equivalent in dimension in the Y direction between the non-ejection channels 62. In the first embodiment, the first downside individual part 110*b* is formed to have the dimension equivalent to the dimension in the Y direction in the non-ejection channel 62.

As shown in FIG. 5, FIG. 6, and FIG. 8, the second individual electrode part 111 is formed throughout the whole length in the Z direction on the −X-side surface of the non-ejection channel 62. The second individual electrode part 111 is provided with a second upside individual part 111*a*, and a second downside individual part 111*b*.

The second upside individual part 111*a* constitutes an upper area of the second individual electrode part 111. In the first embodiment, the second upside individual part 111*a* is formed in at least a range overlapping the ejection channel 61 in the side view. An upper end edge of the second upside individual part 111*a* reaches the upper end opening edge of the non-ejection channel 62.

As shown in FIG. 6, a lower end edge of the second upside individual part 111*a* is located at a more upper side in a direction from the drive wall 65D at the −X-side end toward the drive wall 65E at the +X-side end. In other words, the dimension in the Z direction of the second upside individual part 111*a* gradually decreases in the direction from the drive wall 65D at the −X-side end toward the drive wall 65E at the +X-side end.

As shown in FIG. 8, the dimension in the Y direction of the second upside individual part 111*a* gradually decreases in directions from the drive walls 65D, 65E at both end sides toward the drive wall 65C in a central portion. In the first embodiment, the second upside individual parts 111*a* coincide in center in the Y direction with each other. In other words, the both ends in the Y direction in each of the second upside individual parts 111*a* are located at a more inner side in the Y direction in the directions from the drive walls 65D, 65E at the both end sides toward the drive wall 65C in the central portion. In the first embodiment, the dimension in the Y direction in the second upside individual part 111*a* is made equivalent to the dimension in the Y direction in the second upside common part 101*a* opposed to the second upside individual part 111*a* across the drive wall 65.

As shown in FIG. 5, FIG. 6, and FIG. 8, the second downside individual part 111*b* forms a lower area of the second individual electrode part 111. A lower end edge of the second downside individual part 111*b* reaches the lower end opening edge of the non-ejection channel 62. The second individual electrode part 111 is coupled to the individual terminal 88 via the second downside individual part 111*b* (see FIG. 7). By the upper end portion of the second downside individual part 111*b* and the lower end portion of the second upside individual part 111*a* overlapping each other, the second individual electrode part 111 is formed throughout the whole length in the Z direction on the −X-side surface of the non-ejection channel 62.

As shown in FIG. 6, an upper end edge of the second downside individual part 111*b* is located at a lower side in the direction from the drive wall 65D at the −X-side end toward the drive wall 65E at the +X-side end among the non-ejection channels 62. In other words, the dimension in the Z direction of the second downside individual part 111*b* gradually decreases in the direction from the drive wall 65D at the −X-side end toward the drive wall 65E at the +X-side end. In the second upside individual part 111*a* and the second downside individual part 111*b*, the dimensions in the Z direction are respectively set so that the conduction can be ensured also in the drive wall 65E at the +X-side end.

As shown in FIG. 7, the second downside individual parts 111*b* are formed to be equivalent in dimension in the Y direction between the non-ejection channels 62. In the first embodiment, the second downside individual part 111*b* is formed to have the dimension equivalent to the dimension in the Y direction in the non-ejection channel 62.

Here, as shown in FIG. 6 and FIG. 8, the first common electrode part 100 is formed on the +X-side surface of the drive wall 65*a* partitioning between the ejection channel 61 and the non-ejection channel 62 adjacent at the −X side to that ejection channel 61, and the second individual electrode part 111 is formed on the −X-side surface of that drive wall 65*a*. In the first common electrode part 100 and the second individual electrode part 111 provided to each of the drive walls 65*a*, a region in which the first common electrode part 100 and the second individual electrode part 111 are opposed to each other across the drive wall 65*a* (overlap each other when viewed from the X direction), and which generates an electrical field with respect to the drive wall 65*a* is defined as a first opposed region. In this case, the first upside common part 100*a* in the first opposed region gradually decreases in dimension in the Z direction in a direction from the drive wall 65*a* at the +X-side end toward the drive wall 65*a* at the −X-side end on the one hand, and gradually decreases in dimension in the Y direction in directions from the drive walls 65*a* at both end sides toward the drive wall 65*a* in the central portion on the other hand. Further, the second upside individual part 111*a* in the first opposed region gradually decreases in dimension in the Z direction in a direction from the drive wall 65*a* at the −X-side end toward the drive wall 65*a* at the +X-side end on the one hand, and gradually decreases in dimension in the Y direction in the directions from the drive walls 65*a* at both end sides toward the drive wall 65*a* in the central portion on the other hand. Thus, it is set that the areas of the respective first opposed regions in the respective drive walls 65*a* become the same.

The second common electrode part 101 is formed on the −X-side surface of the drive wall 65*b* partitioning between the ejection channel 61 and the non-ejection channel 62 adjacent at the +X side to that ejection channel 61, and the first individual electrode part 110 is formed on the +X-side surface of that drive wall 65*b*. In the second common electrode part 101 and the first individual electrode part 110 provided to each of the drive walls 65*b*, a region in which the second common electrode part 101 and the first individual electrode part 110 are opposed to each other across the drive wall 65*b* (overlap each other when viewed from the X direction), and which generates an electrical field with respect to the drive wall 65*b* is defined as a second opposed region. In this case, the second upside common part 101*a* in the second opposed region gradually decreases in dimension in the Z direction in a direction from the drive wall 65*b* at the −X-side end toward the drive wall 65*b* at the +X-side end on the one hand, and gradually decreases in dimension in the Y direction in directions from the drive walls 65*b* at both end sides toward the drive wall 65*b* in the central portion on the other hand. Further, the first upside individual part 110*a* in the second opposed region gradually decreases in dimension in the Z direction in a direction from the drive wall 65*b* at the +X-side end toward the drive wall 65*b* at the −X-side end on the one hand, and gradually decreases in dimension in the Y direction in the directions from the drive walls 65*b* at both end sides toward the drive wall 65*b* in the central portion on the other hand. Thus, it is set that the areas of the respective second opposed regions in the respective drive walls 65*b* become the same. In the first embodiment, it is preferable for the areas of the first opposed region and the second opposed region to be the same in all of the drive walls 65*a*, 65*b*.

[Operation Method of Printer 1]

Then, there will be described when recording a character, a figure, or the like on the recording target medium P using the printer 1.

It is assumed that in the printer 1, the ink tanks 4 are sufficiently filled with ink of respective colors different from each other as an initial state. There is created a state in which the inkjet heads 5 are filled with the ink in the ink tanks 4 via the ink circulation mechanisms 6, respectively.

Under such an initial state, when making the printer 1 operate, the recording target medium P is conveyed toward the +X side while being pinched by the rollers 11, 12 of the conveying mechanisms 2, 3. By the carriage 29 moving in the Y direction at the same time as the conveyance of the recording target medium P, the inkjet heads 5 mounted on the carriage 29 reciprocate in the Y direction.

While the inkjet heads 5 reciprocate, the ink is arbitrarily ejected toward the recording target medium P from each of the inkjet heads 5. Thus, it is possible to perform recording of the character, the image, and the like on the recording target medium P.

Here, the operation of each of the inkjet heads 5 will hereinafter be described in detail.

In such a recirculating side-shoot type inkjet head 5 as in the first embodiment, first, by making the pressure pump 24 and the suction pump 25 shown in FIG. 2 operate, the ink is circulated in the circulation flow channel 23. In this case, as shown in FIG. 4, the ink flowing through the ink supply tube 21 is supplied to the inside of each of the ejection channels 61 through the entrance common ink chamber 70 and the entrance slits 71. The ink supplied to the inside of each of the ejection channels 61 flows through the ejection channels 61 in the Y direction. Subsequently, the ink is discharged to the exit common ink chamber 75 through the exit slits 76, and is then returned to the ink tank 4 through the ink discharge tube 22. Thus, it is possible to circulate the ink between the inkjet head 5 and the ink tank 4.

When the reciprocation of the inkjet head 5 is started due to the movement of the carriage 29 (see FIG. 1), the drive voltages are applied between the common electrodes 85, and the individual electrodes 87 via the flexible printed board 92. On this occasion, the individual electrode 87 is set at a drive potential Vdd, and the common electrode 85 is set at a reference potential GND to apply the drive voltage between the electrodes 85, 87. Then, an electrical field is generated in a portion sandwiched between opposed regions in each of the drive walls 65, and thus, each of the drive walls 65 makes a flexural deformation to form a V shape centering on a middle portion in the Z direction. In other words, the drive walls 65 deform so that the volume of the ejection channel 61 increases.

After the volume of each of the ejection channels 61 has increased, the voltage applied between the common electrode 85 and the individual electrode 87 is set to zero. Then, the drive walls 65 are restored, and the volume of the ejection channel 61 having once increased is restored to the original volume. Thus, the internal pressure of the ejection channel 61 increases to pressurize the ink. As a result, the ink is ejected as a droplet through the nozzle hole 79. By the ink ejected from the nozzle hole 79 landing on the recording target medium P, it is possible to record the character, the image, and the like on the recording target medium P.

[Method of Manufacturing Head Chip 50]

Figure 9:
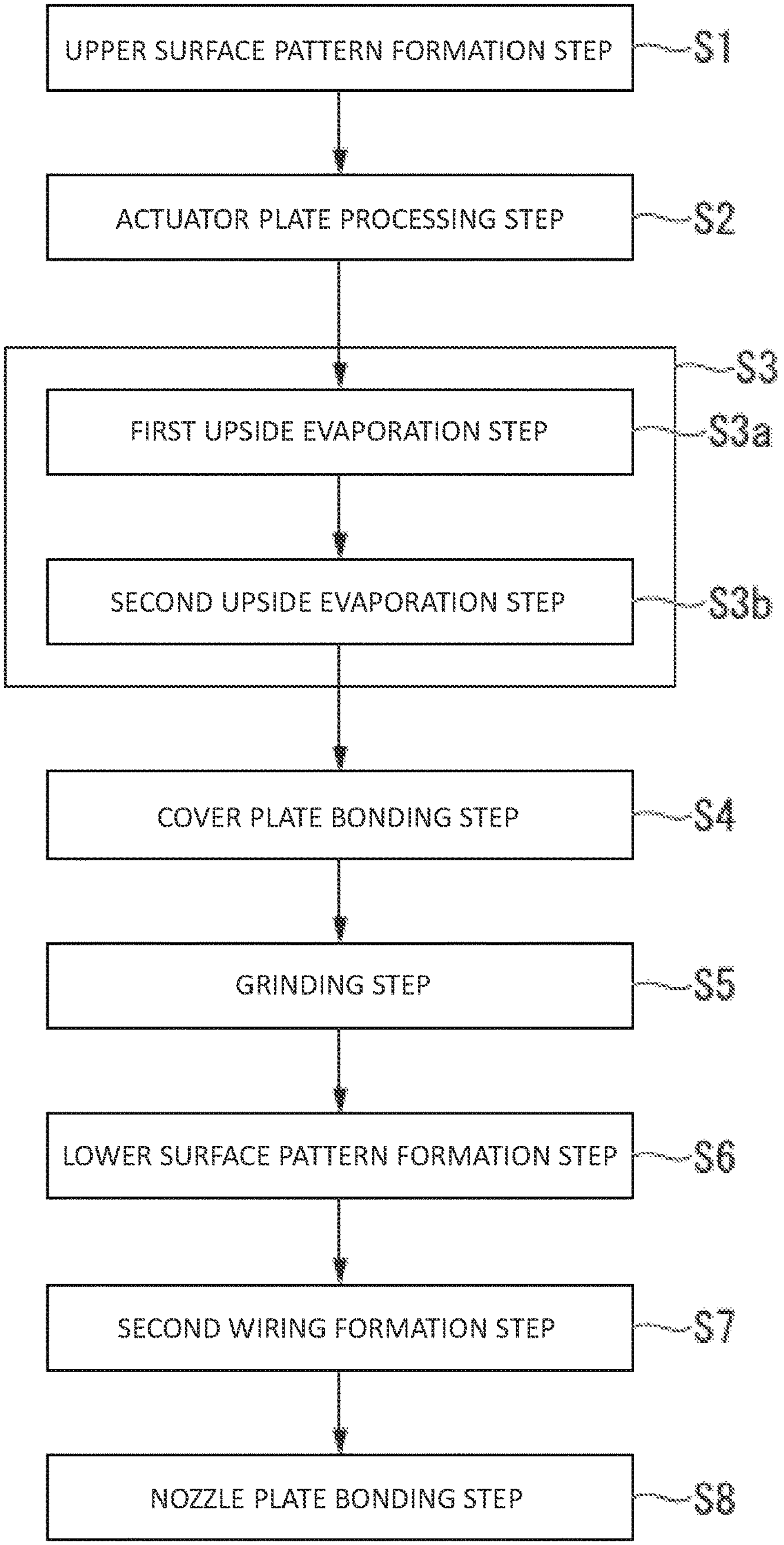
FIG. 9 is a flowchart for explaining a method of manufacturing the head chip according to the first embodiment.

Then, a method of manufacturing the head chip 50 will be described. FIG. 9 is a flowchart showing the method of manufacturing the head chip 50. FIG. 10 through FIG. 18 are each a process diagram for explaining the method of manufacturing the head chip 50. In the following description, there is described when manufacturing the head chip 50 chip by chip as an example for the sake of convenience.

As shown in FIG. 9, the method of manufacturing the head chip 50 is provided with an upper surface pattern formation step S1, an actuator plate processing step S2, a first wiring formation step S3, a cover plate bonding step S4, a grinding step S5, a lower surface pattern formation step S6, a second wiring formation step S7, and a nozzle plate bonding step S8.

In the upper surface pattern formation step S1, a mask pattern (not shown) is formed on the upper surface of the actuator plate 52. Specifically, a mask material (e.g., a resist film) is formed on the upper surface of the actuator plate 52, and then patterning is performed on the mask material using a photolithography technology. The mask pattern is provided with a mask opening formed in a portion located on the upper surface of the actuator plate 52 in a formation area of the bypass wiring 89. It should be noted that it is possible to remove an unnecessary electrical conducting material formed on the upper surface of the actuator plate 52 by laser irradiation or the like after the first wiring formation step S3 instead of the upper surface pattern formation step S1.

Figure 10:
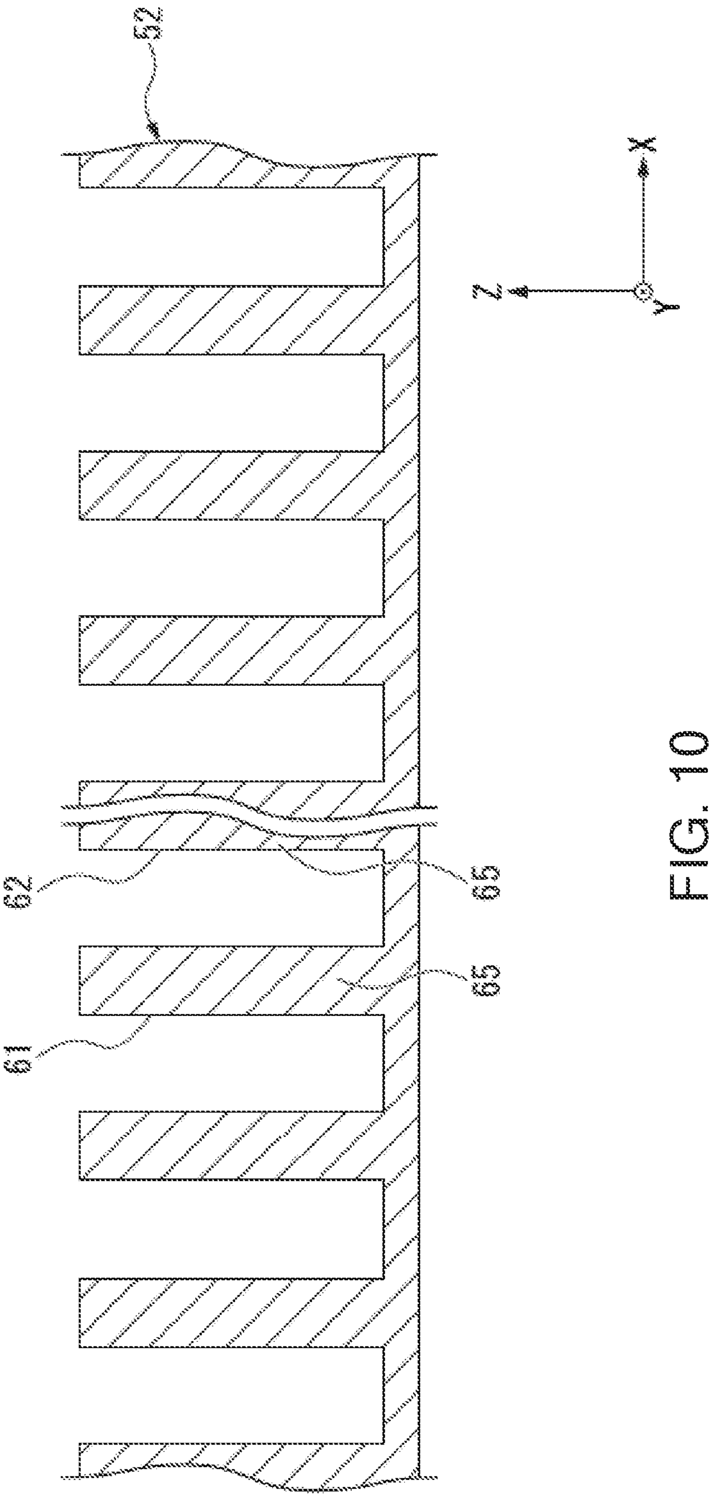
FIG. 10 is a process diagram (a cross-sectional view) for explaining the method of manufacturing the head chip according to the first embodiment.
Figure 15:
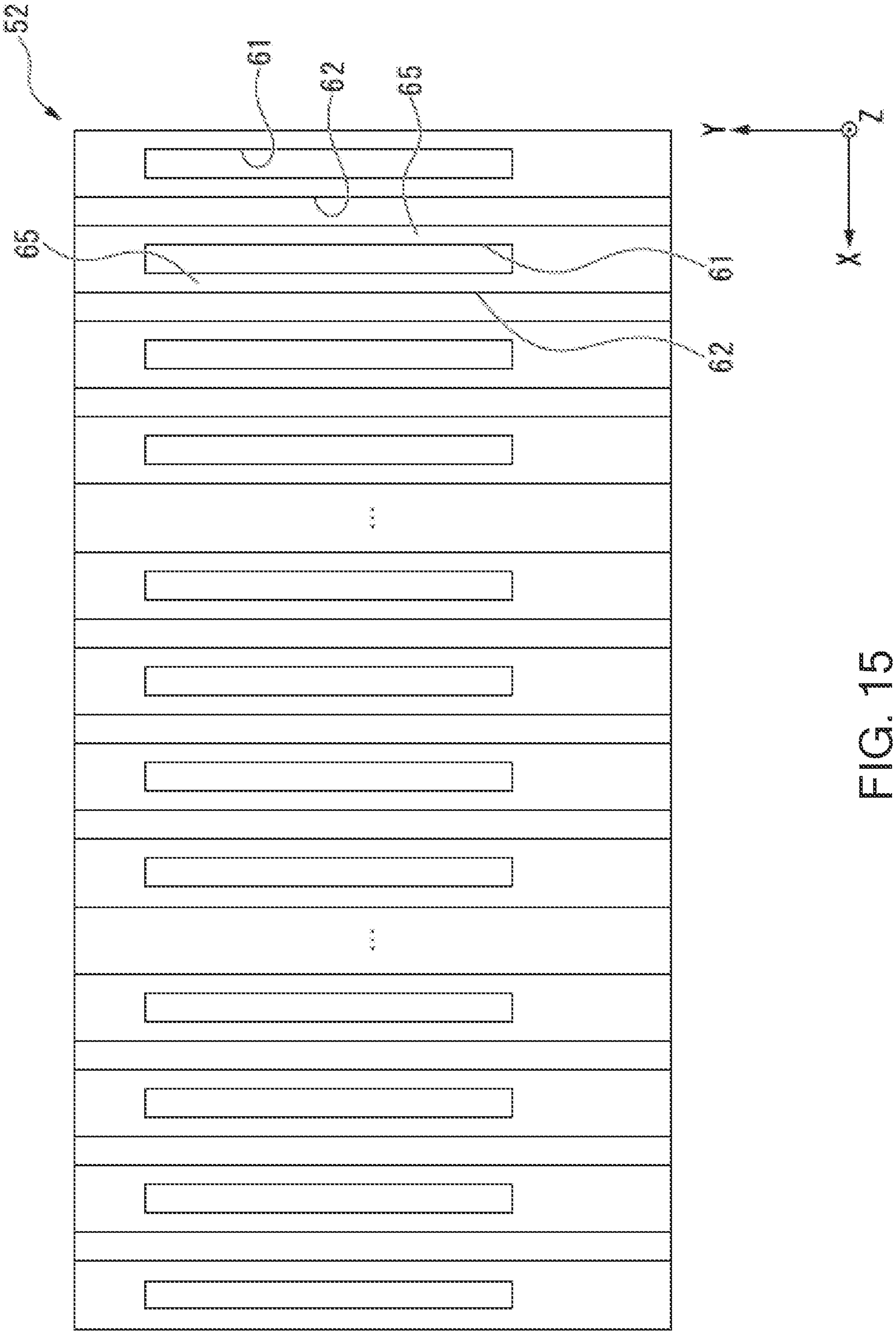
FIG. 15 is a process diagram (a plan view) for explaining the method of manufacturing the head chip according to the first embodiment.

As shown in FIG. 10 and FIG. 15, in the actuator plate processing step S2, a dicer is made to enter a formation area of the ejection channels 61 and the non-ejection channels 62 in the actuator plate 52 from above the actuator plate 52. On this occasion, a portion located in the formation area of the channels 61, 62 in the mask pattern is cut in a lump together with the actuator plate 52 by the dicer. It should be noted that an entering amount of the dicer is set larger than a finished thickness of the actuator plate 52 in the subsequent grinding step S5.

Figure 11:
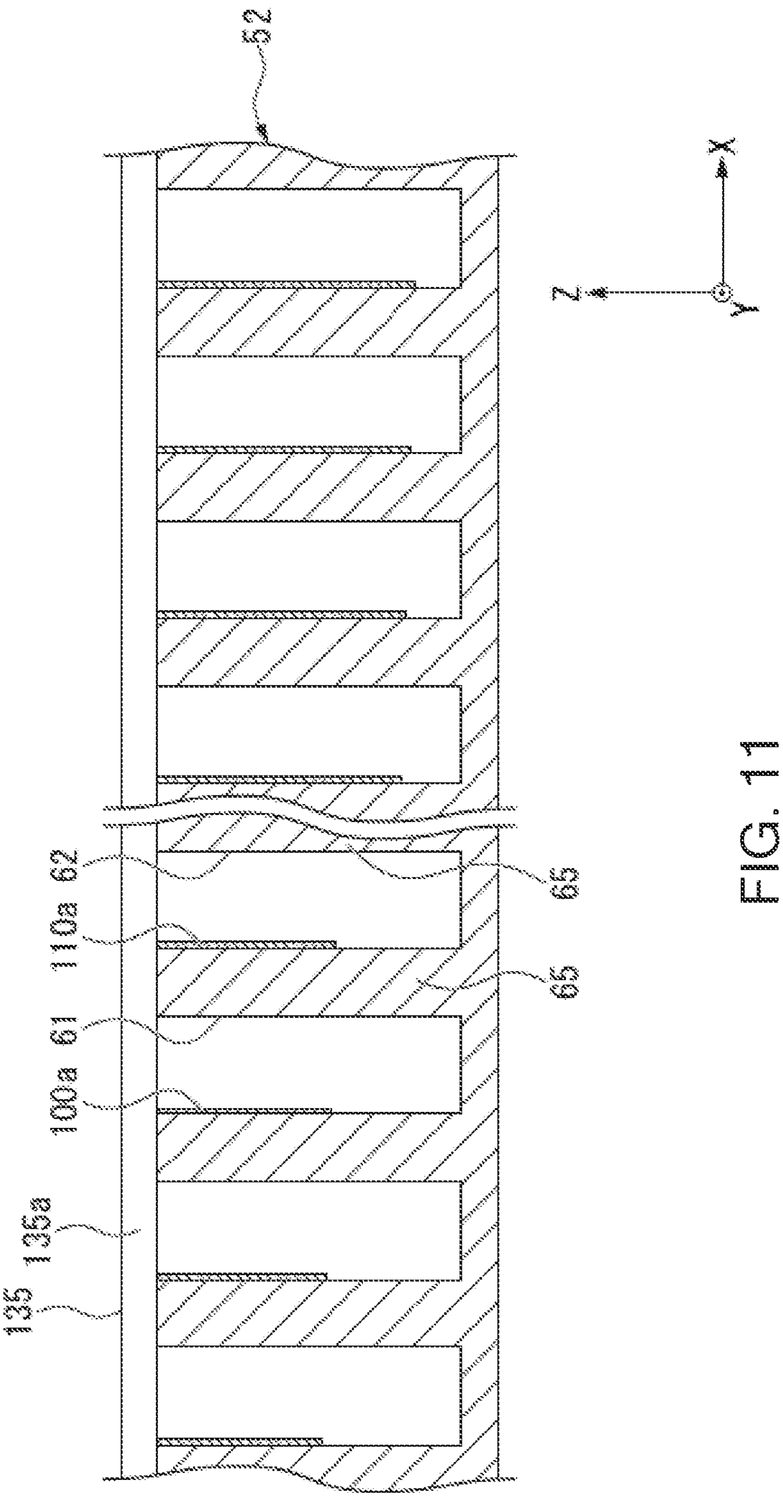
FIG. 11 is a process diagram (a cross-sectional view) for explaining the method of manufacturing the head chip according to the first embodiment.
Figure 16:
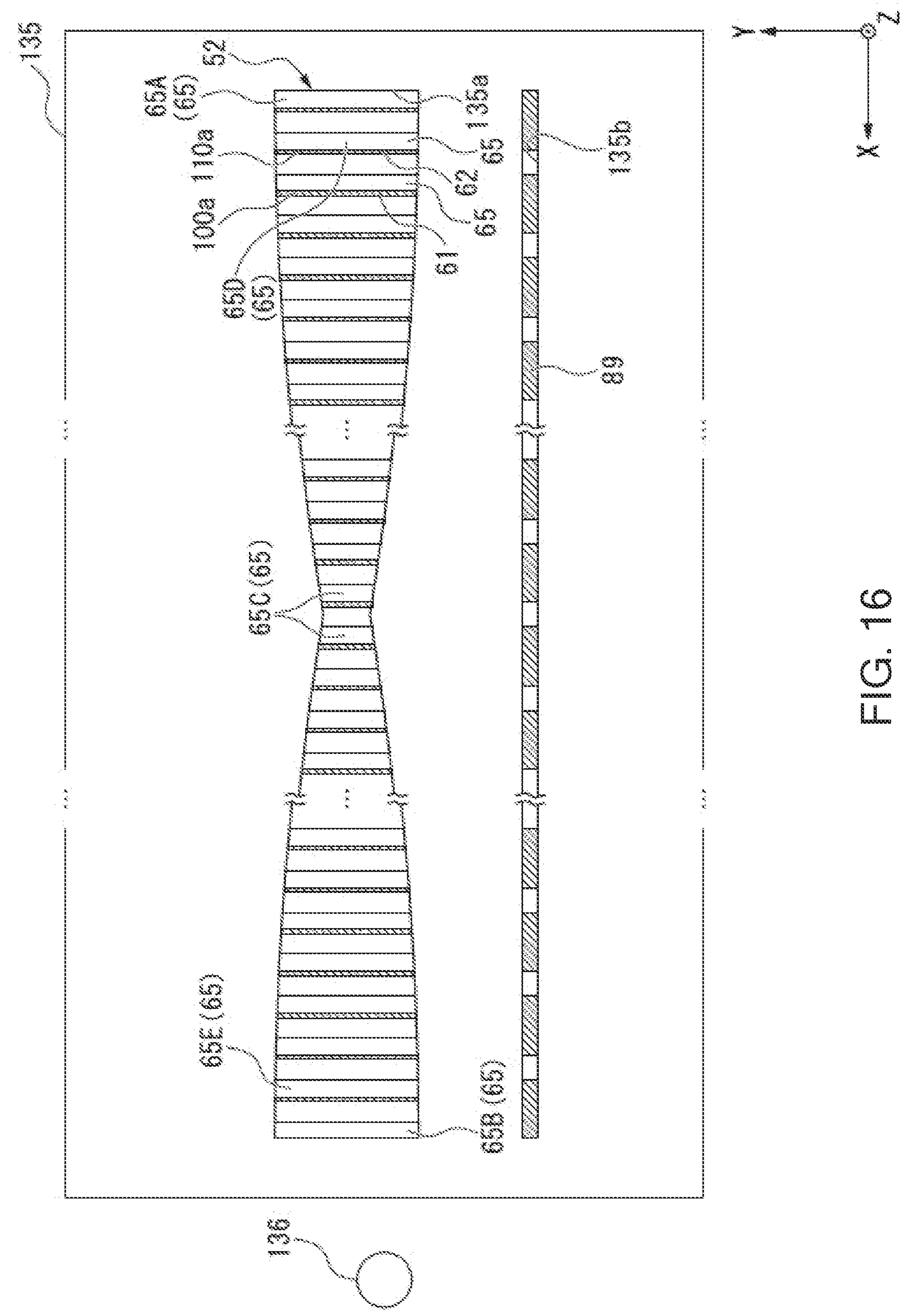
FIG. 16 is a process diagram (a plan view) for explaining the method of manufacturing the head chip according to the first embodiment.

As shown in FIG. 11 and FIG. 16, in the first wiring formation step S3, by depositing the electrode material from above the actuator plate 52, the bypass wiring 89, the upside common parts 100*a*, 101*a* and the upside individual parts 110*a*, 111*a* are formed. In the first wiring formation step S3, a first upside evaporation step (a first evaporation step) S3*a* and a second upside evaporation step (a second evaporation step) S3*b* in a state of setting an upper surface side metal mask 135 on the upper surface of the actuator plate 52. In each of the upside evaporation steps S3*a*, S3*b*, oblique evaporation of the electrode material is performed from an oblique direction crossing the upper surface of the actuator plate 52 when viewed from the Y direction. Specifically, in the first upside evaporation step S3*a*, the oblique evaporation is performed (see FIG. 16) on the +X-side surface of each of the drive walls 65 from the evaporation source 136 arranged above the actuator plate 52, and at the +X side with respect to the actuator plate 52. In the second upside evaporation step S3*b*, the oblique evaporation is performed (see FIG. 17) on the −X-side surface of each of the drive walls 65 from the evaporation source 136 arranged at the −X side with respect to the actuator plate 52.

The upper surface side metal mask 135 is provided with a first mask opening 135*a* and a second mask opening 135*b*.

As the first mask opening 135*a*, portions overlapping the formation areas of the upside common parts 100*a*, 101*a* and the upside individual parts 110*a*, 111*a* in the plan view in the upper surface side metal mask 135 open in a lump throughout the whole length of the channel column 60. The first mask opening 135*a* gradually decreases in dimension in the Y direction in directions from the both end sides toward the center in the X direction. In the first embodiment, opposed edges opposed in the Y direction to each other out of the opening edges of the first mask opening 135*a* extend inward in the Y direction in the directions from the both end sides toward the center in the X direction. As the second mask opening 135*b*, portions overlapping the formation areas of the bypass wiring 89 in the plan view in the upper surface side metal mask 135 open in a lump throughout the whole length of the channel column 60.

Figure 19:
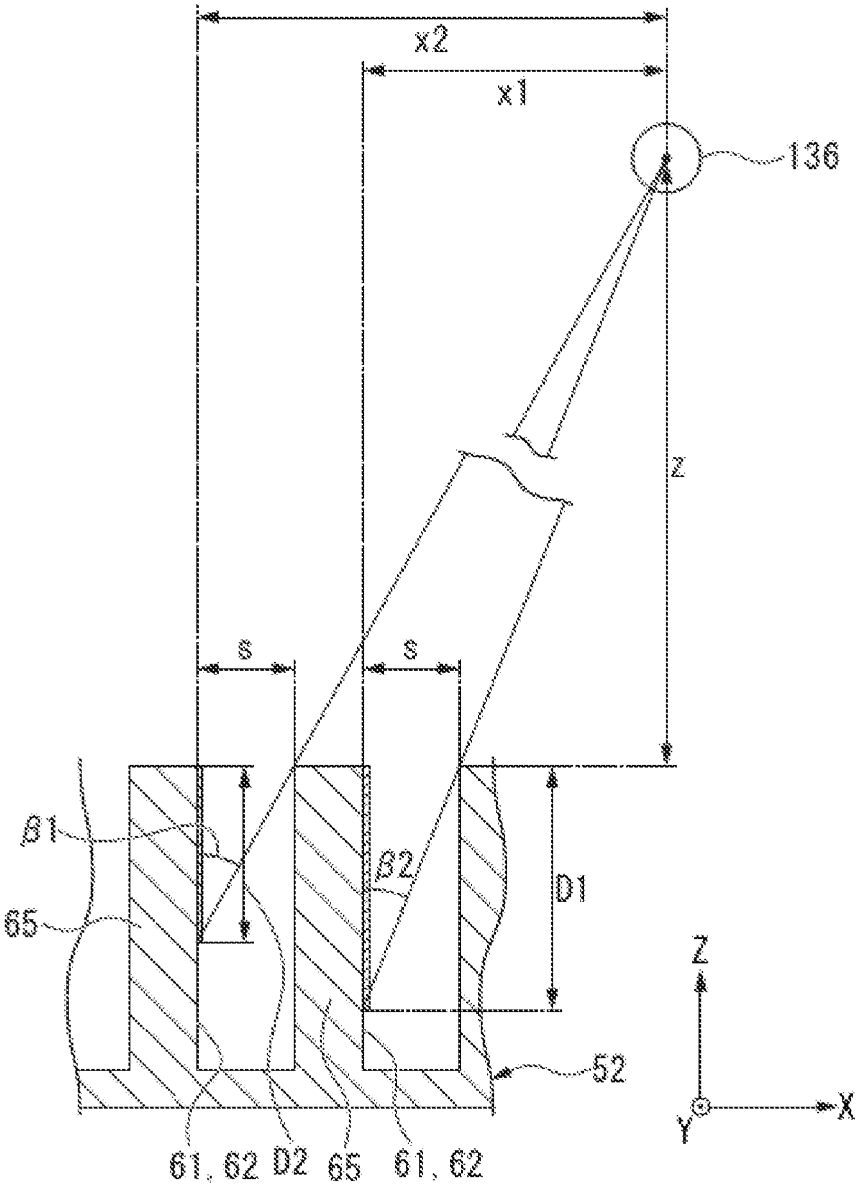
FIG. 19 is a cross-sectional view for explaining a first upside evaporation step, and shows the head chip.

A method of setting the first mask opening 135*a* will hereinafter be described. FIG. 19 is a cross-sectional view for explaining the first upside evaporation step S3*a*, and shows the head chip 50.

As shown in FIG. 19, when performing the oblique evaporation on the inner side surfaces (deposition surfaces) of each of the channels 61, 62, the evaporation depth D (D1, D2, . . . ) differs by a distance in the X direction from the evaporation source 136 to the deposition surface. Specifically, when defining the distance in the X direction between the evaporation source and the upper end opening of the channel 61, 62 as x (x1, x2, . . . ), a dimension in the Z direction between the upper surface of the actuator plate 52 and the evaporation source 136 as z, a dimension in the X direction in the upper end opening of the channel 61, 62 as s, the following formula (1) is established.

$$\tan\beta = s/D = x/z \quad (1)$$

According to the formula (1), the evaporation depth D is represented as the formula (2).

$$D = s/\tan\beta = sz/x \quad (2)$$

According to the formula (2), it is understood that the evaporation depth D decreases as tan β (β1, β2, . . . ) increases (as getting away in the X direction from the evaporation source 136).

As shown in FIG. 6 and FIG. 8, in setting the opposed regions, an electrode part small in area out of the common electrode part 100 and the individual electrode part 110 provided to one of the drive walls 65 becomes dominant. In the head chip 50, the dimension in the Y direction differs between the upside common part 100*a*, 101*a* and the downside common part 100*b*, 101*b*, and between the upside individual part 110*a*, 111*a* and the downside individual part 110*b*, 111*b*. Specifically, regarding the downside common parts 100*b*, 101*b* and the downside individual parts 110*b*, 111*b*, it is difficult to adjust the dimension in the Y direction due to the connection to the terminals 86, 88. On the other hand, when forming the upside common parts 100*a*, 101*a* to have the dimension in the Y direction larger than that of the lower end opening of the ejection channel 61, the both end portions in the Y direction are cut in the grinding step S5 together with the both end edges in the Y direction in the ejection channel 61, and there is a possibility that burrs are formed. Therefore, regarding the upside common parts 100*a*, 101*a* and the upside individual parts 110*a*, 111*a*, it is necessary to make the dimension in the Y direction smaller than that of the lower end opening (the downside common parts 100*b*, 101*b* and the downside individual parts 110*b*, 111*b*) of the ejection channel 61 in order to suppress the burrs formed in the grinding step S5. In this case, when setting the dimension in the Y direction of the upside common parts 100*a*, 101*a* and the upside individual parts 110*a*, 111*a* the same among the drive walls 65 as in the related-art head chip, the evaporation depth D of any one of the upside common parts 100*a*, 101*a* and the upside individual parts 110*a*, 111*a* becomes the smallest in the drive walls 65 located at the both end sides. Therefore, the area of the opposed region becomes the smallest in the drive walls 65 at the both end sides, and gradually increases in the directions from the drive walls 65 at the both end sides toward the drive wall 65 in the central portion.

Figure 20:
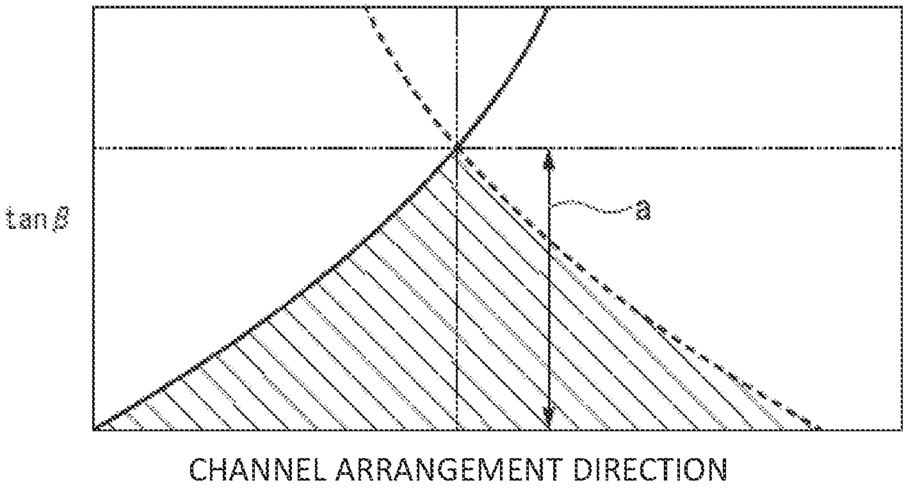
FIG. 20 is a graph showing tan β with respect to an array direction (an X direction) of channels.

FIG. 20 is a graph showing tan β (a theoretical value of the evaporation depth D) with respect to the array direction (the X direction) of the channels 61, 62. Specifically, the graph shown in FIG. 20 is obtained by plotting the values of tan β in the channels 61, 62 setting the X direction to the horizontal axis. In FIG. 20, the solid line represents the first upside evaporation step S3*a*, and the dotted line represents the second upside evaporation step S3*b*.

As shown in FIG. 20, it is understood that when assuming that the height z of the evaporation source 136 is constant, tan β increases as the distance x from the evaporation source 136 increases. According to the formula (2), since the evaporation depth D is inversely proportional to tan β, when assuming that the dimension s of the upside opening of the channels 61, 62 and the height z of the evaporation source 136 are constant, the evaporation depth D is inversely proportional to the distance in the X direction from the evaporation source 136.

Therefore, the dimensions (the evaporation lengths) in the Y direction of the upside common parts 100*a*, 101*a* and the upside individual parts 110*a*, 111*a* are adjusted in accordance with the magnitude of tan β (the evaporation depth D) in the upside common parts 100*a*, 101*a* and the upside individual parts 110*a*, 111*a* in each of the drive walls 65. Specifically, the dimension in the Y direction of the first mask opening 135*a* is adjusted so that the dimensions in the Y direction of the upside common parts 100*a*, 101*a* and the upside individual parts 110*a*, 111*a* in the drive wall 65C in the central portion become the smallest, and the dimensions in the Y direction of the upside common parts 100*a*, 101*a* and the upside individual parts 110*a*, 111*a* in the drive walls 65A, 65B, 65D, and 65E at the both end sides become the largest. In other words, defining a difference in tan β (the evaporation depth D) between the drive wall 65C in the central portion and the drive walls 65A, 65B, 65D, and 65E at the both end sides as "a," the dimension in the Y direction (the evaporation length) is made different by "a" between the drive wall 65C in the central portion and the drive walls 65A, 65B, 65D, and 65E at the both end sides. In the first embodiment, the adjustment amount of the evaporation length is distributed to the both sides in the Y direction at a rate of 1:1 among the drive walls 65. In other words, opposed edges opposed in the Y direction to each other in the first mask opening 135*a* extend inward in the Y direction in the directions from the both end sides toward the center in the X direction. It should be noted that when distributing the evaporation length to the both sides in the Y direction, the distribution rate can be other than 1:1.

As shown in FIG. 11 and FIG. 16, by performing the first upside evaporation step S3*a* using the upper surface side metal mask 135 described above, the bypass wiring 89, the first upside common part 100*a*, and the first upside individual part 110*a* are formed. Specifically, the bypass wiring 89 is formed straddling the upper surface of the actuator plate 52 and the +X-side surface of the non-ejection channel 62. Further, the first upside common part 100*a* and the first upside individual part 110*a* are formed so as to gradually decrease in dimension in the Z direction in a direction from the drive wall 65B, 65E at the +X-side end toward the drive wall 65A, 65D at the −X-side end on the one hand, and gradually decrease in dimension in the Y direction in the directions from the drive walls 65A, 65B, 65D, and 65E at the both end sides toward the drive wall 65C in the central portion on the other hand.

Figure 12:
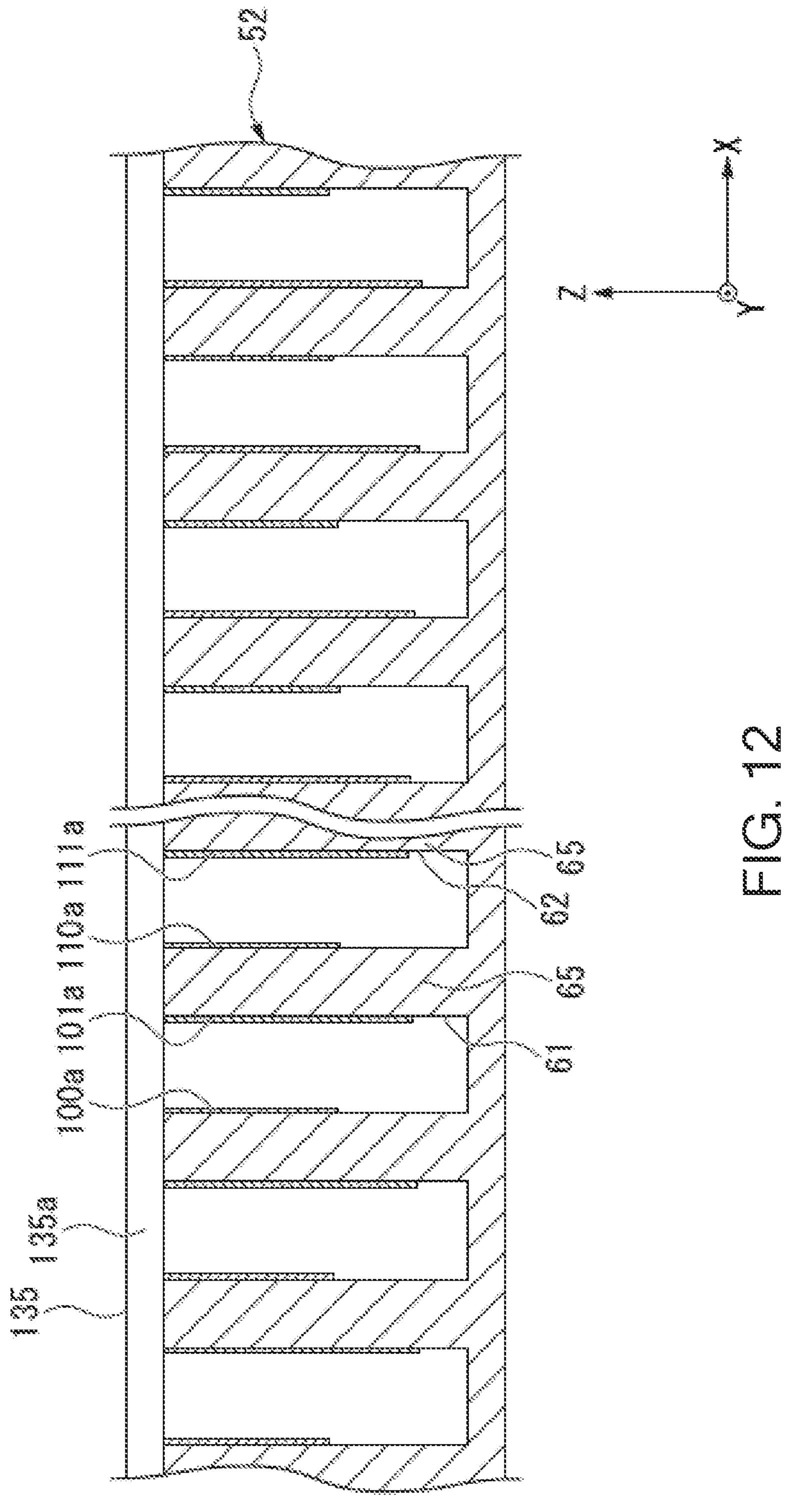
FIG. 12 is a process diagram (a cross-sectional view) for explaining the method of manufacturing the head chip according to the first embodiment.
Figure 17:
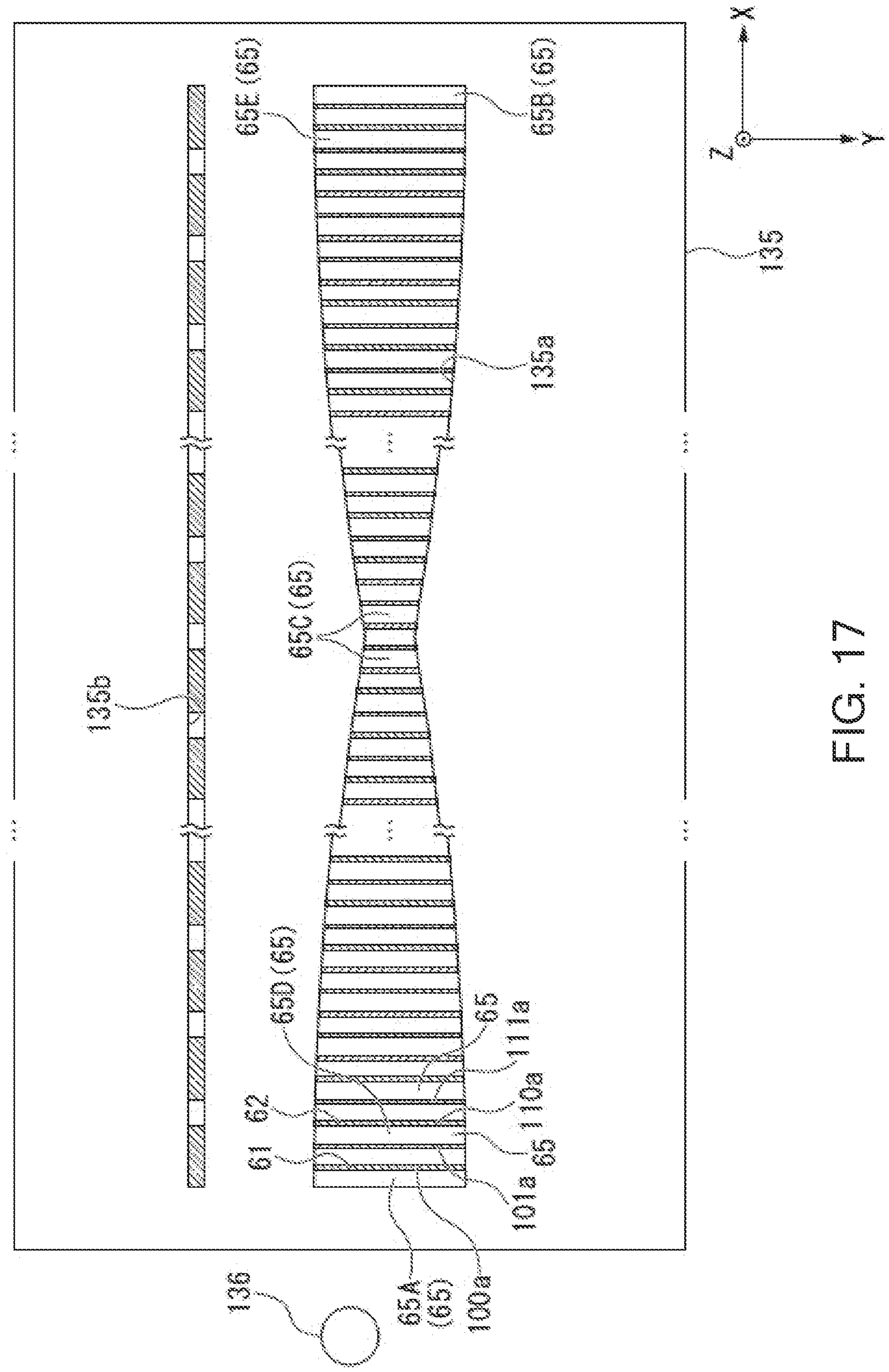
FIG. 17 is a process diagram (a plan view) for explaining the method of manufacturing the head chip according to the first embodiment.

As shown in FIG. 12 and FIG. 17, in the second upside evaporation step S3*b*, the oblique evaporation is performed on the actuator plate 52 in the state in which the actuator plate 52 is rotated 180 degrees around the center of the actuator plate 52 with respect to the first upside evaporation step S3*a*. Thus, a portion located on the upper surface of the actuator plate 52 and the −X-side surface of the non-ejection channel 62 in the bypass wiring 89 is formed. Further, the second upside common part 101*a* and the second upside individual part 111*a* are formed so as to gradually decrease in dimension in the Z direction in a direction from the drive wall 65A, 65D at the −X-side end toward the drive wall 65B, 65E at the +X-side end on the one hand, and gradually decrease in dimension in the Y direction in the directions from the drive walls 65A, 65B, 65D, and 65E at the both end sides toward the drive wall 65C in the central portion on the other hand. It should be noted that after the termination of the first wiring formation step S3, the upper surface side metal mask 135 is detached, and then the mask pattern is removed by lift-off or the like.

Figure 13:
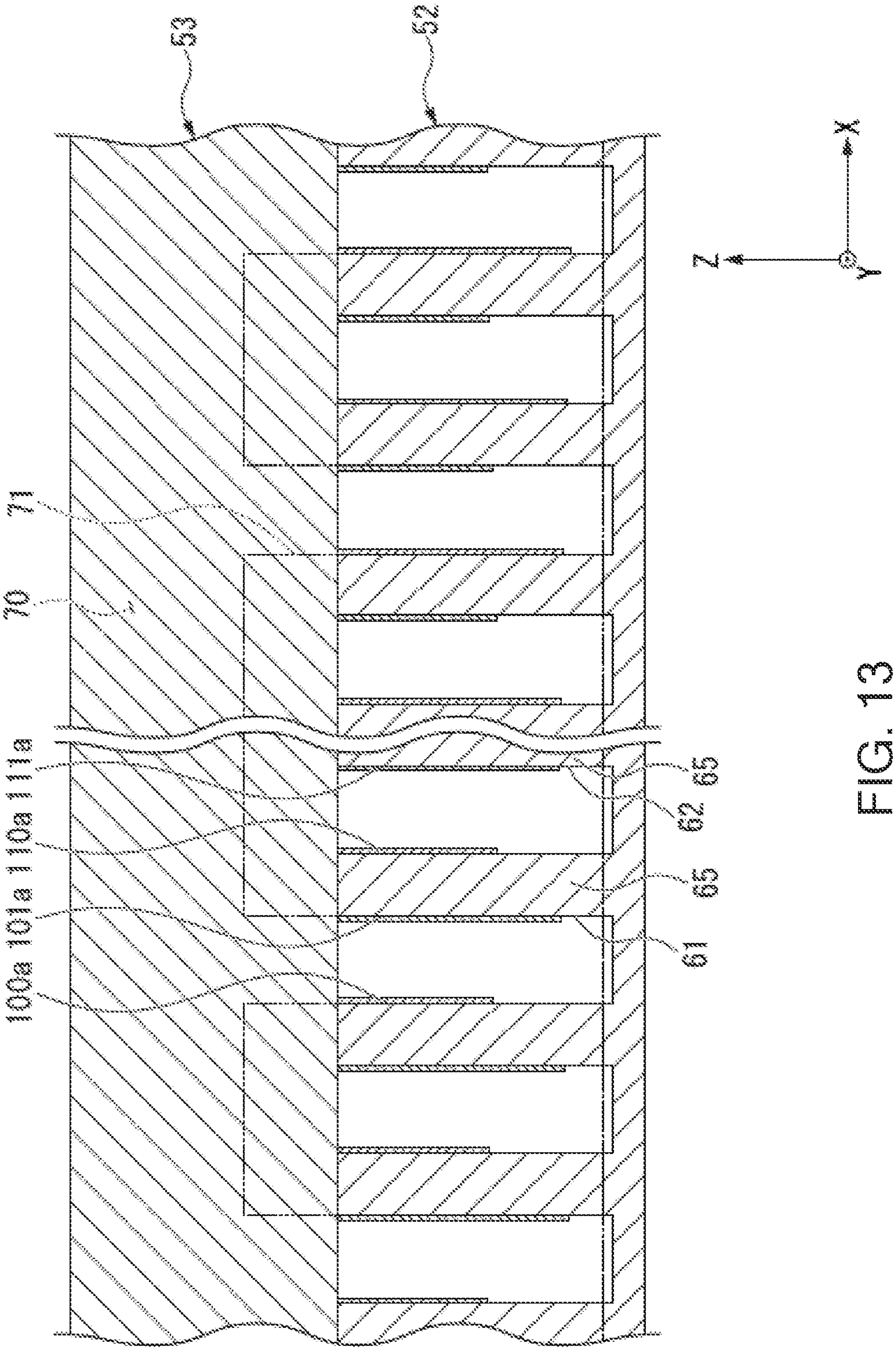
FIG. 13 is a process diagram (a cross-sectional view) for explaining the method of manufacturing the head chip according to the first embodiment.

As shown in FIG. 13, in the cover plate bonding step S4, the cover plate 53 is attached to the upper surface of the actuator plate 52 via an adhesive. Thus, there is formed a laminated body obtained by stacking the actuator plate 52 and the cover plate 53 on one another.

Figure 14:
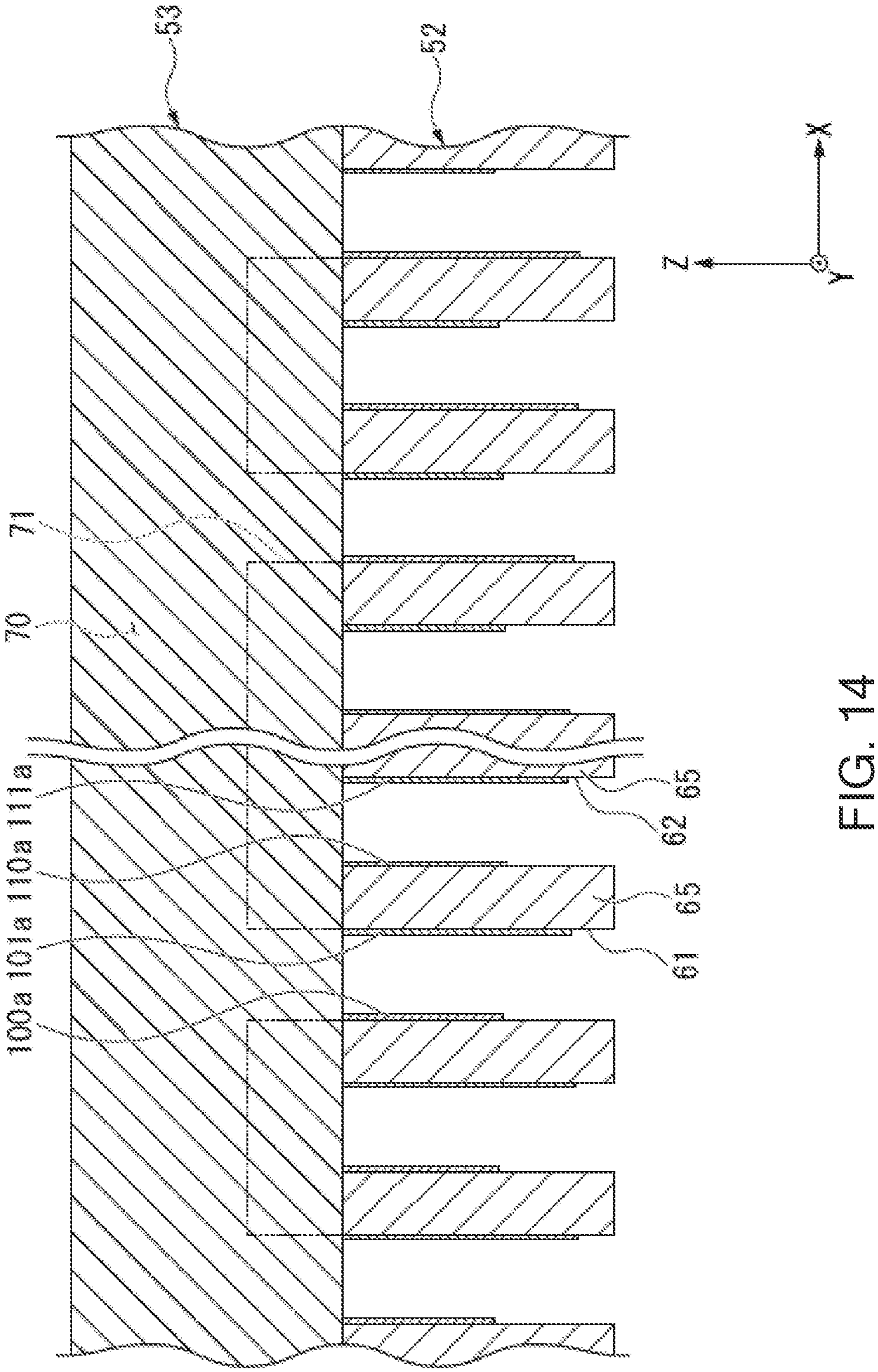
FIG. 14 is a process diagram (a cross-sectional view) for explaining the method of manufacturing the head chip according to the first embodiment.

As shown in FIG. 14, in the grinding step S5, grinding processing is performed (see the dashed-dotted line in FIG. 13) on the lower surface of the actuator plate 52. On this occasion, the actuator plate 52 is ground until the ejection channels 61 and the non-ejection channels 62 open on the lower surface of the actuator plate 52.

In the lower surface pattern formation step S6, a mask pattern (not shown) in which the formation areas of the common terminals 86 and the individual terminals 88 open is formed on the lower surface of the actuator plate 52. It should be noted that it is possible to remove an unnecessary electrical conducting material formed on the lower surface of the actuator plate 52 by laser irradiation or the like after the second wiring formation step S7 instead of the lower surface pattern formation step S6.

Figure 18:
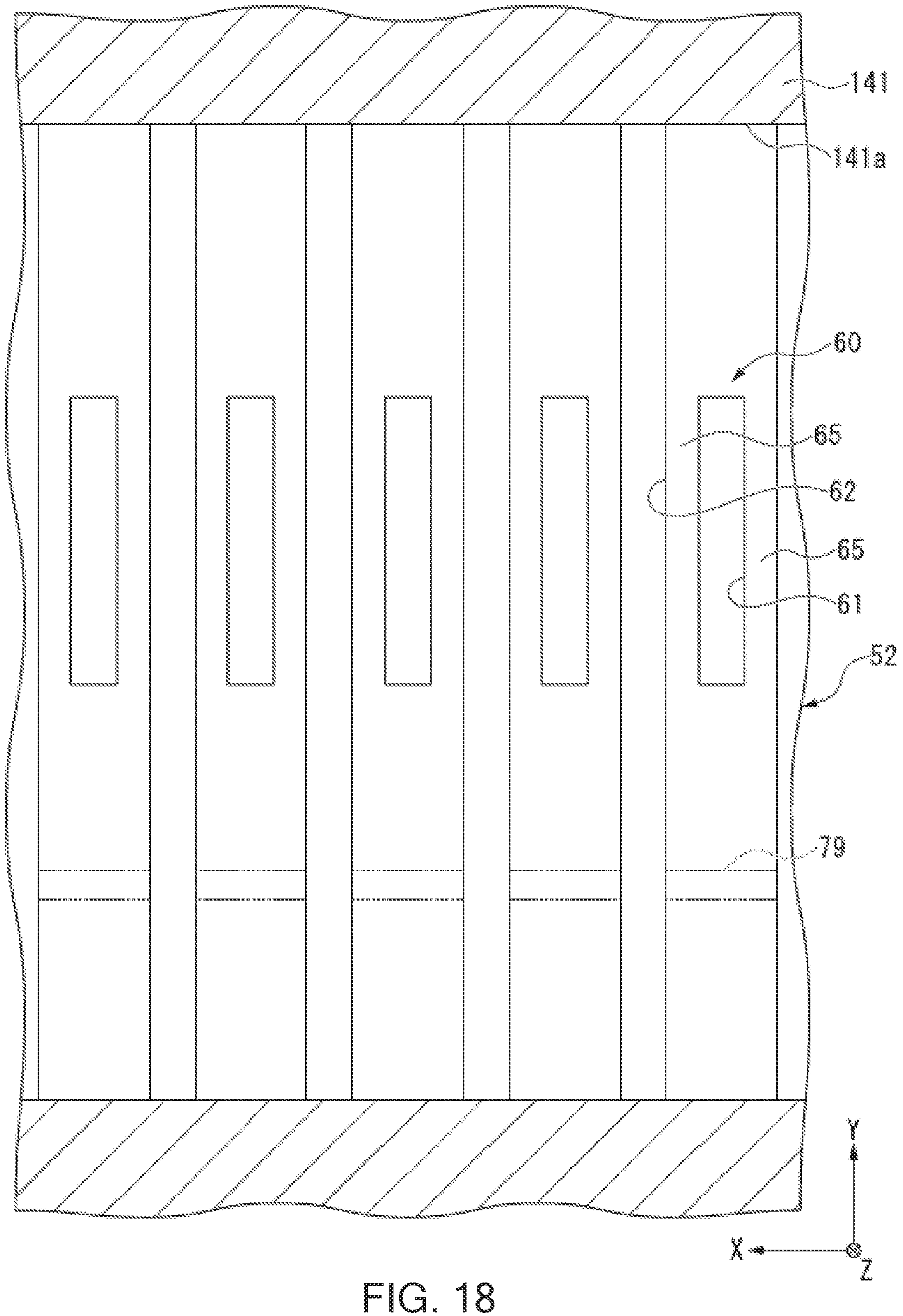
FIG. 18 is a process diagram (a plan view) for explaining the method of manufacturing the head chip according to the first embodiment.

As shown in FIG. 18, in the second wiring formation step S7, by depositing the electrode material from below the actuator plate 52, the common terminals 86, the individual terminals 88, the downside common parts 100*b*, 101*b*, and the downside individual parts 110*b*, 111*b* are formed. In the second wiring formation step S7, the oblique evaporation is performed on the actuator plate 52 from the +X side and the −X side similarly to the first wiring formation step S3 described above in the state in which the lower surface side metal mask 141 is set to the lower surface of the actuator plate 52. As a mask opening 141*a* provided to the lower surface side metal mask 141, portions overlapping the formation areas of the common terminals 86, the individual terminals 88, the downside common parts 100*b*, 101*b*, and the downside individual parts 110*b*, 111*b* in the plan view open in a lump throughout the whole length of the channel column 60. Thus, the common terminals 86 and the individual terminals 88 are formed on the lower surface of the actuator plate 52, the downside common parts 100*b*, 101*b* are formed through the lower end openings of the ejection channels 61, and the downside individual parts 110*b*, 111*b* are formed through the lower end openings of the non-ejection channels 62. It should be noted that after the termination of the second wiring formation step S7, the lower surface side metal mask 141 is detached, and then the mask pattern is removed by lift-off or the like. Further, after the second wiring formation step S7, the partitioning grooves 91 are provided to the lower surface of the actuator plate 52.

In the nozzle plate bonding step S8, the nozzle plate 51 is attached to the lower surface of the actuator plate 52 via an adhesive in a state in which the nozzle holes 79 and the ejection channels 61 are aligned with each other.

Due to the steps described hereinabove, the head chip 50 is manufactured. It should be noted that when making the intermediate plate intervene between the nozzle plate 51 and the actuator plate 52, an intermediate plate bonding step is performed between the second wiring formation step S7 and the nozzle plate bonding step S8. In the intermediate plate bonding step, the intermediate plate is bonded to the lower surface of the actuator plate 52 via an adhesive.

As described above, in the head chip 50 according to the present embodiment, there is adopted the configuration in which the first upside common part 100*a* gradually decreases in dimension in the Y direction in the directions from the drive walls 65A, 65B at the both end sides toward the drive wall 65C in the central portion, and the second upside individual part 111*a* gradually decreases in dimension in the Y direction in the directions from the drive walls 65D, 65E at the both end sides toward the drive wall 65C in the central portion. Further, there is adopted the configuration in which the second upside common part 101*a* gradually decreases in dimension in the Y direction in the directions from the drive walls 65A, 65B at the both end sides toward the drive wall 65C in the central portion, and the first upside individual part 110*a* gradually decreases in dimension in the Y direction in the directions from the drive walls 65D, 65E at the both end sides toward the drive wall 65C in the central portion.

According to this configuration, in each of the channels 61, 62 (the drive walls 65), it is possible to set the area (the effective area) of the opposed region independently of the distance from the evaporation source 136. In this case, it becomes easy to homogenize the effective area among the channels 61, 62 without changing the shapes of the channels 61, 62 (the drive walls 65). As a result, it is possible to homogenize the displacement of the drive wall 65 when ejecting the ink, and therefore, it is possible to suppress the variation in ejection performance.

Moreover, by performing the oblique evaporation using the upper surface side metal mask 135 provided with the first mask openings 135*a* gradually decreases in dimension in the Y direction in the directions from the drive walls 65A, 65B, 65D, and 65E at the both end sides toward the drive wall 65C in the central portion in the first upside evaporation step S3*a*, it becomes easy to homogenize the effective area among the channels 61, 62 without changing the existing process.

In the present embodiment, there is adopted the configuration in which the areas of the respective opposed regions are set to become the same as each other among the channels 61, 62 (the drive walls 65).

According to this configuration, by setting the effective areas to be the same among the drive walls 65, it is possible to more surely suppress the variation in ejection performance.

In the head chip 50 according to the present embodiment, there is adopted the configuration in which the both end portions in the Y direction in the opposed region are located more inner side in the Y direction in the directions from the drive walls 65A, 65B, 65D, and 65E located at the both end sides in the X direction toward the drive wall 65C in the central portion.

According to this configuration, even when the lengths in the Y direction of the respective electrode parts 100, 101 are made different among the plurality of drive walls 65, it is possible to open the nozzle hole 79 in the central portion in the Y direction with respect to the opposed region in each of the drive walls 65. Thus, it is possible to more surely suppress the variation in ejection performance among the channels 61, 62.

In the head chip 50 according to the present embodiment, there is adopted the configuration in which the common electrode parts 100, 101 are provided with the upside common parts 100*a*, 101*a* located at the upper side and the downside common parts 100*b*, 101*b* located at the lower side, the individual electrode parts 110, 111 are provided with the upside individual parts 110*a*, 111*a* located at the upper side and the downside individual parts 110*b*, 111*b* located at the lower side, and the dimension in the Y direction of the upside common parts 100*a*, 101*a* and the upside individual parts 110*a*, 111*a* in the opposed regions decreases in the directions from the drive walls 65A, 65B, 65D, and 65E at the both end sides toward the drive wall 65C in the central portion.

According to this configuration, when forming the drive wiring from the both sides in the Z direction to the actuator plate 52, the variation in effective area caused by a variation in dimension in the Z direction of the opposed area can be absorbed by the adjustment of the dimension in the Y direction in the upside common parts 100*a*, 101*a* and the upside individual parts 110*a*, 111*a*.

Since the inkjet head 5 and the printer 1 according to the present embodiment is provided with the head chip 50 described above, it is possible to provide the high-performance inkjet head 5 and the high-performance printer 1 which are small in variation of the ejection performance among the ejection channels 61.

It should be noted that in the first embodiment described above, the first mask opening 135*a* of the upper surface side metal mask 135 is set in accordance with the theoretical value of tan β, but this configuration is not a limitation. For example, it is possible to set the first mask opening 135*a* in accordance with what is obtained by performing straight-line approximation on the graph shown in FIG. 20 as the upper surface side metal mask 135 shown in FIG. 21. In this case, since the end edges opposed in the Y direction to each other in the first mask opening 135*a* can be formed in a straight line, it is possible to improve the workability of the upper surface side metal mask 135.

Figure 21:
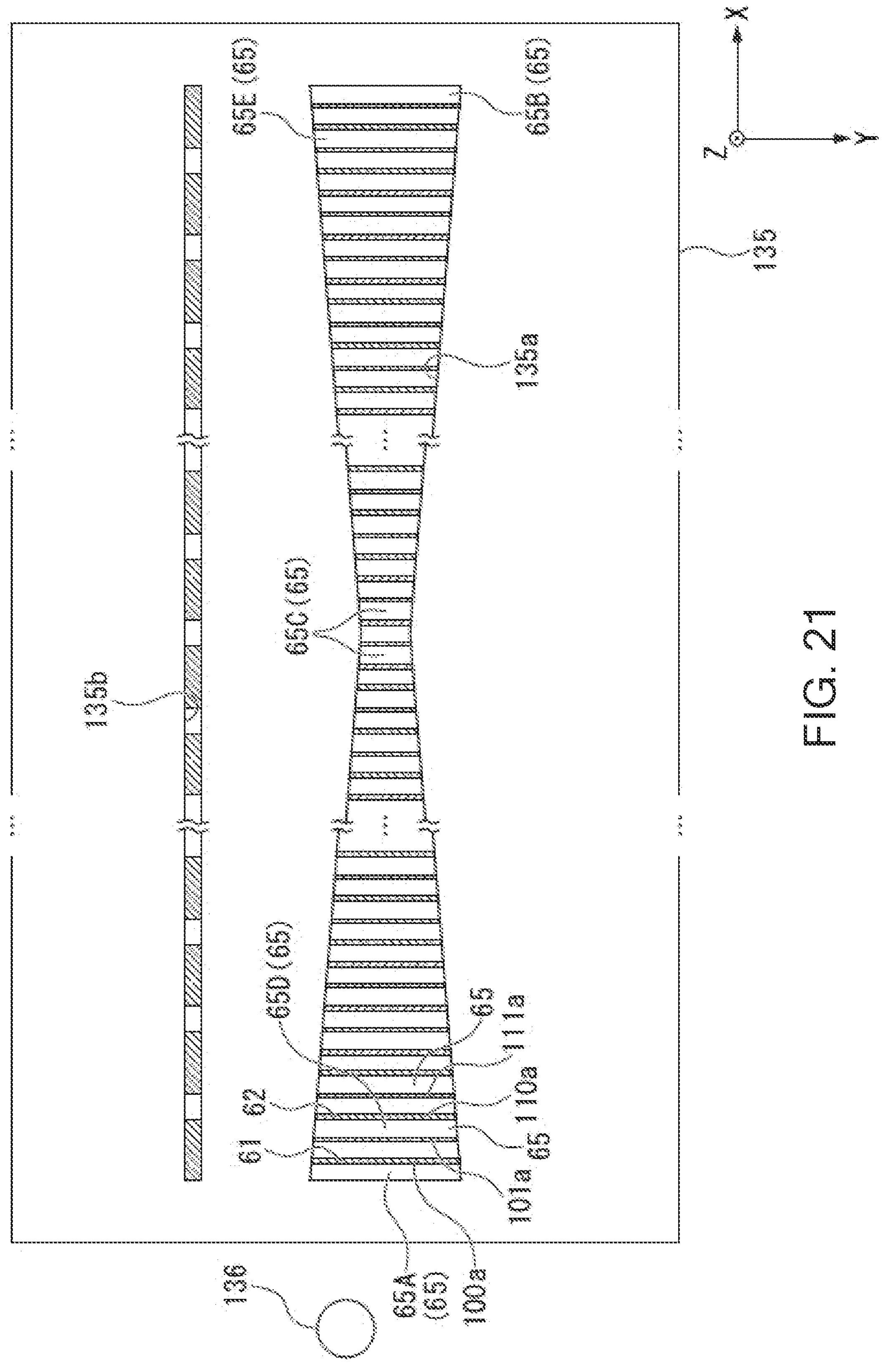
FIG. 21 is a process diagram (a plan view) for explaining a method of manufacturing a head chip according to a modified example.
Figure 22:
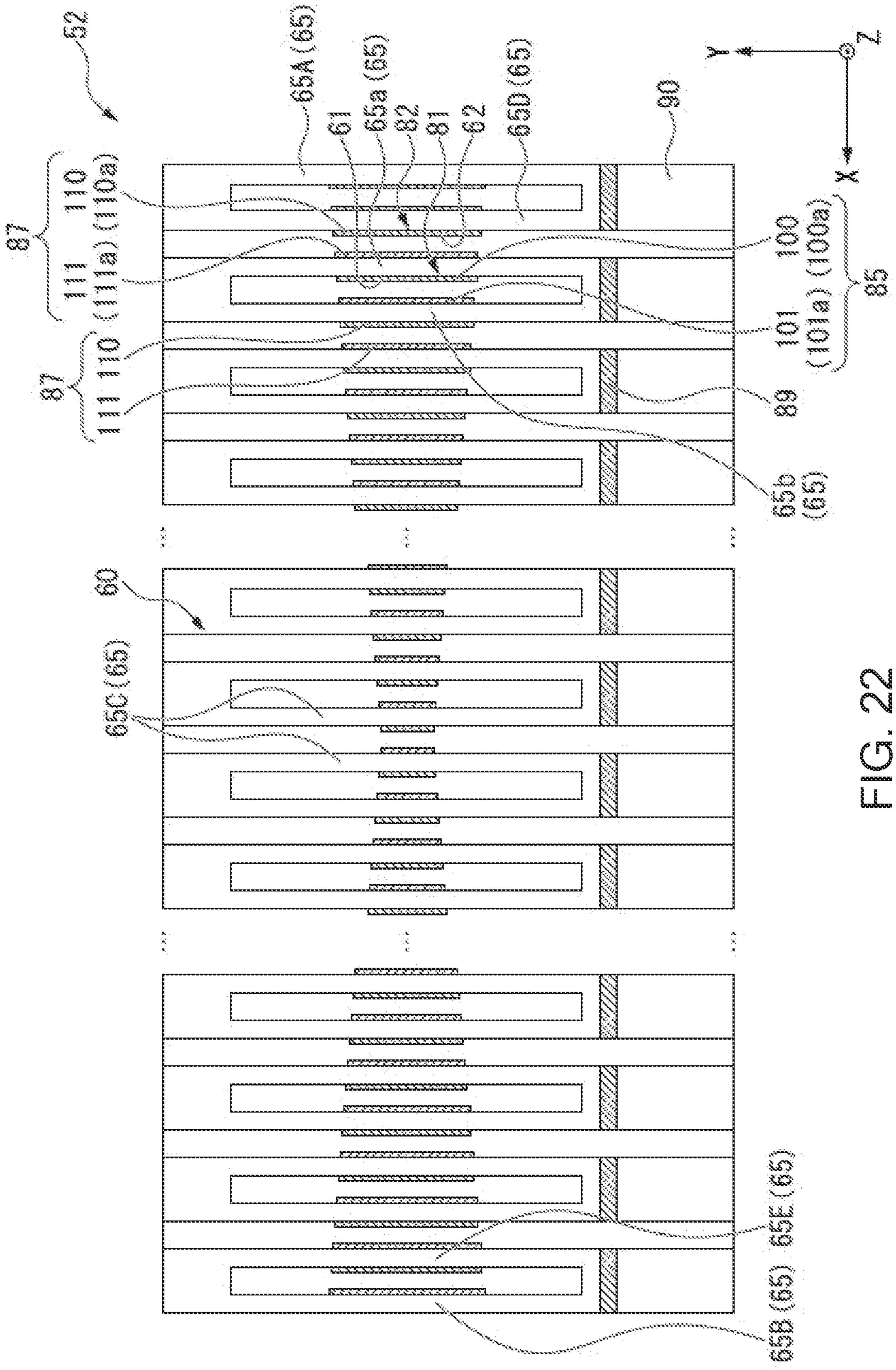
FIG. 22 is a plan view of a head chip according to a modified example.

Further, by performing the first wiring formation step S3 using the upper surface side metal mask 135 shown in FIG. 21, the dimensions in the Y direction of the upside common parts 100*a*, 101*a* and the upside individual parts 110*a*, 111*a* linearly decrease in the directions from the drive walls 65A, 65B, 65D, and 65E at the both end sides toward the drive wall 65C in the central portion as shown in FIG. 22.

It is possible to set the first mask opening 135*a* in accordance with a result of a simulation of a capacitance in each of the drive walls 65 in the related-art head chip. It should be noted that the related-art head chip means a head chip in which the dimensions in the Y direction of the upside common part and the upside individual part are the same among the drive walls 65.

Figure 23:
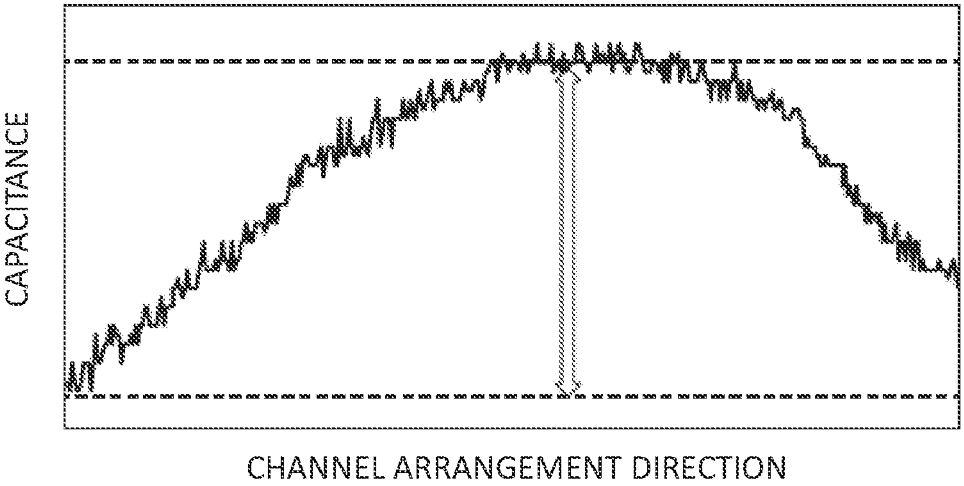
FIG. 23 is a graph showing a capacitance with respect to the array direction (the X direction) of channels.

FIG. 23 is a graph showing the level of the capacitance in each of the drive walls 65 with respect to the array direction (the X direction) of the channels 61, 62 in the related-art head chip.

As the graph shown in FIG. 23, in the related-art head chip, since the area of the opposed region gradually increases in the directions from the drive walls 65A, 65B, 65D, and 65E at the both end sides toward the drive wall 65C in the central portion, the capacitance also increases gradually in the directions from the drive walls 65A, 65B, 65D, and 65E at the both end sides toward the drive wall 65C in the central portion. Therefore, also when adjusting the dimension in the Y direction of the upside common parts 100*a*, 101*a* and the upside individual parts 110*a*, 111*a* in accordance with the level of the capacitance in each of the drive walls 65, similarly to the first embodiment described above, the dimension in the Y direction of the first mask opening 135*a* is adjusted so that the dimensions in the Y direction of the upside common parts 100*a*, 101*a* and the upside individual parts 110*a*, 111*a* in the drive wall 65C in the central portion become the smallest, and the dimensions in the Y direction of the upside common parts 100*a*, 101*a* and the upside individual parts 110*a*, 111*a* in the drive walls 65A, 65B, 65D, and 65E at the both end sides become the largest. It should be noted that the levels of the capacitances in the respective drive walls 65 are plotted in a circular arc shape as a whole of the channel column 60. Therefore, when setting the first mask opening 135*a* in accordance with the level of the capacitance as shown in FIG. 24, the end edges opposed in the Y direction to each other in the first mask opening 135*a* are formed in a circular arc shape convex inward in the Y direction in a direction toward the center in the X direction.

Figure 24:
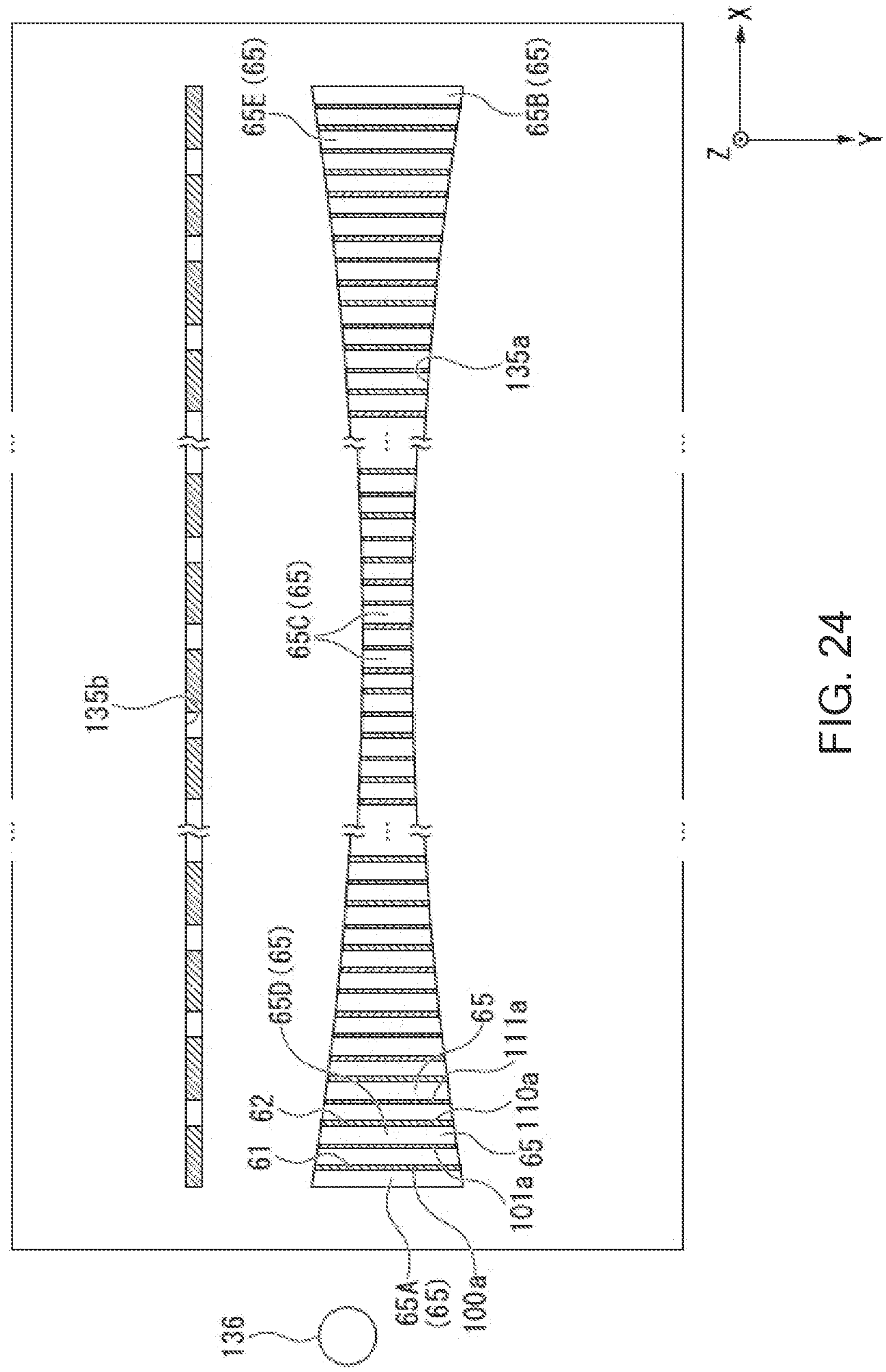
FIG. 24 is a process diagram (a plan view) for explaining a method of manufacturing a head chip according to a modified example.
Figure 25:
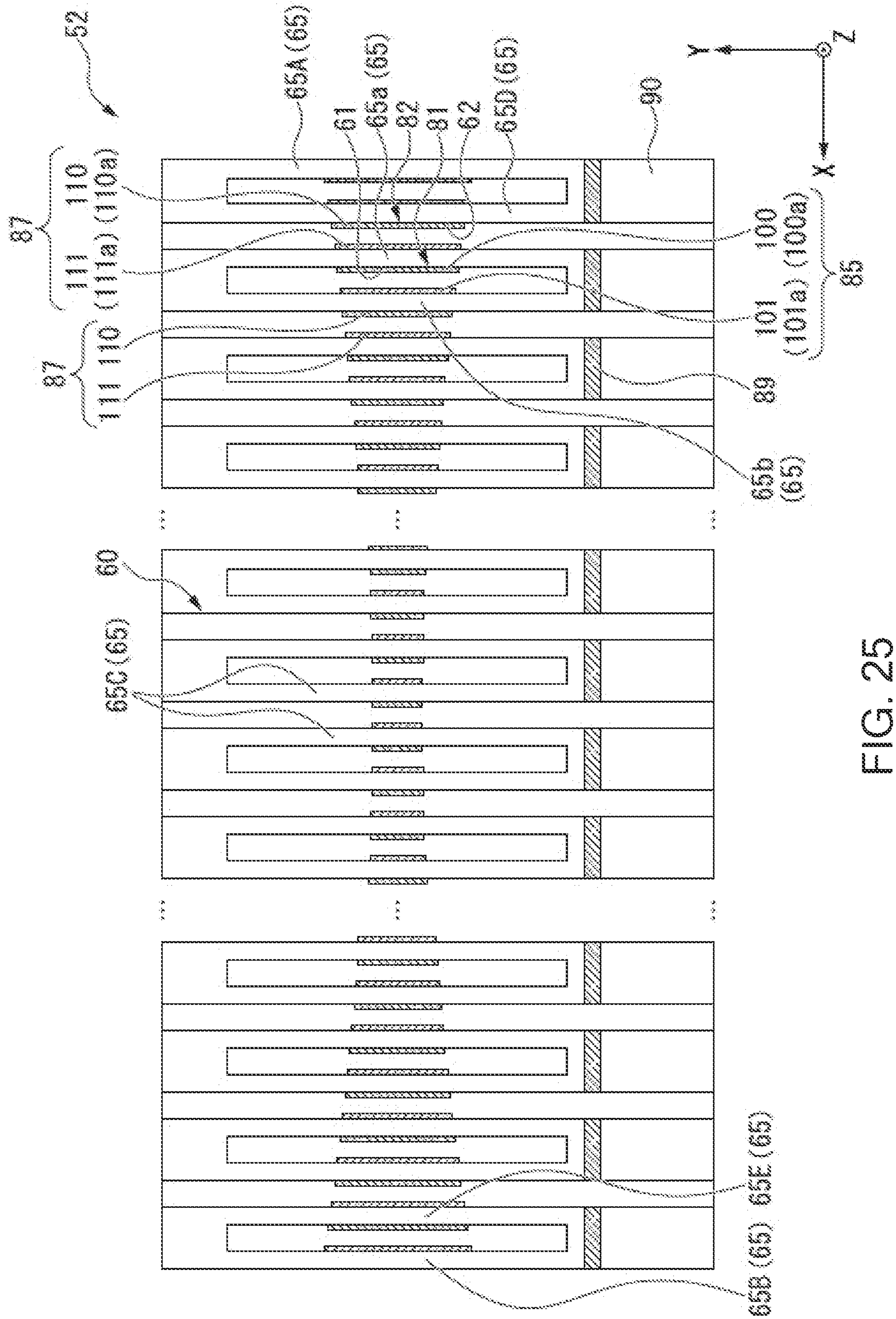
FIG. 25 is a plan view of a head chip according to a modified example.

Further, by performing the first wiring formation step S3 using the upper surface side metal mask 135 shown in FIG. 24, the dimensions in the Y direction of the upside common parts 100*a*, 101*a* and the upside individual parts 110*a*, 111*a* decrease along a circular arc shape in the directions from the drive walls 65A, 65B, 65D, and 65E at the both end sides toward the drive wall 65C in the central portion as shown in FIG. 25.

Second Embodiment

Figure 26:
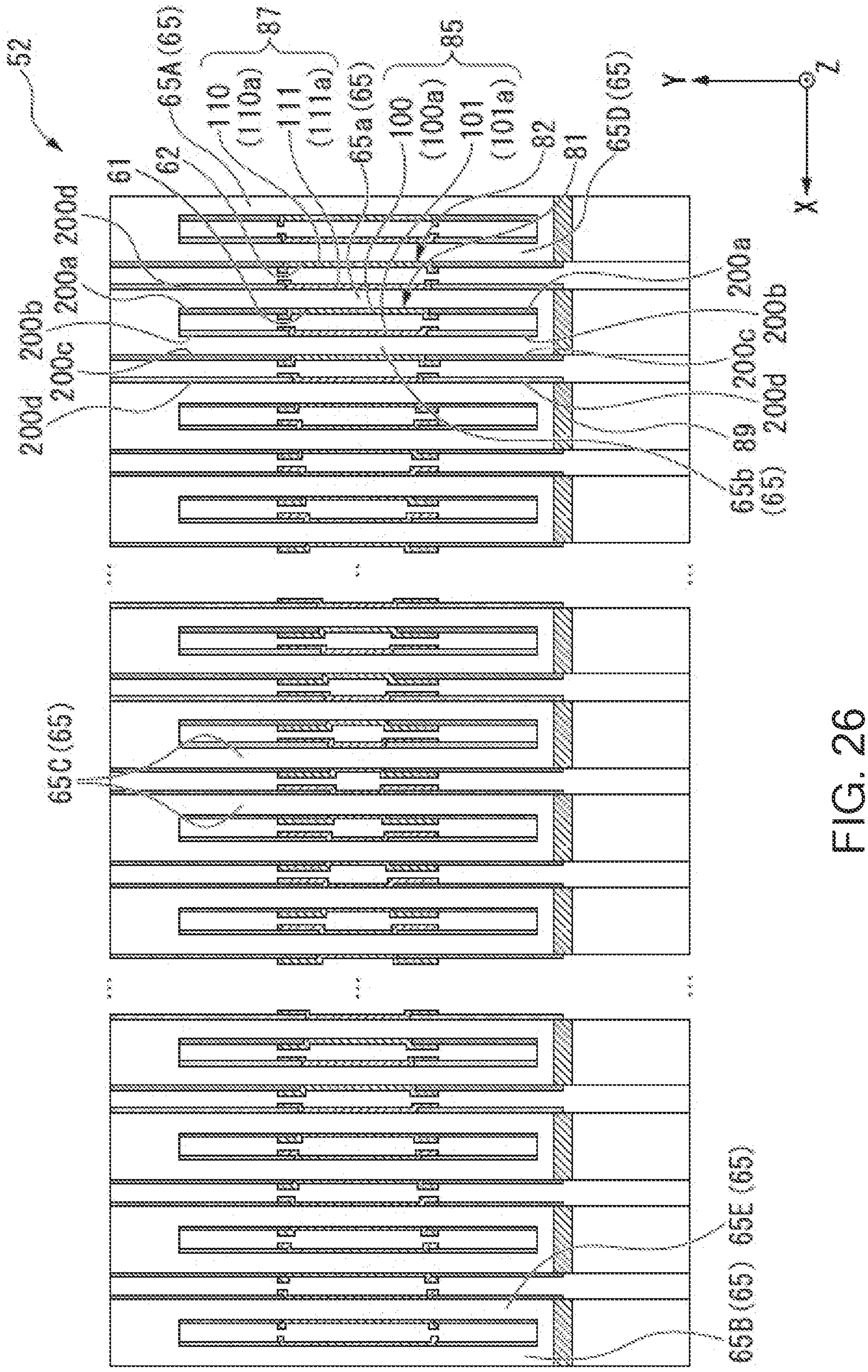
FIG. 26 is a plan view of a head chip according to a second embodiment.

FIG. 26 is a plan view of the head chip 50 according to a second embodiment. The second embodiment is different from the first embodiment in the point that in the second embodiment, the adjustment of the opposed regions is performed by making low-dielectric films 200*a* through 200*d* intervene between the upside common part 100*a* and the drive wall 65, and between the upside individual part 110*a* and the drive wall 65.

As shown in FIG. 26, the low-dielectric films 200*a* through 200*d* include a first common-side low-dielectric film 200*a*, a second common-side low-dielectric film 200*b*, a first individual-side low-dielectric film 200*c*, and a second individual-side low-dielectric film 200*d*. The low-dielectric films 200*a* through 200*d* are each a thin film formed of a material (e.g., SiO2) low in dielectric constant.

The first common-side low-dielectric films 200*a* are formed as a pair of films in the both end portions in the Y direction on the +X-side surface out of the inner side surfaces of each of the ejection channels 61. An upper end edge of the first common-side low-dielectric film 200*a* reaches the upper end opening edge of the ejection channel 61. The dimension in the Z direction of the first common-side low-dielectric film 200*a* gradually decreases in the direction from the drive wall 65 at the +X-side end toward the drive wall 65 at the −X-side end similarly to the first upside common part 100*a* formed on the +X-side surface of corresponding one of the ejection channels 61.

The dimensions in the Y direction in the pair of first common-side low-dielectric films 200*a* formed on the +X-side surface of each of the ejection channels 61 gradually increase in the directions from the drive walls 65A, 65B at the both end sides toward the drive wall 65C in the central portion. In the pair of first common-side low-dielectric films 200*a* formed on the +X-side surface of each of the ejection channels 61, the positions of the outside end edges in the Y direction coincide among the ejection channels 61. The positions of the inside end edges in the Y direction in the pair of first common-side low-dielectric films 200*a* formed on the +X-side surface of each of the ejection channels 61 are located more inner in the Y direction in the directions from the drive walls 65A, 65B at the both end sides toward the drive wall 65C in the central portion.

The second common-side low-dielectric films 200*b* are formed as a pair of films in the both end portions in the Y direction on the −X-side surface out of the inner side surfaces of each of the ejection channels 61. An upper end edge of the second common-side low-dielectric film 200*b* reaches the upper end opening edge of the ejection channel 61. The dimension in the Z direction of the second common-side low-dielectric film 200*b* gradually decreases in the direction from the drive wall 65A at the −X-side end toward the drive wall 65B at the +X-side end similarly to the second upside common part 101*a* formed on the −X-side surface of corresponding one of the ejection channels 61.

The dimensions in the Y direction in the pair of second common-side low-dielectric films 200*b* formed on the −X-side surface of each of the ejection channels 61 gradually increase in the directions from the drive walls 65A, 65B at the both end sides toward the drive wall 65C in the central portion. In the pair of second common-side low-dielectric films 200*b* formed on the −X-side surface of each of the ejection channels 61, the positions of the outside end edges in the Y direction coincide among the ejection channels 61. The positions of the inside end edges in the Y direction in the pair of second common-side low-dielectric films 200*b* formed on the −X-side surface of each of the ejection channels 61 are located more inner in the Y direction in the directions from the drive walls 65A, 65B at the both end sides toward the drive wall 65C in the central portion.

The first individual-side low-dielectric films 200*c* are formed as a pair of films in portions overlapping the both end portions in the Y direction in the ejection channel 61 in a side view on the +X-side surface out of the inner side surfaces of each of the non-ejection channels 62. An upper end edge of the first individual-side low-dielectric film 200*c* reaches the upper end opening edge of the non-ejection channel 62. The dimension in the Z direction of the first individual-side low-dielectric film 200*c* gradually decreases in the direction from the drive wall 65E at the +X-side end toward the drive wall 65D at the −X-side end similarly to the first upside individual part 110*a* formed on the +X-side surface of corresponding one of the non-ejection channels 62.

The dimensions in the Y direction in the pair of first individual-side low-dielectric films 200*c* formed on the +X-side surface of each of the non-ejection channels 62 gradually increase in the directions from the drive walls 65D, 65E at the both end sides toward the drive wall 65C in the central portion. In the pair of first individual-side low-dielectric films 200*c* formed on the +X-side surface of each of the non-ejection channels 62, the positions of the outside end edges in the Y direction coincide among the non-ejection channels 62. The positions of the inside end edges in the Y direction in the pair of first individual-side low-dielectric films 200*c* formed on the +X-side surface of each of the non-ejection channels 62 are located more inner in the Y direction in the directions from the drive walls 65D, 65E at the both end sides toward the drive wall 65C in the central portion.

The second individual-side low-dielectric films 200*d* are formed as a pair of films in portions overlapping the both end portions in the Y direction in the ejection channel 61 in a side view on the −X-side surface out of the inner side surfaces of each of the non-ejection channels 62. An upper end edge of the second individual-side low-dielectric film 200*d* reaches the upper end opening edge of the non-ejection channel 62. The dimension in the Z direction of the second individual-side low-dielectric film 200*d* gradually decreases in the direction from the drive wall 65D at the −X-side end toward the drive wall 65E at the +X-side end similarly to the second upside individual part 111*a* formed on the −X-side surface of corresponding one of the non-ejection channels 62.

The dimensions in the Y direction in the pair of second individual-side low-dielectric films 200*d* formed on the −X-side surface of each of the non-ejection channels 62 gradually increase in the directions from the drive walls 65D, 65E at the both end sides toward the drive wall 65C in the central portion. In the pair of second individual-side low-dielectric films 200*d* formed on the −X-side surface of each of the non-ejection channels 62, the positions of the outside end edges in the Y direction coincide among the non-ejection channels 62. The positions of the inside end edges in the Y direction in the pair of second individual-side low-dielectric films 200*d* formed on the −X-side surface of each of the non-ejection channels 62 are located more inner in the Y direction in the directions from the drive walls 65D, 65E at the both end sides toward the drive wall 65C in the central portion.

In the second embodiment, the first upside common part 100*a* and the second upside common part 101*a* are formed so that the dimension in the Y direction is equivalent among the ejection channels 61. Specifically, the first upside common part 100*a* and the second upside common part 101*a* each extend throughout substantially the whole length in the Y direction in the ejection channel 61. In other words, the both end portions in the Y direction in the first upside common part 100*a* are arranged on the +X-side surface of the ejection channel 61 across the first common-side low-dielectric film 200*a*. In contrast, the both end portions in the Y direction in the second upside common part 101*a* are arranged on the −X-side surface of the ejection channel 61 across the second common-side low-dielectric film 200*b*.

The first upside individual part 110*a* and the second upside individual part 111*a* are formed so that the dimension in the Y direction is equivalent among the non-ejection channels 62. In the second embodiment, the first upside individual part 110*a* and the second upside individual part 111*a* are formed so as to be equivalent in dimension in the Y direction to the upside common parts 100*a*, 101*a*. The both end portions in the Y direction in the first upside individual part 110*a* are arranged on the +X-side surface of the non-ejection channel 62 across the first individual-side low-dielectric film 200*c*. In contrast, the both end portions in the Y direction in the second upside individual part 111*a* are arranged on the −X-side surface of the non-ejection channel 62 across the second individual-side low-dielectric film 200*d*.

Here, the portions overlapping the first common-side low-dielectric film 200*a* in the first upside common part 100*a* are each a portion which does not generate an electrical field with respect to the drive wall 65. The portions overlapping the second individual-side low-dielectric film 200*d* in the second upside individual part 111*a* are each a portion which does not generate an electrical field with respect to the drive wall 65. Therefore, in the first upside common part 100*a* and the second upside individual part 111*a*, the portions (the portions located at the inner side in the Y direction of the low-dielectric films 200*a*, 200*d*) having direct contact with the drive wall 65 constitute the first opposed region. In this case, the portions constituting the first opposed region in the first upside common part 100*a* and the second upside individual part 111*a* gradually decrease in dimension in the Y direction in the directions from the drive walls 65A, 65B, 65D, and 65E at the both end sides toward the drive wall 65C in the central portion. In the second embodiment, it is set that the areas of the respective first opposed regions in the respective drive walls 65 become the same.

The portions overlapping the second common-side low-dielectric film 200*b* in the second upside common part 101*a* are each a portion which does not generate an electrical field with respect to the drive wall 65. The portions overlapping the first individual-side low-dielectric film 200*c* in the first upside individual part 110*a* are each a portion which does not generate an electrical field with respect to the drive wall 65. Therefore, in the second upside common part 101*a* and the first upside individual part 110*a*, the portions (the portions located at the inner side in the Y direction of the low-dielectric films 200*b*, 200*c*) having direct contact with the drive wall 65 constitute the second opposed region. In this case, the portions constituting the second opposed region in the second upside common part 101*a* and the first upside individual part 110*a* gradually decrease in dimension in the Y direction in the directions from the drive walls 65A, 65B, 65D, and 65E at the both end sides toward the drive wall 65C in the central portion. In the second embodiment, it is set that the areas of the respective second opposed regions in the respective drive walls 65 become the same.

It should be noted that in the second embodiment, there is described the configuration in which the portion constituting the opposed region in each of the electrodes has direct contact with the drive wall 65, but this configuration is not a limitation. It is possible for a material having electrical conductivity to intervene between the drive wall 65 and each of the electrodes in a portion constituting the opposed region in each of the electrodes. In other words, even when the drive wall 65 and each of the electrodes have indirect contact with each other, it is possible to make any configurations generating the electrical field with respect to the drive wall 65 function as the opposed region. Further, the low-dielectric films 200*a* through 200*d* can run off to the outside in the Y direction of each of the electrodes as long as the low-dielectric films 200*a* through 200*d* are formed in a desired region in corresponding one of the electrodes.

Figure 27:
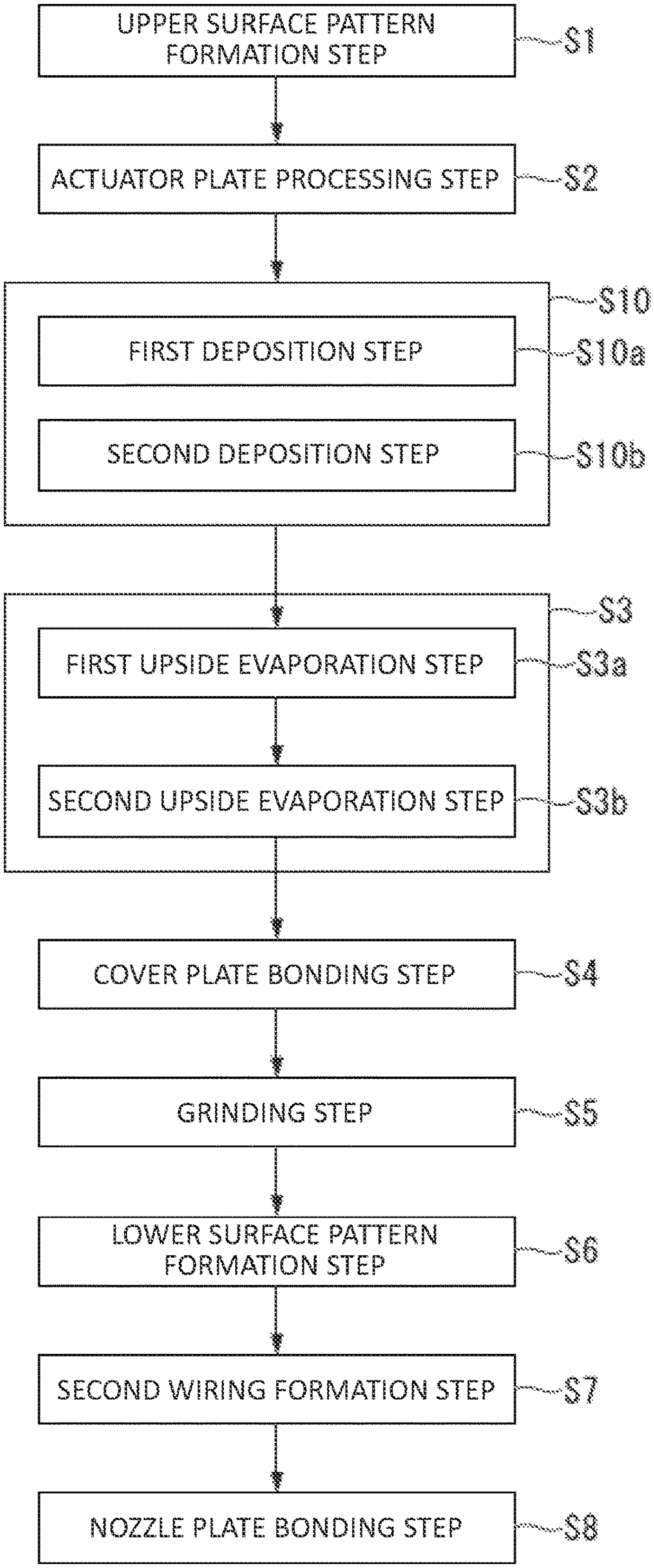
FIG. 27 is a flowchart for explaining a method of manufacturing the head chip according to the second embodiment.

Then, a method of manufacturing the head chip 50 according to the second embodiment will be described. In order to manufacture the head chip 50 according to the second embodiment, a low-dielectric film formation step S10 is performed between the actuator plate processing step S2 and the first wiring formation step S3 as shown in FIG. 27.

Figure 28:
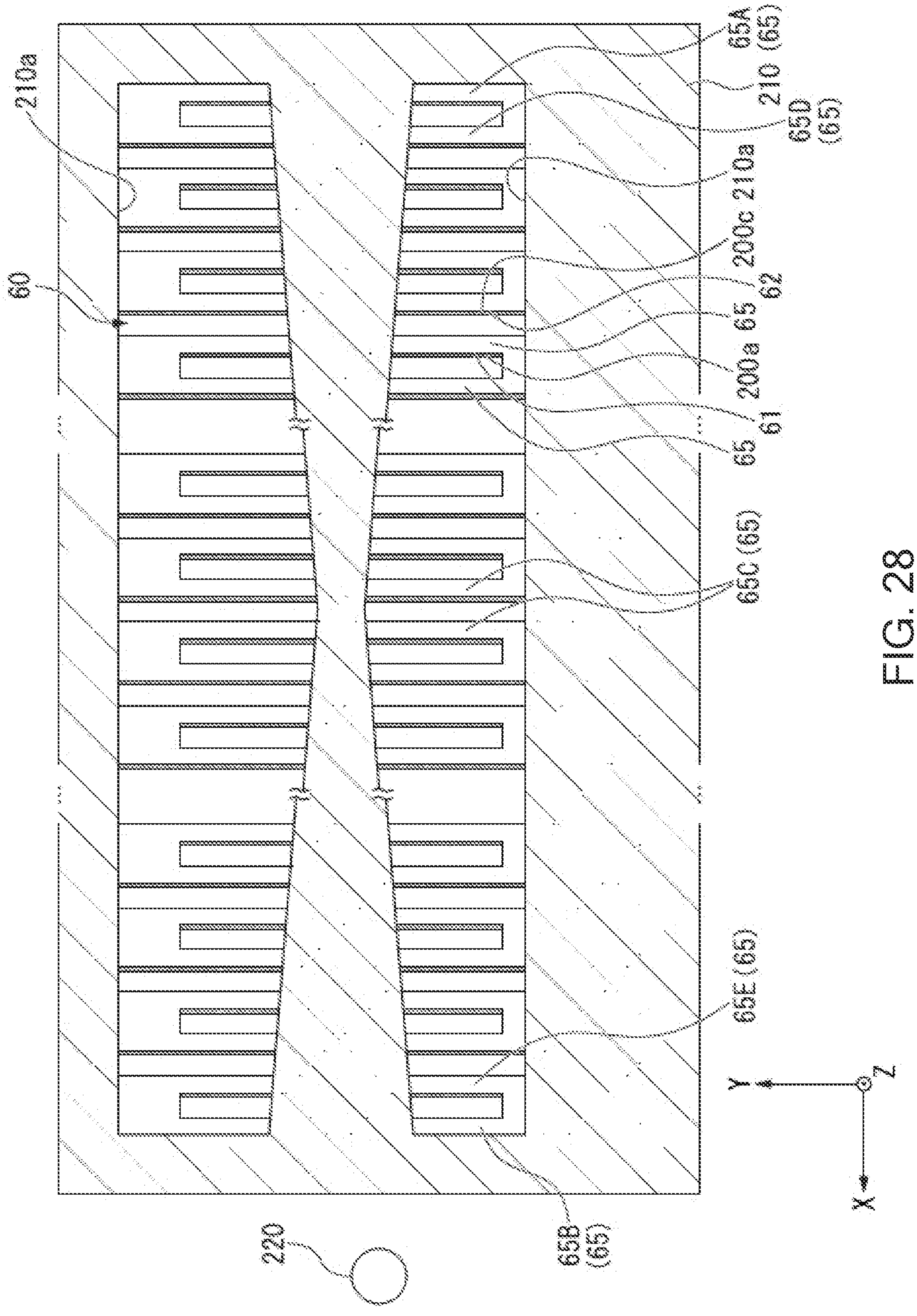
FIG. 28 is a process diagram (a plan view) for explaining the method of manufacturing the head chip according to the second embodiment.
Figure 29:
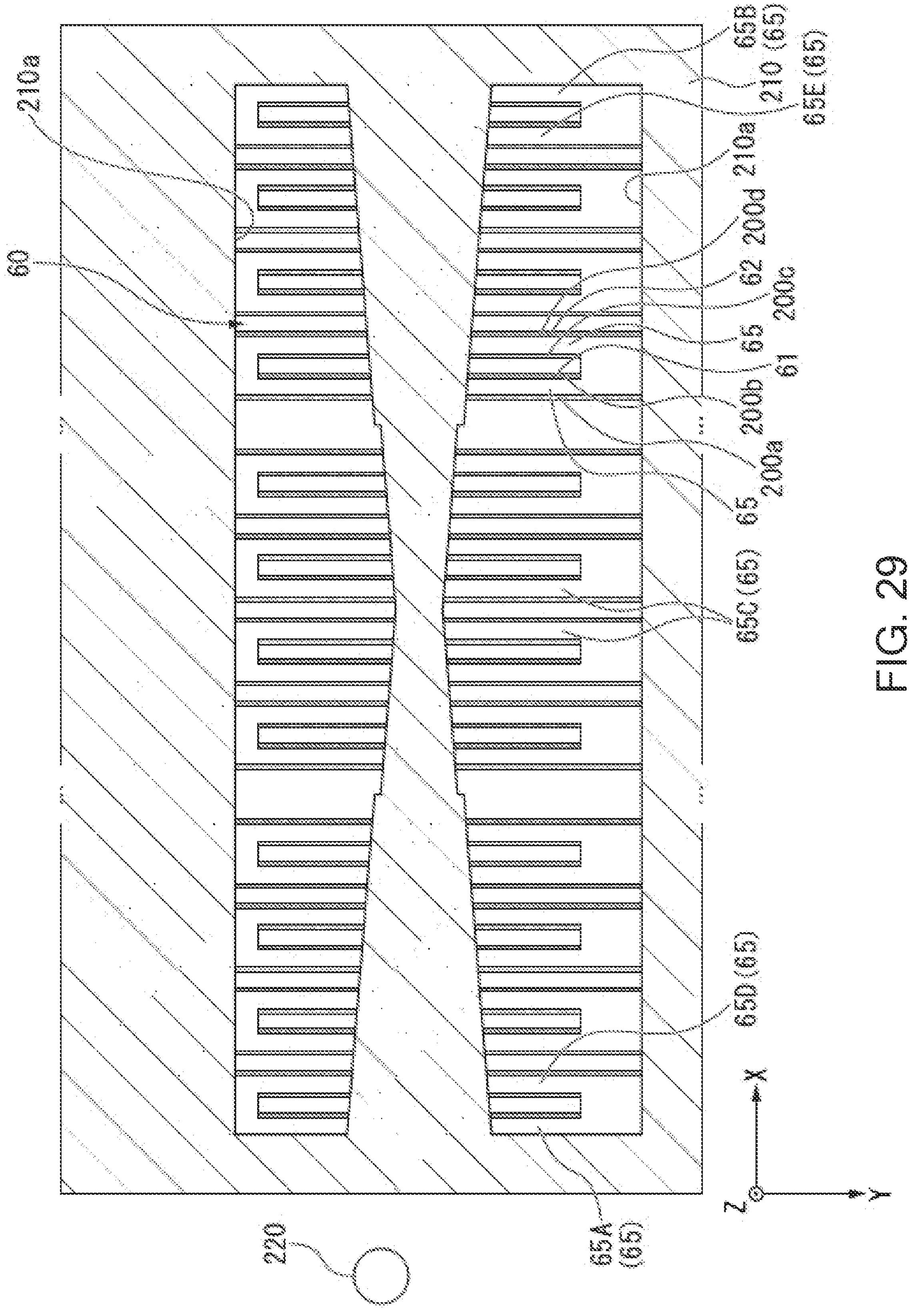
FIG. 29 is a process diagram (a plan view) for explaining the method of manufacturing the head chip according to the second embodiment.

FIG. 28 and FIG. 29 are each a plan view for explaining the method of manufacturing the head chip 50 according to the second embodiment.

As shown in FIG. 28, in the low-dielectric film formation step S10, a first deposition step S10*a* and a second deposition step S10*b* are performed in a state in which a low-dielectric film metal mask 210 is set on the upper surface of the actuator plate 52. In the first deposition step S10*a*, the oblique evaporation is performed on the +X-side surface of each of the drive walls 65 from an evaporation source 220 arranged above the actuator plate 52, and at the +X side with respect to the actuator plate 52. As shown in FIG. 29, in the second deposition step S10*b*, the oblique evaporation is performed on the −X-side surface of each of the drive walls 65 from the evaporation source 220 arranged at the −X side with respect to the actuator plate 52.

The low-dielectric film metal mask 210 is provided with mask openings 210*a* each opening in the formation areas of the low-dielectric films 200*a* through 200*d* of the channels 61, 62 in a lump in the plan view. The mask openings 210*a* are disposed in the both end portions in the Y direction in the channel column 60 as a pair of openings. Each of the mask openings 210*a* gradually increases in dimension in the Y direction in directions from the both sides toward the center in the X direction. It should be noted that the dimension in the Y direction of each of the mask openings 210*a* to the position in the X direction is adjusted based on the setting method of the first mask opening 135*a* described above. Specifically, the dimensions of the mask openings 210*a* is adjusted so that portions other than the portions functioning as the opposed regions out of the inner side surfaces of the channels 61, 62 are covered with the low-dielectric films 200*a* through 200*d*.

By performing the first deposition step S10*a* using the low-dielectric film metal mask 210 described above, the pair of first common-side low-dielectric films 200*a* and the pair of first individual-side low-dielectric films 200*c* are formed respectively on the +X-side surfaces of the corresponding channels 61, 62.

As shown in FIG. 29, in the second deposition step S10*b*, the oblique evaporation is performed on the actuator plate 52 in the state in which the actuator plate 52 is rotated 180 degrees around the center of the actuator plate 52 with respect to the first deposition step S10*a*. Thus, the pair of second common-side low-dielectric films 200*b* and the pair of second individual-side low-dielectric films 200*d* are formed respectively on the −X-side surfaces of the corresponding channels 61, 62.

As described above, in the second embodiment, there is adopted the configuration in which the dimensions in the Y direction in the low-dielectric films 200*a* through 200*d* decrease in the directions from the drive wall 65 in the central portion toward the drive walls 65 at the both end sides.

According to this configuration, by forming the common electrode parts 100, 101 and the individual electrode parts 110, 111 so as to cover the corresponding low-dielectric films 200*a* through 200*d*, the dimensions in the Y direction of the upside common parts 100*a*, 101*a* and the upside individual parts 110*a*, 111*a* decrease in the directions from the drive walls 65A, 65B, 65D, and 65E at the both end sides toward the drive wall 65C in the central portion. Thus, it becomes easy to homogenize the effective area among the channels 61, 62.

Moreover, by forming the low-dielectric films 200*a* through 200*d* in advance on the inner side surfaces of the channels 61, 62, it is possible to make only the portions opposed to each other in the portions having contact with the inner side surfaces of the channels 61, 62 in the electrode parts 100, 101, 110, and 111 function as the opposed regions even when forming the electrode parts 100, 101, 110, and 111 constant in dimension in the Y direction on the inner side surfaces of the channels 61, 62.

It should be noted that in the second embodiment, there is described the configuration in which the low-dielectric films 200*a* through 200*d* are formed only in upper half portions of the respective drive walls 65, but this configuration is not a limitation. It is possible to form the low-dielectric films 200*a* through 200*d* throughout the whole length in the Z direction in the respective drive walls 65 by, for example, performing the deposition on the actuator plate 52 from both of the upper and lower surfaces.

Third Embodiment

Figure 30:
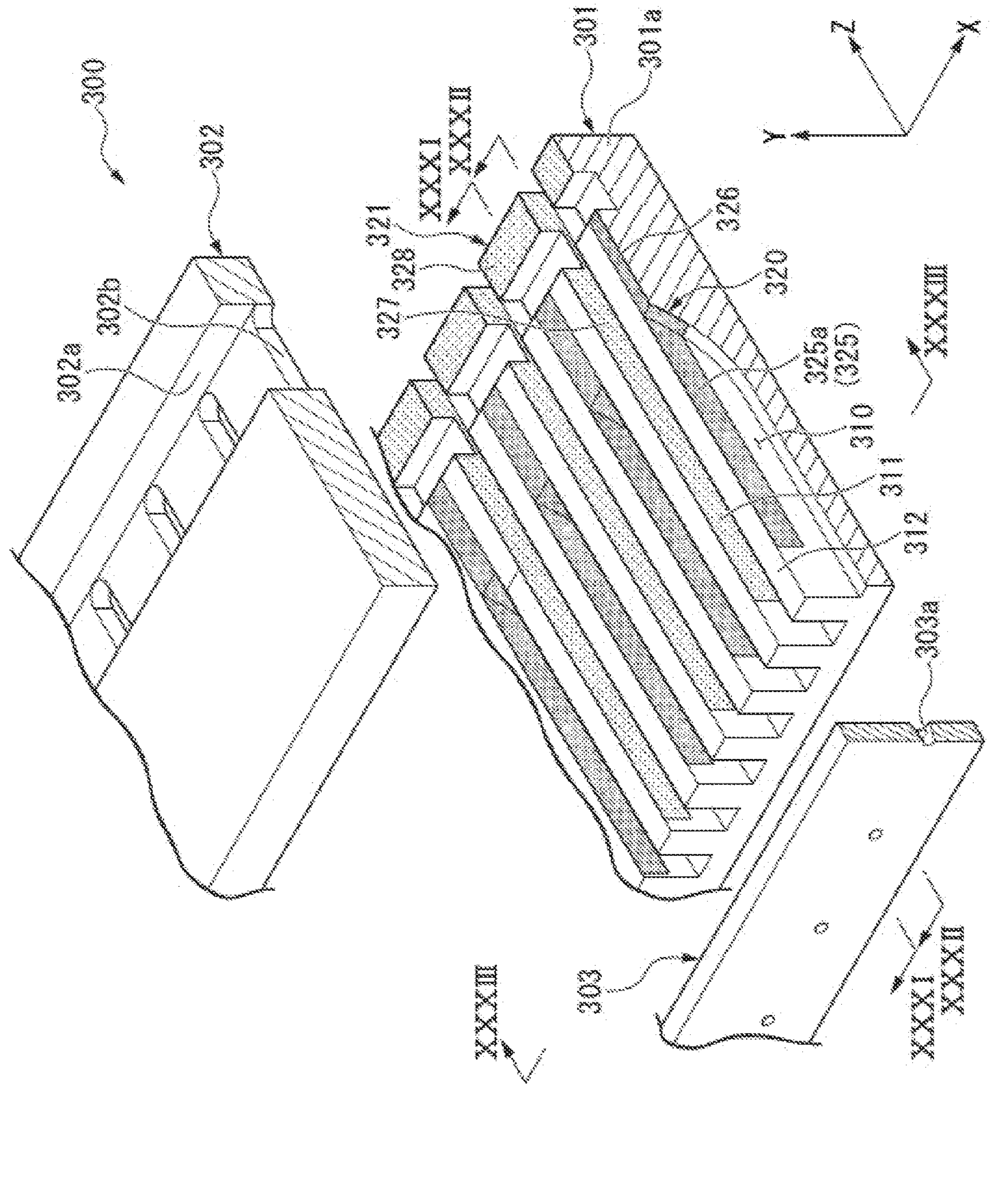
FIG. 30 is an exploded perspective view of a head chip according to a third embodiment.

FIG. 30 is an exploded perspective view of a head chip 300 according to a third embodiment. The third embodiment is different from the embodiments described above in the point that a so-called edge-shoot type head chip 300 for ejecting the ink from an end portion in the extending direction in an ejection channel 310 is adopted in the third embodiment.

The head chip 300 shown in FIG. 30 is provided with an actuator plate 301, a cover plate 302, and a nozzle plate 303.

The actuator plate 301 is arranged setting the Y direction as the thickness direction. In the following description, the +Y side is defined as an obverse-surface side, and the −Y side is referred to as a reverse surface side in some cases.

The actuator plate 301 is provided with ejection channels 310 and non-ejection channels 311. The ejection channels (channels) 310 and the non-ejection channels (channels) 311 are alternately arranged along the X direction across respective drive walls 312.

Figure 31:
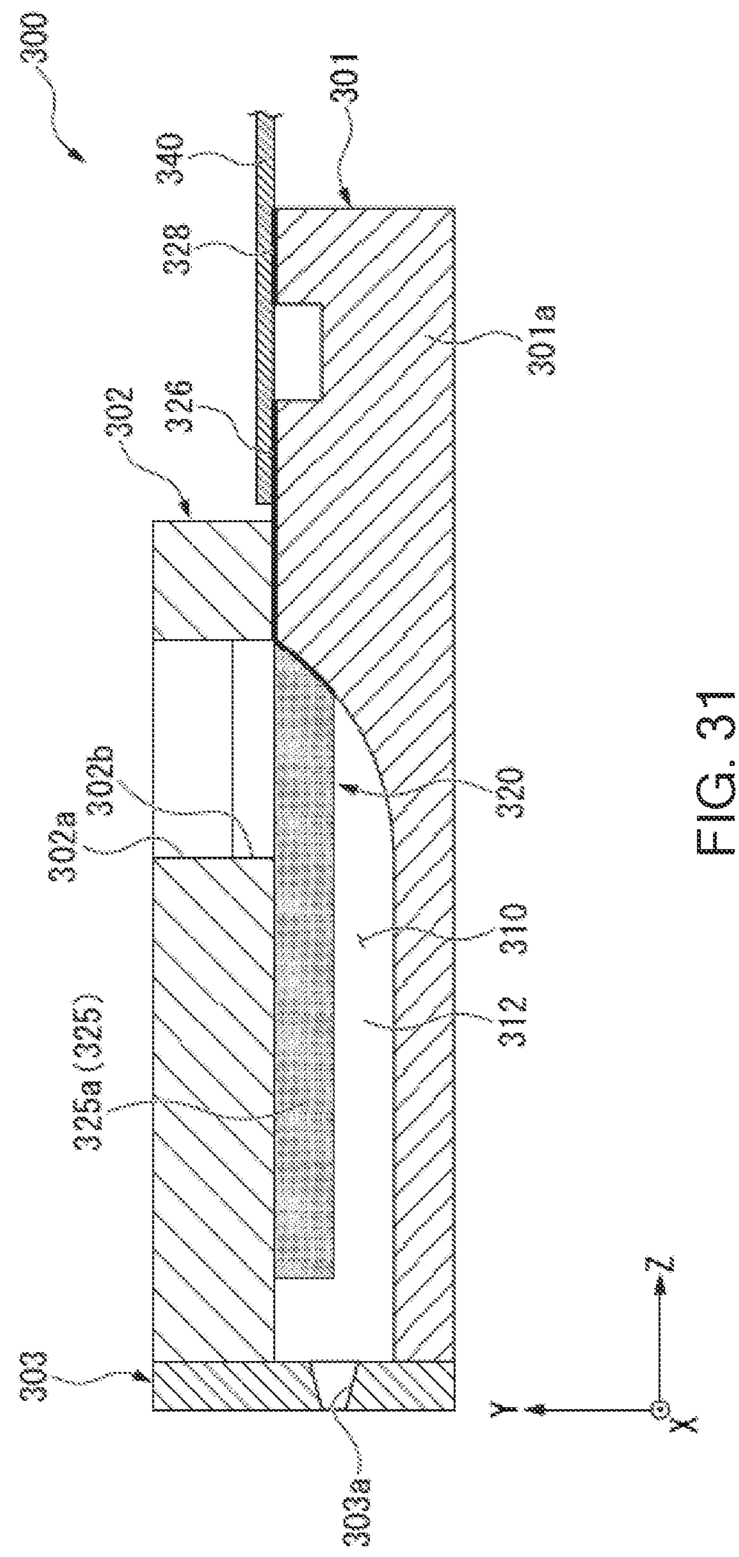
FIG. 31 is a cross-sectional view corresponding to the line XXXI-XXXI shown in FIG. 30.

FIG. 31 is a cross-sectional view corresponding to the line XXXI-XXXI shown in FIG. 30.

As shown in FIG. 31, the ejection channel 310 opens on the lower end surface (an opening surface) of the actuator plate 301, and at the same time, extends in the Z direction. The upper end portion of the ejection channel 310 is formed to have a circular arc shape in which the depth of the ejection channel 310 gradually decreases in an upward direction.

Figure 32:
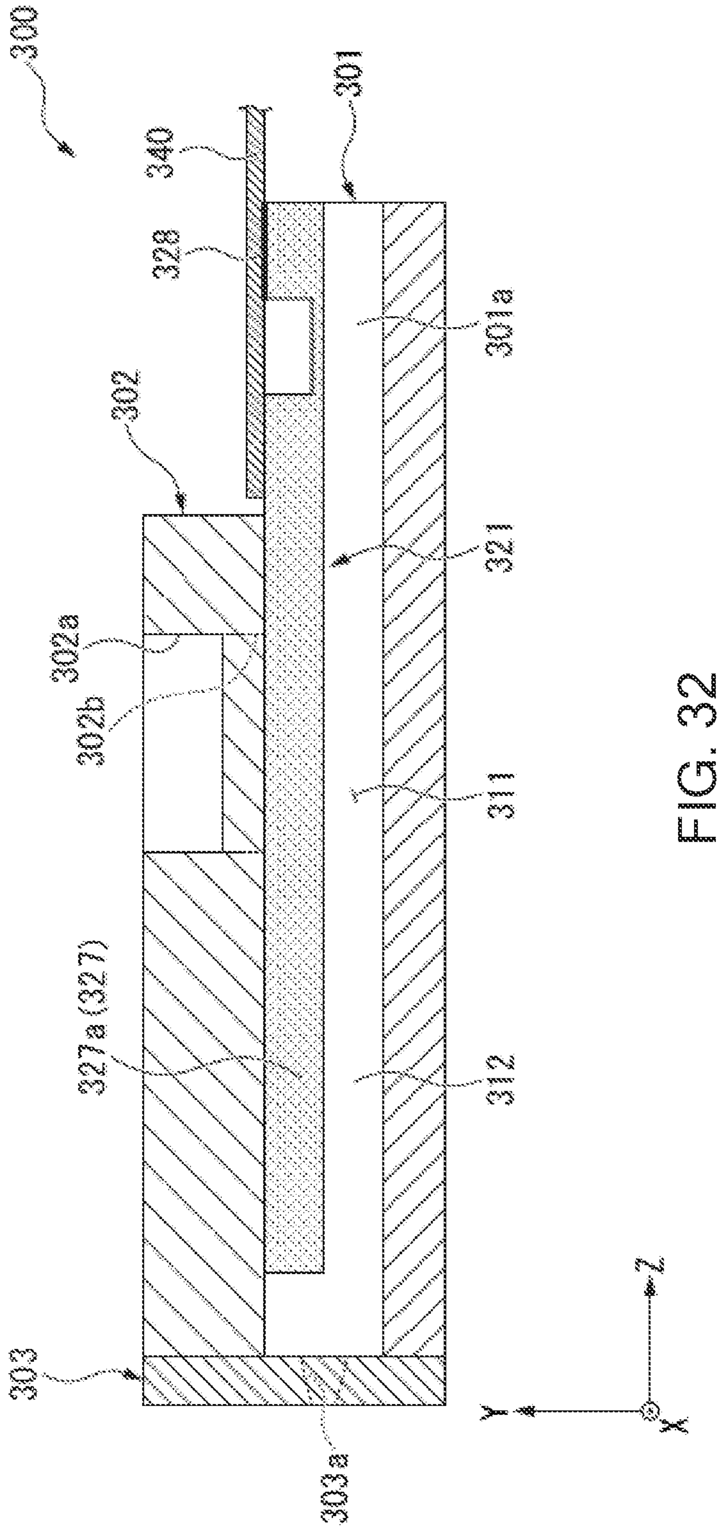
FIG. 32 is a cross-sectional view corresponding to the line XXXII-XXXII shown in FIG. 30.

FIG. 32 is a cross-sectional view corresponding to the line XXXII-XXXII shown in FIG. 30.

As shown in FIG. 32, the non-ejection channel 311 penetrates the actuator plate 301 in the Z direction. The depth of the non-ejection channel 311 is made uniform in the entire area in the Z direction.

As shown in FIG. 30, the cover plate 302 is bonded to the obverse surface of the actuator plate 301. The cover plate 302 closes the obverse-surface side openings of the respective channels 310, 311 in a state of projecting an upper end portion (hereinafter referred to as a tail part 301*a*) of the actuator plate 301.

In the cover plate 302, at a position overlapping the upper end portion of the ejection channel 310 when viewed from the Y direction, there is formed a common ink chamber 302*a*. The common ink chamber 302*a* extends in the X direction with a length sufficient for straddling, for example, the channels 310, 311, and at the same time, opens on the obverse surface of the cover plate 302.

In the common ink chamber 302*a*, at positions overlapping the respective ejection channels 310 when viewed from the Y direction, there are formed slits 302*b*. The slits 302*b* each communicate the upper end portion of corresponding one of the ejection channels 310 and the inside of the common ink chamber 302*a* with each other. The slits 302*b* are communicated with the respective ejection channels 310 on the one hand, but are not communicated with the non-ejection channels 311 on the other hand.

The nozzle plate 303 is bonded to a lower end surface of the actuator plate 301. The nozzle plate 303 is provided with nozzle holes 303*a*. The nozzle holes 303*a* are separately formed from each other at positions opposed in the Z direction to the respective ejection channels 310 in the nozzle plate 303.

The actuator plate 301 is provided with common wiring 320 and individual wiring 321. As shown in FIG. 30 and FIG. 31, the common wiring 320 is provided with a common electrode 325 and a common terminal 326.

The common electrode 325 is formed on inner side surfaces of each of the ejection channels 310.

The common terminal 326 is formed in a portion (a tail part 301*a*) located above the ejection channel 310 on the obverse surface of the actuator plate 301. A lower end portion of the common terminal 326 is coupled to the common electrode 325 at an obverse-surface side opening edge of the ejection channel 310.

As shown in FIG. 30 and FIG. 32, the individual wiring 321 is provided with an individual electrode 327, and an individual terminal 328.

The individual electrode 327 is formed on inner side surfaces of each of the non-ejection channels 311.

The individual terminal 328 is formed in a portion located above the common terminal 326 on the obverse surface of the actuator plate 301. The individual terminal 328 couples the individual electrodes 327 of the non-ejection channel 311 to each other across the ejection channel 310 from each other in the X direction.

To the obverse surface of the tail part 301*a*, there is pressure-bonded a flexible printed board 340. The flexible printed board 340 is coupled to the common terminals 326 and the individual terminals 328 on the obverse surface of the tail part 301*a*.

Figure 33:
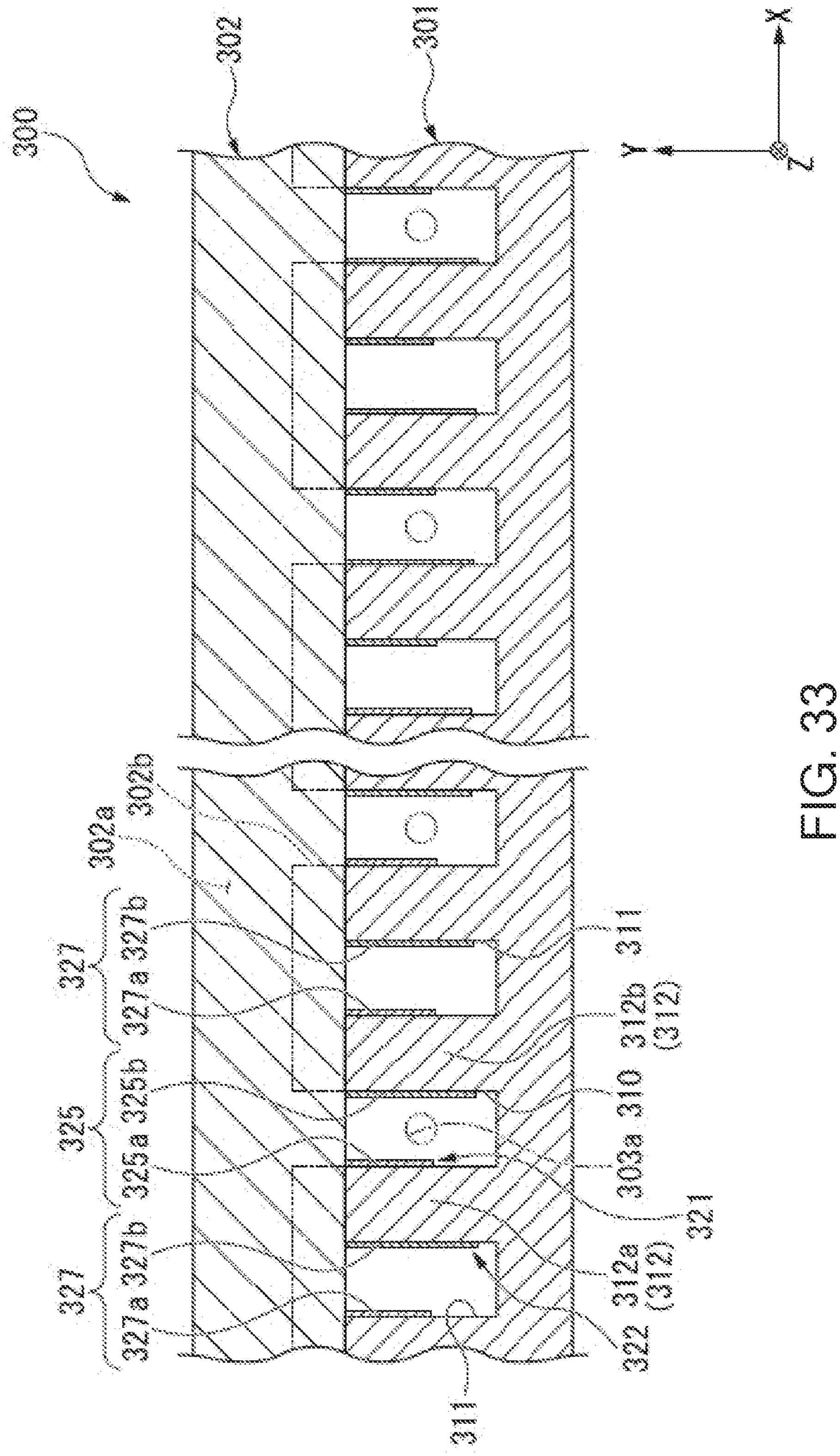
FIG. 33 is a cross-sectional view corresponding to the line XXXIII-XXXIII shown in FIG. 30.

FIG. 33 is a cross-sectional view corresponding to the line XXXIII-XXXIII shown in FIG. 30.

Here, as shown in FIG. 33, the common electrode 325 includes a first common electrode part 325*a* formed on a +X-side surface of each of the ejection channels 310, and a second common electrode part 325*b* formed on a −X-side surface of each of the ejection channels 310.

The first common electrode part 325*a* is formed in an area including a half at the obverse-surface side on the +X-side surface of each of the ejection channels 310. An obverse-surface side end edge of the first common electrode part 325*a* reaches an obverse-surface side opening edge of the ejection channel 310. A reverse-surface side end edge of each of the first common electrode part 325*a* is located at the reverse-surface side of the center in the Y direction on the +X-side surface. The reverse-surface side end edge of the first common electrode part 325*a* is located closer to the obverse surface in a direction from the drive wall 312A at the +X-side end toward the drive wall 312B at the −X-side end among the ejection channels 310. In other words, the dimension in the Y direction of the first common electrode part 325*a* gradually decreases in the direction from the drive wall 312A at the +X-side end toward the drive wall 312B at the −X-side end.

Figure 34:
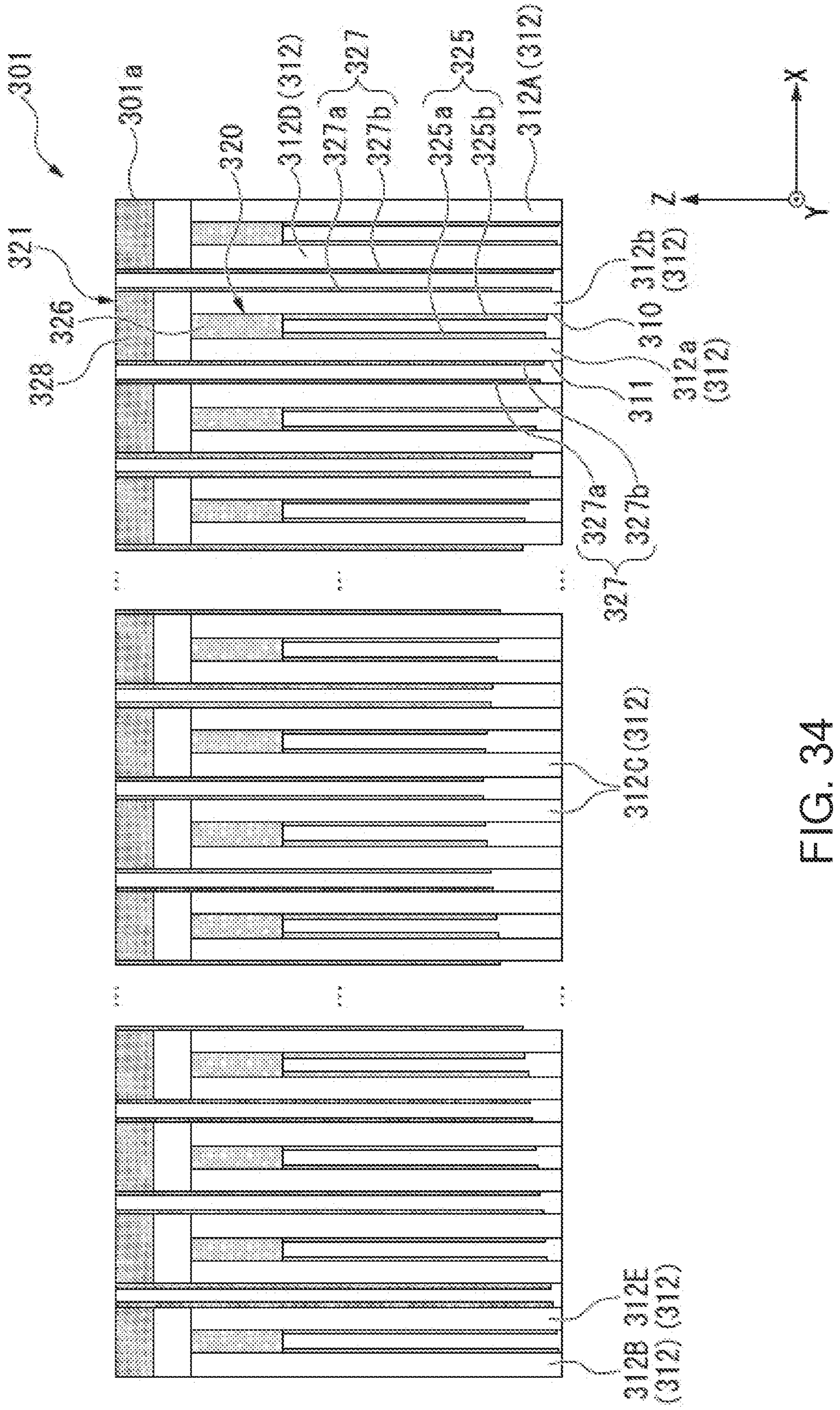
FIG. 34 is a plan view of the head chip according to the third embodiment.

FIG. 34 is a plan view of the actuator plate 301 related to the third embodiment.

As shown in FIG. 34, the dimension in the Z direction of the first common electrode part 325*a* gradually decreases in directions from the drive walls 312A, 312B at both end sides in the X direction toward the drive wall 312C in a central portion in the X direction among the ejection channels 310. In the third embodiment, the first common electrode parts 325*a* coincide in position of the upper end edge with each other. In other words, a lower end edge of each of the first common electrode parts 325*a* is located at more upper side in the directions from the drive walls 312A, 312B at the both end sides toward the drive wall 312C in the central portion.

As shown in FIG. 33, the second common electrode part 325*b* is formed in an area including a half at the obverse-surface side on the –X-side surface of each of the ejection channels 310. An obverse-surface side end edge of the second common electrode part 325*b* reaches the obverse-surface side opening edge of the ejection channel 310. A reverse-surface side end edge of each of the second common electrode part 325*b* is located at the reverse-surface side of the center in the Y direction on the –X-side surface. A reverse-surface side end edge of the second common electrode part 325*b* is located closer to the obverse surface in a direction from the drive wall 312 at the –X-side end toward the drive wall 312 at the +X-side end among the ejection channels 310. In other words, the dimension in the Y direction of the second common electrode part 325*b* gradually decreases in the direction from the drive wall 312B at the –X-side end toward the drive wall 312A at the +X-side end.

As shown in FIG. 34, the dimension in the Z direction of the second common electrode part 325*b* gradually decreases in the directions from the drive walls 312A, 312B at the both end sides toward the drive wall 312C in the central portion among the ejection channels 310. In the third embodiment, the second common electrode parts 325*b* coincide in position of the upper end edge with each other. In other words, a lower end edge of each of the second common electrode parts 325*b* is located at more upper side in the directions from the drive walls 312A, 312B at the both end sides toward the drive wall 312C in the central portion.

As shown in FIG. 33, the individual electrode 327 includes a first individual electrode part 327*a* formed on a +X-side surface of each of the non-ejection channels 311, and a second individual electrode part 327*b* formed on a –X-side surface of each of the non-ejection channels 311.

The first individual electrode part 327*a* is formed in an area including a half at the obverse-surface side on the +X-side surface of each of the non-ejection channels 311. An obverse-surface side end edge of the first individual electrode part 327*a* reaches an obverse-surface side opening edge of the non-ejection channel 311. A reverse-surface side end edge of each of the first individual electrode part 327*a* is located at the reverse-surface side of the center in the Y direction on the +X-side surface. The reverse-surface side end edge of the first individual electrode part 327*a* is located closer to the obverse surface in a direction from the drive wall 312D at the +X-side end toward the drive wall 312E at the –X-side end among the non-ejection channels 311. In other words, the dimension in the Y direction of the first individual electrode part 327*a* gradually decreases in the direction from the drive wall 312D at the +X-side end toward the drive wall 312E at the –X-side end.

As shown in FIG. 34, the dimension in the Z direction of the first individual electrode part 327*a* gradually decreases in the directions from the drive walls 312D, 312E at the both end sides toward the drive wall 312C in the central portion among the non-ejection channels 311. In the third embodiment, the first individual electrode parts 327*a* coincide in position of the upper end edge with each other. In other words, a lower end edge of each of the first individual electrode parts 327*a* is located at more upper side in the directions from the drive walls 312D, 312E at the both end sides toward the drive wall 312C in the central portion.

As shown in FIG. 33, the second individual electrode part 327*b* is formed in an area including a half at the obverse-surface side on the –X-side surface of each of the non-ejection channels 311. An obverse-surface side end edge of the second individual electrode part 327*b* reaches the obverse-surface side opening edge of the non-ejection channel 311. A reverse-surface side end edge of each of the second individual electrode part 327*b* is located at the reverse-surface side of the center in the Y direction on the –X-side surface. A reverse-surface side end edge of the second individual electrode part 327*b* is located closer to the obverse surface in a direction from the drive wall 312E at the –X-side end toward the drive wall 312D at the +X-side end among the non-ejection channels 311. In other words, the dimension in the Y direction of the second individual electrode part 327*b* gradually decreases in the direction from the drive wall 312E at the –X-side end toward the drive wall 312D at the +X-side end.

As shown in FIG. 34, the dimension in the Z direction of the second individual electrode part 327*b* gradually decreases in the directions from the drive walls 312D, 312E at the both end sides toward the drive wall 312C in the central portion among the non-ejection channels 311. In the third embodiment, the second individual electrode parts 327*b* coincide in position of the upper end edge with each other. In other words, a lower end edge of each of the second individual electrode parts 327*b* is located at more upper side in the directions from the drive walls 312D, 312E at the both end sides toward the drive wall 312C in the central portion.

As shown in FIG. 33 and FIG. 34, the first common electrode part 325*a* is formed on the +X-side surface of the drive wall 312*a* partitioning between the ejection channel 310 and the non-ejection channel 311 adjacent at the –X side to that ejection channel 310, and the second individual electrode part 327*b* is formed on the –X-side surface of that drive wall 312*a*. In the first common electrode part 325*a* and the second individual electrode part 327*b* provided to each of the drive walls 312*a*, a region in which the first common electrode part 325*a* and the second individual electrode part 327*b* are opposed to each other across the drive wall 312*a* (overlap each other when viewed from the X direction), and which generates an electrical field with respect to the drive wall 312*a* is defined as a first opposed region. In this case, as shown in FIG. 33, the first common electrode part 325*a* in the first opposed region gradually decreases in dimension in the Y direction in a direction from the drive wall 312*a* at the +X-side end toward the drive wall 312*a* at the –X-side end on the one hand, and gradually decreases in dimension in the Z direction in directions from the drive walls 312*a* at both end sides toward the drive wall 312*a* in the central portion on the other hand. As shown in FIG. 34, the second individual electrode part 327*b* in the first opposed region gradually decreases in dimension in the Y direction in the direction from the drive wall 312*a* at the +X-side end toward the drive wall 312*a* at the –X-side end on the one hand, and gradually decreases in dimension in the Z direction in the directions from the drive walls 312*a* at the both end sides toward the drive wall 312*a* in the central portion on the other hand. Thus, it is set that the areas of the respective first opposed regions in the respective drive walls 312*a* become the same.

As shown in FIG. 33 and FIG. 34, the second common electrode part 325*b* is formed on the –X-side surface of the drive wall 312*b* partitioning between the ejection channel 310 and the non-ejection channel 311 adjacent at the +X side to that ejection channel 310, and the first individual electrode part 327*a* is formed on the +X-side surface of that drive wall 312*b*. In the second common electrode part 325*b* and the first individual electrode part 327*a* provided to each of the drive walls 312*b*, a region in which the second common electrode part 325*b* and the first individual electrode part 327*a* are opposed to each other across the drive wall 312*b* (overlap each other when viewed from the X direction), and which generates an electrical field with respect to the drive wall 312*b* is defined as a second opposed region. In this case, the second common electrode part 325*b* in the second opposed region gradually decreases in dimension in the Y direction in a direction from the drive wall 312*b* at the −X-side end toward the drive wall 312*b* at the +X-side end on the one hand, and gradually decreases in dimension in the Z direction in directions from the drive walls 312*b* at both end sides toward the drive wall 312*b* in the central portion on the other hand. Further, the first individual electrode part 327*a* in the second opposed region gradually decreases in dimension in the Y direction in a direction from the drive wall 312*b* at the +X-side end toward the drive wall 312*b* at the −X-side end on the one hand, and gradually decreases in dimension in the Z direction in the directions from the drive walls 312*b* at the both end sides toward the drive wall 312*b* in the central portion on the other hand. Thus, it is set that the areas of the respective second opposed regions in the respective drive walls 312*b* become the same. In the third embodiment, it is preferable for the areas of the first opposed region and the second opposed region to be the same in all of the drive walls 312*a*, 312*b*.

Figure 35:
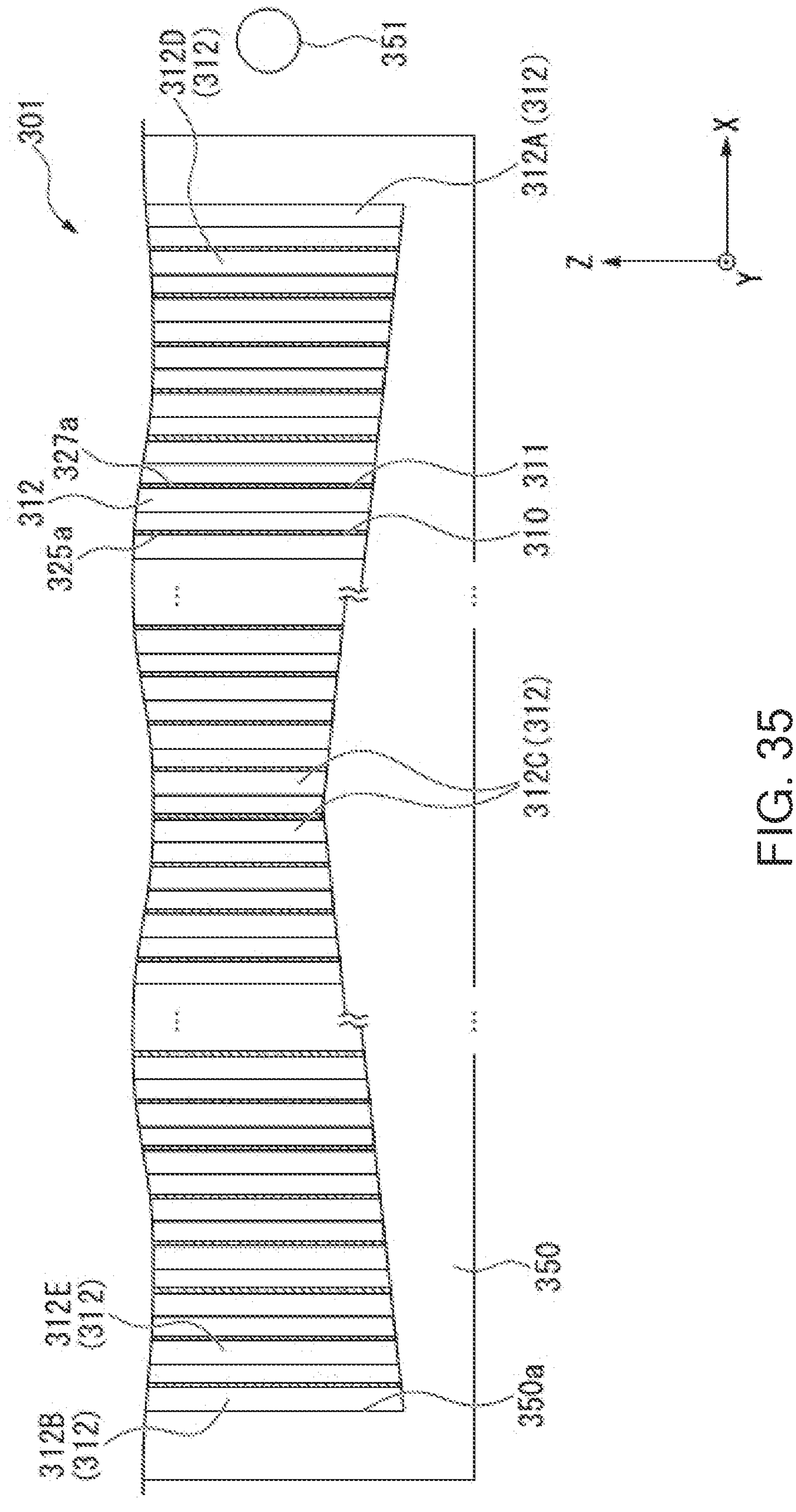
FIG. 35 is a process diagram (a plan view) for explaining the method of manufacturing the head chip according to the third embodiment.
Figure 36:
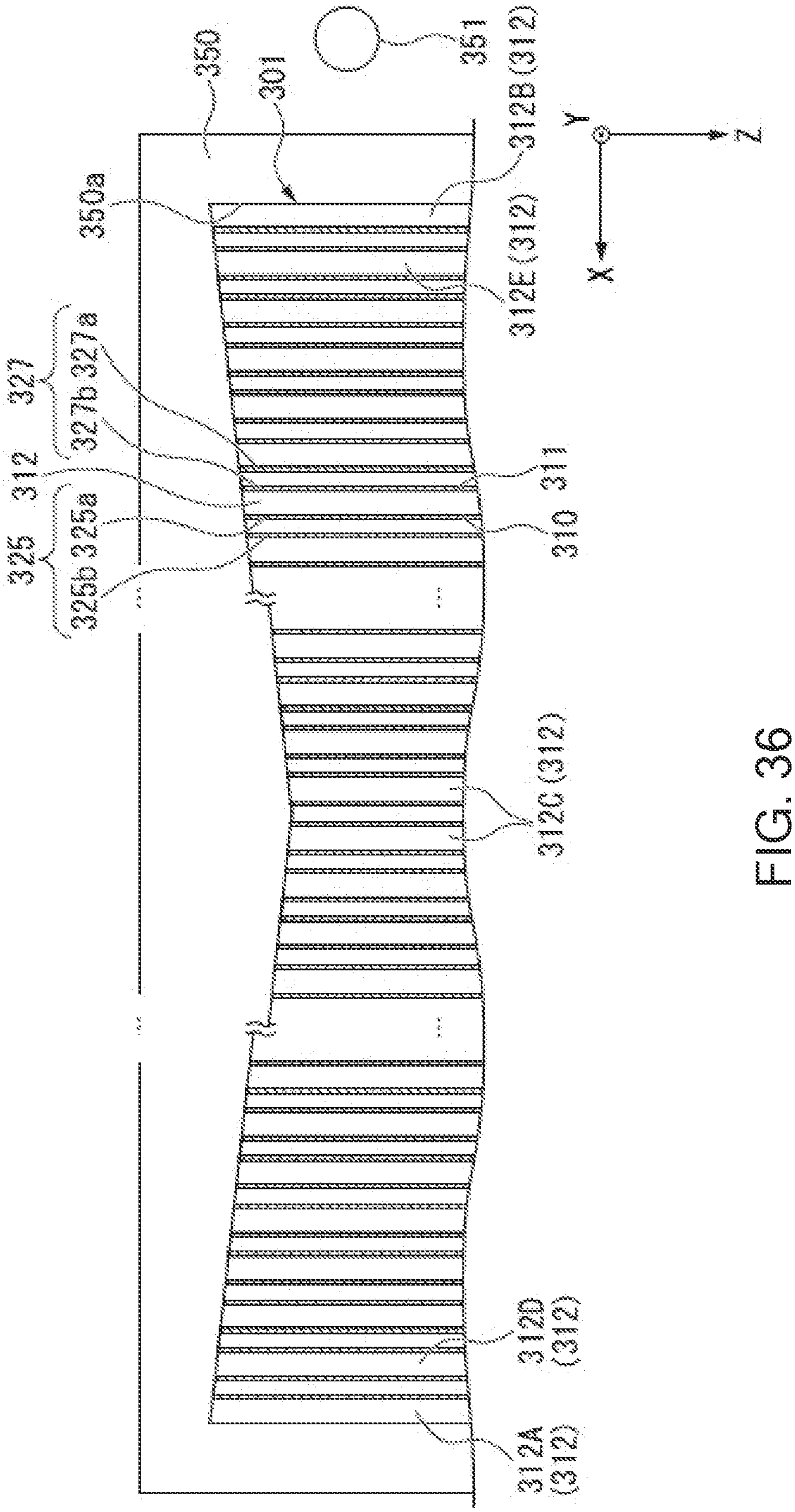
FIG. 36 is a process diagram (a plan view) for explaining the method of manufacturing the head chip according to the third embodiment.

FIG. 35 and FIG. 36 are each a process diagram for explaining a method of manufacturing the head chip 300 according to the third embodiment.

In the third embodiment, in order to form the common electrode parts 325*a*, 325*b* and the individual electrode parts 327*a*, 327*b*, a mask opening 350*a* of the metal mask 350 to be used in the wiring formation step is adjusted in the track of the setting method described above as shown in FIG. 35 and FIG. 36. Specifically, the dimensions in the Z direction of the common electrode parts 325*a*, 325*b* and the individual electrode parts 327*a*, 327*b* are adjusted in accordance with the magnitude of tan β (the evaporation depth D) in the common electrode parts 325*a*, 325*b* and the individual electrode parts 327*a*, 327*b* in each of the drive walls 312. On this occasion, the adjustment amount of the evaporation length is adjusted only in one side of the Z direction among the drive walls 312. Therefore, the mask opening 350*a* is formed so that the dimensions in the Z direction of the common electrode parts 325*a*, 325*b* and the individual electrode parts 327*a*, 327*b* in the drive wall 312 in the central portion become the smallest, and the dimensions in the Z direction of the common electrode parts 325*a*, 325*b* and the individual electrode parts 327*a*, 327*b* in the drive walls 312A, 312B, 312D, and 312E at the both end sides become the largest.

On that basis, in the wiring formation step, the oblique evaporation is performed on the +X-side surface of each of the drive walls 312 from an evaporation source 351 arranged above the actuator plate 301, and at the +X side with respect to the actuator plate 301 as shown in FIG. 35. Thus, the first common electrode parts 325*a* and the first individual electrode parts 327*a* are formed on the +X-side surfaces of the drive walls 312.

Subsequently, the oblique evaporation is performed on the −X-side surface of each of the drive walls 312 from the evaporation source 351 arranged at the −X side with respect to the actuator plate 301 as shown in FIG. 36. Thus, the second common electrode parts 325*b* and the second individual electrode parts 327*b* are formed on the −X-side surfaces of the drive walls 312.

As described above, it is possible to achieve the homogenization of the areas of the opposed regions using substantially the same wiring formation steps in both of the case in which the drive wiring is formed from the both sides of the channel as in the first embodiment, and the case in which the drive wiring is formed only at one side of the channel as in the third embodiment. Thus, it is possible to provide the manufacturing method excellent in versatility.

Moreover, in the present embodiment, there is adopted the configuration in which the upper end portions of the electrode parts 325, 327 are arranged at the same position among the plurality of channels 310, 311.

According to this configuration, even when the dimensions in the Z direction of the common electrode parts 325*a*, 325*b* and the individual electrode parts 327*a*, 372*b* are made different among the plurality of channels 310, 311, the positions of the upper end portions in the common electrode parts 325*a*, 325*b* and the individual electrode parts 327*a*, 372*b* are uniformed among the channels 310, 311. Thus, when forming the terminals 326, 328 for coupling the common electrode parts 325*a*, 325*b* and the individual electrode parts 327*a*, 327*b* to the flexible printed board 340 on the obverse surface of the actuator plate 301, it becomes easy to lay around the common electrode parts 325*a*, 325*b* and the individual electrode parts 327*a*, 327*b* to the terminals 326, 328.

In the third embodiment, there is described when the actuator plate 52 is a monopole substrate in the edge-shoot type head chip 300, but this configuration is not a limitation. The configuration of the present disclosure can be applied when the actuator plate 52 is a chevron substrate in the edge-shoot type head chip 300. Further, in the side-shoot type head chip, it is possible to use the monopole substrate as the actuator plate 52. Further, in the head chip 300 according to the third embodiment, it is possible to arrange that the areas of the opposed regions are adjusted by making low-dielectric films intervene between the electrodes and the drive walls as in the second embodiment described above.

Other Modified Examples

It should be noted that the scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiments described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiments described above, there is described when the recording target medium P is paper, but this configuration is not a limitation. The recording target medium P is not limited to paper, but can also be a metal material or a resin material, and can also be food or the like.

In the embodiments described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiments described above, there is described the configuration in which the Z direction coincides with the gravitational direction, but this configuration is not a limitation, and it is also possible to set the Z direction to a direction along the horizontal direction.

In the embodiments described above, there is explained the configuration (so-called pulling-shoot) of deforming the actuator plate in the direction of increasing the volume of the ejection channel due to the application of the voltage, and then restoring the actuator plate to thereby eject the ink, but this configuration is not a limitation. It is possible for the head chip according to the present disclosure to be provided with a configuration (so-called pushing-shoot) in which the ink is ejected by deforming the actuator plate in a direction of reducing the volume of the ejection channel due to the application of the voltage. When performing the pushing-shoot, the actuator plate deforms so as to bulge toward the inside of the ejection channel due to the application of the drive voltage. Thus, the volume in the ejection channel decreases to increase the pressure in the ejection channel, and thus, the ink located in the ejection channel is ejected outside through the nozzle hole. When setting the drive voltage to zero, the actuator plate is restored. As a result, the volume in the ejection channel is restored.

In the embodiments described above, there is described when the dimensions of the electrodes are adjusted so that the areas of the first opposed regions and the second opposed regions become the same in each of the drive walls, but this configuration is not a limitation. The areas of the first opposed region and the second opposed region can slightly differ by the drive walls.

Besides the above, it is arbitrarily possible to replace the constituents in the embodiments described above with known constituents within the scope or the spirit of the present disclosure, and it is also possible to arbitrarily combine the modified examples described above with each other.

What is claimed is:

1. A head chip comprising:

an actuator plate in which a plurality of channels extending in a first direction is arranged in a second direction crossing the first direction; and an electrode which includes, in the actuator plate, a first electrode part arranged on a first side surface facing to a first side in the second direction in a drive wall configured to partition between the channels adjacent to each other and a second electrode part arranged on a second side surface facing to a second side in the second direction as an opposite side to the first side in the drive wall, and which is configured to deform the drive wall in the actuator plate so as to change a volume of the channel, wherein when a region in which the first electrode part and the second electrode part are opposed in the second direction to each other across the drive wall, and which is configured to generate an electrical field in the drive wall is defined as an opposed region, a dimension of the first electrode part in a third direction crossing the first direction when viewed from the second direction is formed so as to decrease in a direction from the drive wall located at the first side in the second direction toward the drive wall located at the second side in the second direction among the plurality of drive walls, a dimension of the second electrode part in the third direction is formed so as to decrease in a direction from the drive wall located at the second side toward the drive wall located at the first side among the plurality of drive walls, and a dimension of the opposed region in the first direction decreases in directions from the drive walls located at both end sides in the second direction toward the drive wall located in a central portion in the second direction.

2. The head chip according to claim 1, wherein an area of the opposed region is set to be same among the plurality of drive walls.

3. The head chip according to claim 1, wherein a first side end portion in the first direction in the opposed region is arranged at same position in the first direction among the plurality of drive walls.

4. The head chip according to claim 1, wherein a jet hole plate is arranged on a surface facing to the third direction in the actuator plate, in the jet hole plate, jet holes separately communicated with the channels are formed at positions overlapping central portions in the first direction in the channels when viewed from the third direction, and both end portions in the first direction in the opposed region are located at more inner side in the first direction in directions from the drive walls located at both end sides in the second direction toward the drive wall located in a central portion in the second direction.

5. The head chip according to claim 1, wherein the first electrode part includes a first one-side area located at one side in the third direction, and a first other-side area connected at the other side in the third direction to the first one-side area, the second electrode part includes a second one-side area located at one side in the third direction, and a second other-side area connected at the other side in the third direction to the second one-side area, and a dimension in the first direction of a portion constituted by the first one-side area and the second on-side area in the opposed region decreases in directions from the drive walls located at both end sides in the second direction toward the drive wall located in a central portion in the second direction.

6. The head chip according to claim 1, wherein a first low-dielectric film is arranged in a part in the first direction between the first electrode part and the first side surface, a second low-dielectric film is arranged in a part in the first direction between the second electrode part and the second side surface, and dimensions in the first direction of the first low-dielectric film and the second low-dielectric film decrease in directions from the drive wall located at a central portion in the second direction toward the drive walls located at both sides in the second direction.

7. A liquid jet head comprising the head chip according to claim 1.

8. A liquid jet recording device comprising the liquid jet head according to claim 7.

9. A method of manufacturing a head chip including an actuator plate in which a plurality of channels extending in a first direction is arranged in a second direction crossing the first direction, and an electrode which includes, in the actuator plate, a first electrode part arranged on a first side surface facing to a first side in the second direction in a drive wall configured to partition between the channels adjacent to each other and a second electrode part arranged on a second side surface facing to a second side in the second direction as an opposite side to the first side in the drive wall, and which is configured to deform the drive wall to change a volume of the channel, the method comprising:

a first evaporation step of performing oblique evaporation in an oblique direction crossing the second direction when viewed from the first direction from an evaporation source arranged at the first side in the second direction with respect to the actuator plate, to thereby deposit the first electrode parts on the first side surfaces so that a dimension of the first electrode part in a third direction crossing the first direction when viewed from the second direction decreases in a direction from the drive wall located at a first side in the second direction toward the drive wall located at the second side in the second direction among the plurality of drive walls; and a second evaporation step of performing oblique evaporation in an oblique direction crossing the second direction when viewed from the first direction from an evaporation source arranged at the second side in the second direction with respect to the actuator plate, to thereby deposit the second electrode parts on the second side surfaces so that a dimension of the second electrode part in the third direction decreases in a direction from the drive wall located at the second side toward the drive wall located at the first side among the plurality of drive walls, wherein when a region in which the first electrode part and the second electrode part are opposed in the second direction to each other across the drive wall is defined as an opposed region, a dimension in the first direction of the opposed region is decreased in directions from the drive walls located at both sides in the second direction toward the drive wall located in a central portion in the second direction.

10. The method of manufacturing the head chip according to claim 9, wherein in the first evaporation step and the second evaporation step, by performing oblique evaporation using a mask arranged so as to overlap the actuator plate when viewed from the third direction, the first electrode part is formed on the first side surface and the second electrode part is formed on the second side surface through an opening of the mask, and a dimension in the first direction of the opening increases in directions from the drive wall located in a central portion in the second direction toward the drive walls located at both end sides in the second direction.

11. The method of manufacturing the head chip according to claim 9, wherein in the first evaporation step, the oblique evaporation is performed in a state in which a first low-dielectric film is formed on the first side surfaces so that the first low-dielectric film decreases in directions from the drive wall located in a central portion in the second direction toward the drive walls located at both end sides in the second direction, and in the second evaporation step, the oblique evaporation is performed in a state in which a second low-dielectric film is formed on the second side surfaces so that the second low-dielectric film decreases in the directions from the drive wall located in the central portion in the second direction toward the drive walls located at the both sides in the second direction.

* * * * *